(12) United States Patent
Neale et al.

(10) Patent No.: US 6,975,647 B2
(45) Date of Patent: Dec. 13, 2005

(54) ENHANCEMENTS FOR TCP PERFORMANCE ENHANCING PROXIES

(75) Inventors: Jason Neale, Montreal (CA); Andrew M. Pether, Pincourt (CA); Abdul-Kader Mohsen, Montreal (CA); Guy Begin, Montreal (CA)

(73) Assignee: EMS Technologies Canada, LTD, Ottawa (CA)

( * ) Notice: Subject to any disclaimer, the term of this patent is extended or adjusted under 35 U.S.C. 154(b) by 0 days.

(21) Appl. No.: 10/292,900

(22) Filed: Nov. 13, 2002

(65) Prior Publication Data

US 2003/0123481 A1 Jul. 3, 2003

Related U.S. Application Data

(60) Provisional application No. 60/333,608, filed on Nov. 13, 2001.

(51) Int. Cl.[7] .................................................. H04J 3/16
(52) U.S. Cl. ....................... 370/466; 370/316; 370/338; 370/401
(58) Field of Search ................................ 370/315, 316, 370/389, 465, 466, 467, 349, 401, 392, 394; 709/230, 231, 232, 233, 234, 238, 295

(56) References Cited

U.S. PATENT DOCUMENTS

| | | | | |
|---|---|---|---|---|
| 6,115,384 A | | 9/2000 | Parzych ...................... | 370/401 |
| 6,215,769 B1 | * | 4/2001 | Ghani et al. ................ | 370/230 |
| 6,415,329 B1 | * | 7/2002 | Gelman et al. ............. | 709/245 |
| 6,460,085 B1 | * | 10/2002 | Toporek et al. ............. | 709/233 |
| 6,529,477 B1 | * | 3/2003 | Toporek et al. ............. | 370/235 |
| 6,553,032 B1 | * | 4/2003 | Farley et al. ................ | 370/394 |
| 6,584,083 B1 | * | 6/2003 | Toporek et al. ............. | 370/316 |

FOREIGN PATENT DOCUMENTS

| EP | 1175066 A2 | 1/2002 |
|---|---|---|
| WO | WO 01/65805 A2 | 9/2001 |

OTHER PUBLICATIONS

International Search Report, dated Mar. 26, 2003, for Application No. PCT/US02/36217.
Border, J.; Performance Enhancing Proxies, Internet Engineering Task Force Internet Draft; Jun. 25, 1999; pp 1–26.

* cited by examiner

Primary Examiner—Bob A. Phunkulh
(74) Attorney, Agent, or Firm—Hogan & Hartson LLP

(57) ABSTRACT

A method and system is presented for the bi-directional transfer of data packets over a TCP communications system that can comprise both terrestrial and satellite links, using an enhanced flight protocol that, transparently to the end users, replaces the TCP over the congested satellite link portion of the system that accelerates the data delivery between end users and improves reliability of the data packet transmission. The invention eliminates the conventional TCP 3-way handshake and other associated time-delay procedures and replaces them with an improved use of performance enhancing proxies at either end of the satellite link that use a unique acknowledgement methods, data buffer storage and packet header field arrangement among the design features of a flight protocol method and system that accelerates data packet transfer with more efficient link capacity use and greater data throughput.

19 Claims, 32 Drawing Sheets

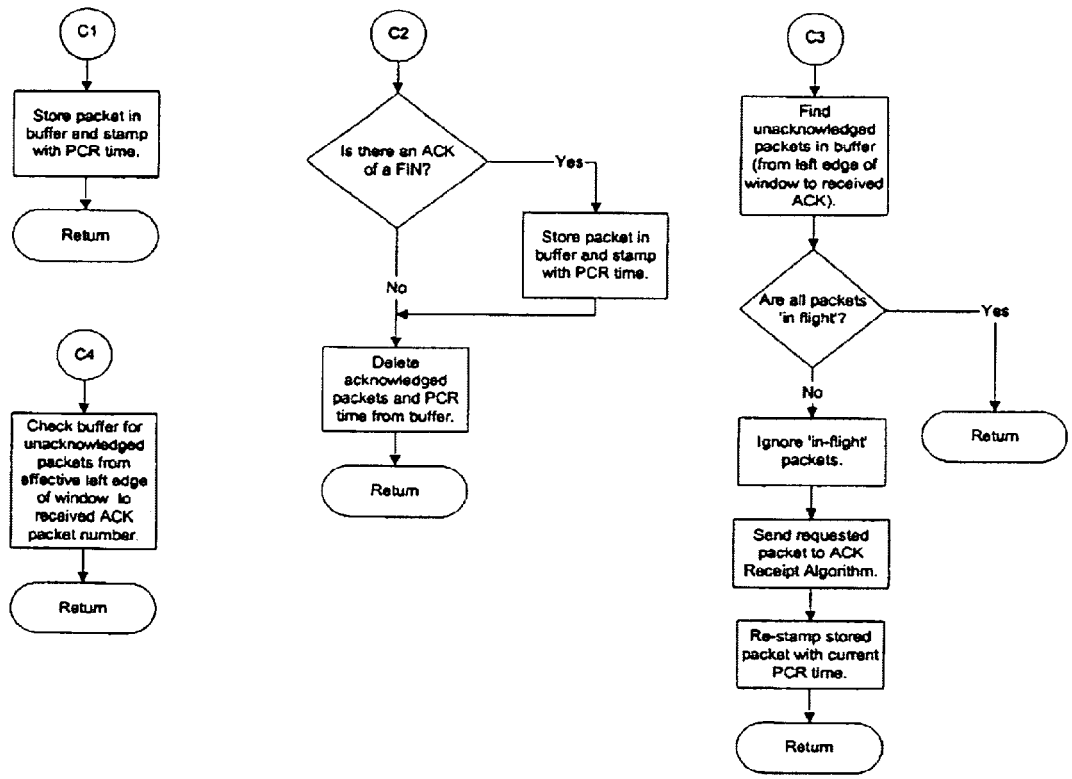
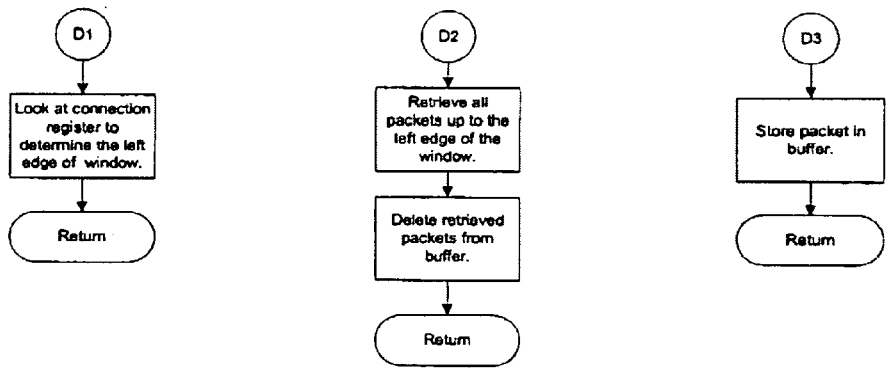
Figure 13

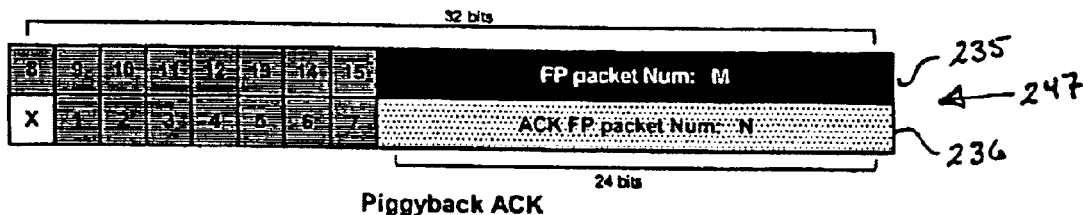

Piggyback ACK
The ACK packet can positively or negatively acknowledge up to 15 consecutive packets as well as carry a data segment. Bitmap is filled starting with bit position 1.

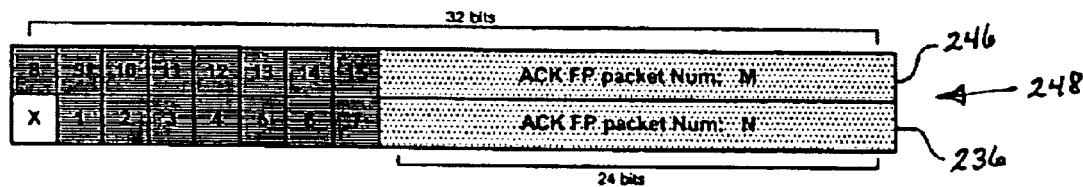

Stretch ACK
The ACK packet positively acknowledges 15 consecutive FP packets by using the 15 bit bitmap.
Also, it positively acknowledges FP packet from (N+1) to M.
Total number of acknowledged packets equals: (M - N + 15) consecutive packets.

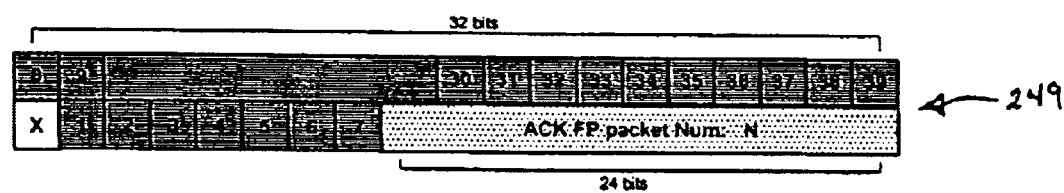

Data-less ACK
The ACK packet can positively or negatively acknowledge up to 39 consecutive packets.
Bitmap is filled starting with bit position 1.

| X | X: is one bit of two bits used to specify the type of the ACK packet. |
| N | N: FP packet number of last positively acknowledged packet in the bitmap. |
| M | M: FP packet number of second explicitly specified packet in a stretch ACK. | g: bitmap position that corresponds to acknowledgment status of one FP packet.

M: FP packet number of data appended after the header in piggyback ACK type.

| Present State | Trigger | Next State | Action (while in present state) |
|---|---|---|---|
| Idle | Get a transmit request from TCP Emulator and sufficient capacity is available | Outstanding segments/window open | Wait |
| | ACK to transmit from RX side | Outstanding segments/window open | |
| | Receive an ACK for an already received segment | Idle | |
| Outstanding segments/window open | Flight times expires for some outstanding segments and sufficient capacity is available | Unacknowledged segments/window open | Transmit segments or ACKs |
| | Number of outstanding segments exceeds limit | Outstanding segments/window closed | |
| | ACK received for some outstanding segments that were previously unacknowledged; outstanding segments left | Outstanding segments/window open | |
| | ACK received for outstanding segments that were previously unacknowledged; no outstanding segments left | Idle | |
| Outstanding segments/window closed | Flight times expire for some outstanding segments | Unacknowledged segments/window closed | Transmit ACKs Wait for ACKs |
| | ACK received for outstanding segments that were previously unacknowledged; outstanding segments left | Outstanding segments/window open | |
| | ACK received for left edge hole segment that was previously unacknowledged; no outstanding segments left | Idle | |
| Unacknowledged segments/window open | ACKs received for all unacknowledged segments | Idle | Transmit segments or ACKs Retransmit timed-out segments |
| | ACKs received for some unacknowledged segments and sufficient capacity is available | Unacknowledged segments/window open | |

TABLE I

FIG. 30B

| Present State | Trigger | Next State | Action (while in present state) |
|---|---|---|---|
| | Number of outstanding and unacknowledged segments exceeds limit | *Unacknowledged segments/window closed* | |
| | Retransmit timed-out segments; unacknowledged segments left | *Unacknowledged segments/window open* | |
| *Unacknowledged segments/window closed* | ACKs received for some unacknowledged segments | *Unacknowledged segments/window open* | Transmit ACKs Wait for ACKs Retransmit timed-out segments |
| | ACKs received for left edge hole (unacknowledged) segment | *Idle* | |
| | Some timed-out segments retransmitted; some unacknowledged segments left | *Unacknowledged segments/window closed* | |
| | All timed-out segments retransmitted; no unacknowledged segments left | *Outstanding segments/window closed* | |

TABLE 1 (cont.)

Fig. 31

| Present State | Trigger | Next State | Action (associated with transition) |
|---|---|---|---|
| Receive buffer empty | Receive old segment | Receive buffer empty | Wait for segment |
| | Receive new segment; left edge extension possible | No holes | Send (positive) ACK indicating new left edge Deliver data to TCP Emulator |
| | Receive new segment; left edge extension not possible | Holes | Send (negative) ACK |
| Holes | Receive new segment; left edge extension possible (partial) | Holes | Send (positive) ACK indicating new left edge Deliver data to TCP Emulator |
| | Receive new segment; left edge extension not possible | Holes | Send (negative) ACK |
| | Receive old segment | Holes | Wait for segment |
| | Receive new segment; left edge extension possible (complete) | No Holes | Send (positive) ACK indicating new left edge Deliver data to TCP Emulator |
| No Holes | Receive old segment | No Holes | Wait for segment |
| | Receive new segment; left edge extension possible | Holes | Send (positive) ACK indicating new left edge Deliver data to TCP Emulator |
| | Receive new segment; left edge extension not possible | Holes | Send (negative) ACK |
| | All data delivered to TCP Emulator | Receive buffer empty | Wait for segment |

Table 2

ENHANCEMENTS FOR TCP PERFORMANCE ENHANCING PROXIES

CROSS-REFERENCE TO RELATED APPLICATIONS

This application claims priority to U.S. Provisional Application No. 60/333,608 to Jason D. Neale et. al., entitled "Performance Enhancing Proxies for Satellite Transmission Control Protocols," filed on Nov. 13, 2001. This application is also incorporated by reference in its entirety.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

This invention relates to data telecommunications systems and mutiplex communications techniques, and more specifically to the enhancement of hardware and software used with Performance Enhancing Proxies (PEPs), to optimize the performance of the Transmission Control Protocol (TCP) in the bidirectional transmission of data packets over satellite links.

2. Description of Related Art

The Internet is a world-wide computer super-network, which is made up of a large number of component networks and their interconnections. Computer networks may consist of a wide variety of connected paths or network links serving to transport user information in the form of data between a diverse array of computer end systems. Different network links are more or less suitable for different network requirements. For example, a fiber optic cable typically provides a high bandwidth, low per bit cost, low error rate and low delay point-to-point network link. Alternatively, for example, a satellite link typically provides a lower bandwidth, higher per bit cost, higher error rate and longer delay point-to-multi-point network link. The wide variety of links and thus link characteristics encountered on the Internet, or other private (IP) based networks, have a variety of effects on the behavior of protocols in the IP suite.

IP primarily provides the routing functionality for packets (bits or bytes of data) over a network. It acts at the network layer to direct packets from their sources to their destinations. Transmission Control Protocol (TCP) is the reliable transport layer protocol of the IP suite of protocols and as such, layers on top of IP, provides reliability to applications, and builds on IP's unreliable datagram (packet) service. TCP underlies the vast majority, estimated to be around 90%, of all the traffic on the Internet. TCP supports the World Wide Web (WWW), electronic mail (email) and file transfers, along with other common applications. TCP was introduced in 1981 and since then has evolved in many ways, but today still provides reliable and largely efficient service over a wide variety of links as evidenced by its omnipresent nature. However, there are a variety of conditions under which TCP may perform below expectations, geosynchronous satellite links being one prime example. The problems of TCP over satellites has been previously documented. TCP performance is typically degraded to some extent in terms of lowered throughput and link utilization by, but not limited to, the following link characteristics: long delay, high bandwidth, high error rate, link asymmetry and link variability, all of which may be encountered on satellite and similar links.

In response to the established use of TCP and also of certain link types (such as satellite) which are not ideal for TCP, Performance Enhancing Proxies (PEPs) have been introduced TCP performance over geosynchronous satellite (GEO) links is traditionally very poor from a user perspective in terms of transfer time and throughput for web browsing and file transfer, among other applications relying on a TCP transport layer.

PEPs may function as one or more devices or pieces of software placed in the end-to-end path that suffers TCP performance degradation. PEP units may, for example, surround a satellite link. PEPs modify the traffic flow in an attempt to alleviate the issues of TCP traffic on a specific link. PEPs may use many methods, either alone or in concert, to enhance performance.

One type of PEP, known as a distributed, connection-splitting PEP is commonly chosen due to that fact that it allows for the use of a proprietary protocol across the satellite link. This protocol can then be chosen or designed to mitigate problems specific to the link. A distributed PEP uses more than one PEP device in an end-to-end connection, often two PEP devices are used. If two PEP devices are used, the end-to-end connection may be split into 3 connection segments. The end connections must remain TCP for compatibility, but the inter-PEP connection may be any protocol. Several protocols are available for use on the satellite link that provide improved performance over that of TCP. Examples of these protocols are Xpress Transport Protocol (XTP), Satellite Transport Protocol (STP), Space Communications Protocol Standards—Transport Protocol (SCPS-TP), standard or enhanced User Datagram Protocol (UDP) or even non-standard (modified) TCP. In addition to the protocol used, there are also many ways in which a PEP device may handle processing between connection segments in this type of system.

One of the link characteristics that affects TCP performance is delay. Links such as those over GEO satellites have long delays, for example, around 500 ms or more. Several TCP mechanisms that control connection setup, flow control and error correction through retransmission may be adversely affected by long delay links.

For transfers that are typically short in duration, such as web pages, the delays involved in establishing TCP connections make a proportionally larger contribution to the transfer time, and therefore to the mean data throughput rate. Additionally, a user typically begins to view a web page as it is downloading so an initial delay before any material is displayed may frustrate a user and also consequently, potentially cause re-requests which lower system efficiency.

The delay in connection opening is caused by a mechanism known as the TCP Three Way Handshake (3WHS). The purpose of this exchange of messages is to ensure that the other end point is present, and thereby to promote the reliability of a transfer. A connection initiator sends a packet with the SYN (synchronize) flag set. A responding system sends back a packet with the SYN and ACK (acknowledgement) flags set. The ACK flag acknowledges the initiator's SYN. The initiator then sends a final ACK packet acknowledging the responder's SYN. From this point on the initiator may send data. Thus, the delay from initiation to sending data on a TCP connection is a whole Round Trip Time (RTT).

When opening a TCP connection in a distributed split-connection PEP implementation, there are two main options and then variants thereof. For preserving end-to-end behavior of the connection and reliability, the connection should be opened end-to-end and the connection should be opened by the endpoints and not the PEP devices. Although more reliable than alternatives, however, this method involves a full RTT of overhead during which no data is transferred. An alternative method involves accelerating the opening of certain connections, such as web connections, which are of short duration and thus more heavily affected by extra RTTs.

An initiator sends a SYN packet to a PEP and the PEP responds locally with the SYN/ACK packet to the initiator. The initiator then responds with the ACK packet and the first data packet, which in the case of a web transfer is an HTTP request packet. The PEP then combines the original SYN packet (which it has held) and the first data packet and sends them over the satellite link to the other PEP device. The lower RTT on the terrestrial link means that the time taken to send the first request is reduced.

A problem with the above accelerated opening is that it is possible to open a connection locally that might then fail to establish end-to-end, resulting in a desynchronized state. This state will eventually time-out. However, during the time that the two endpoints are desynchronized, the user will be confused, as the connection appears to be established but no data will be transferred, which again could lead to the user re-attempting the connection several times and wasting bandwidth.

As described earlier, the Internet is a collection of networks and interconnections. These interconnections and network links each have their own characteristics. One characteristic is the Maximum Transmission Unit (MTU) size. This value, often expressed in bytes, is the maximum data payload that may be encapsulated and carried over the OS/ISO 7-layer model link layer without being broken down into a smaller unit. Two common technologies for LAN links are Ethernet and the similar, but not identical, IEEE 802.3 standards. Ethernet allows for the encapsulation of a 1500 byte IP packet (1500 byte MTU) while 802.3 encapsulation allows for a 1492 byte MTU. It can be imagined that in a network of heterogeneous links there will, sometimes, not be one common MTU for any path between points A and B in a given network or path through the Internet.

In response to the recognition that any given path through a network may not have a consistent MTU for all hops, the IP protocol allows for fragmentation of IP packets. If the IP layer at a host or router is unable to send a packet of the desired size onto the link, the IP layer will split that packet up into several smaller packets. When this behavior occurs at a router between ports, it is known as fragmentation and is commonly recognized to have detrimental side effects, such as lowering maximum data rate (through additional header bytes and also packet processing overhead at network nodes) and impacting efficiency. However, fragmentation is necessary to allow the data to pass end-to-end.

In an attempt to avoid fragmentation, the process of Path MTU Discovery (PMTUD) was introduced. The purpose of this process is to try to detect the minimum MTU in the path from source to destination. This value is dynamic if the route changes. The IP header has a flag, which may be set to inform intermediate network nodes (i.e. any devices in the network between the source and destination) not to fragment a packet. This flag is known as the Don't Fragment (DF) flag. When the DF flag is set, a router should discard the packet if it is too large to forward on the outgoing interface. The router should also send an Internet Control Message Protocol (ICMP) Can't Fragment (ICMP type 3 [destination unreachable], code 4 [fragmentation needed but don't-fragment bit set]) message back to the originator of the packet. This packet should contain the MTU of the outgoing interface on the router to inform the sender of the limiting MTU. Through this mechanism, a sender may adapt to the path MTU and avoid fragmentation. This mechanism is therefore desirable for efficiency reasons.

Currently, there is little guidance on how PMTUD should function in the presence of PEPs. In the absence of guidance, it is currently left to the decision of each PEP designer or manufacturer on how to handle the PMTUD mechanism at a PEP. One solution requires that ICMP messages pass through its PEP devices without modification. This allows for the sender to adapt its path MTU estimate and send smaller packets in the future.

However, a problem exists in a connection-splitting distributed PEP, due to the fact that the PEP devices are often buffering packets that are in transit between the endpoints. These packets have been acknowledged to the sending endpoint and are, therefore, no longer buffered by the endpoint itself for retransmission. Therefore, if a router drops a packet after the second PEP in the connection and an ICMP Can't Fragment message is sent to the originator, a problem occurs. The originator is able to lower the Path MTU estimate but cannot retransmit the data in the original packet. The second PEP in the connection has a copy of the packet buffered so may retransmit when no TCP acknowledgement arrives, but will not understand that the packet must be resized to a smaller packet to arrive successfully at the destination. Therefore, a deadlock may occur until several retransmissions of the packet have failed and the connection has to be reset.

One solution to this problem is that PMTUD may be disabled when a PEP is included in the end-to-end connection to allow the connections using the PEP to function correctly. This however is not ideal for the reasons stated above. Hence, problems exist in the current technique for PMTUD when PEPs are used.

Each protocol used on the Internet has its own packet format, which specifies the way that information is encoded in headers and where data begins in a packet, among other things. The TCP packet format includes the TCP header and space in the header for optional fields known as TCP options. Distributed connection splitting PEPs may use other (non-TCP) standard protocols and possibly proprietary protocols between the two PEP devices. These non-TCP protocols are used to gain performance advantages over end-to-end TCP and even split connection TCP, performance however is only one, although the most important, aspect of a PEP. A PEP must also be compatible with the end hosts and the TCP protocol. If the PEP to PEP protocol does not support the transfer of certain TCP information from end-to-end then functionality will be lost; the TCP urgent pointer which is used to expedite transfer of portions of the data stream being one example.

When choosing or designing a protocol for the problematic link there is, therefore, a tradeoff between efficiency and compatibility. If using an entirely different protocol, it may be necessary to carry the TCP information in extra header structures, which may increase the packet overhead on each packet. Increasing packet overhead may also trigger IP fragmentation for packets that were originally the maximum size for the link; this should be avoided. Also, the end-to-end path over which the connection travels may have intermediate equipment that does not know how to handle unknown protocols. For example, Network Address Translation (NAT) devices may perform translation of the IP address fields and sometimes layer 4 protocol port numbers also. These types of operations can then require the checksum fields to be updated. If a protocol is not recognized, it may not be able to function properly at, for example, the NAT device or packets may pass the NAT device but be unrecognizable at the receiver. Additionally, the functionality of a newly designed protocol will impose constraints on the information that must be carried in each packet. For the proprietary protocol chosen for use with the PEP design of this invention, no pre-existing packet structure was considered appropriate.

For problematic links, TCP has been improved by several different mechanisms to address different issues. For the case of packet and acknowledgement loss, TCP has been improved by the addition of the Selective Acknowledgement (SACK) option. This allows TCP packet headers to carry information on contiguous blocks of packets that have been successfully received. This mechanism adds overhead to each packet and although the overhead is only a small percentage on large packets (around 1% on a 1500 byte packet), the percentage overhead on a standard acknowledgement packet is much larger. For a 40-byte packet, an extra 12 to 20 bytes of SACK information is between an extra 30 and 50% of the original packet size. More seriously, if the TCP acknowledgements are carried over a link layer protocol such as Asynchronous Transfer Mode (ATM), a TCP acknowledgement with SACK information may no longer fit within a single ATM cell. If, instead, two cells are required for the acknowledgement then acknowledgement traffic volume is, in effect, doubled. If, for example, this is the return channel on a satellite system such as the Digital Video Broadcast-Return Channel Satellite (DVB-RCS) where most traffic may be acknowledgement traffic, then the total traffic volume may also be nearly doubled.

TCP also uses a cumulative acknowledgement scheme to signal correct reception of packets to the sender. Optionally, TCP may use the SACK option described earlier if higher packet loss rates are expected, as may often be the case over satellite links, for example. Whether standard TCP acknowledgements are used or whether the SACK option is used, the same method of acknowledgement must be used throughout the duration of the connection. If the error conditions on the link change during the course of the transfer, the connection performance may be adversely impacted if an inappropriate acknowledgement method is chosen. For example, if the standard TCP acknowledgement scheme is selected, the TCP transfer may suffer very poor performance or even failure under heavy error conditions. If the SACK scheme is chosen, the additional overhead, as described above, may be incurred even if the SACK scheme is not needed. TCP is unable to adapt the acknowledgement scheme to changing error conditions during the course of the connection. This problem exists with the conventional systems in the area of acknowledgement of packets.

TCP also uses a timer as one method of detecting lost packets and triggering retransmissions. However, in the conventional systems, only one timer is used regardless of how many packets are being sent. TCP uses the timer in the following manner. When there are no packets in transit, the timer is off. When the first packet is transmitted, the timer is set. When a packet is acknowledged and other packets are still in transit, the timer is reset. Therefore it may take different amounts of time to detect a packet loss depending upon which packet in a group is lost. In the worst case it may take up to the timer timeout value plus the round trip time to detect a loss. This time period may be almost twice as long as the detection period for loss of the first packet. In the ideal case, every loss should be detected as quickly as possible.

Additionally, and perhaps more importantly, if an acknowledgement scheme is used in which repeated retransmission triggers occur for the same packet, the single packet timer provides no indication of how long an individual packet has been in transit. This means that it is not possible to know if a transmitted packet has had time to be acknowledged or not. In this case, it is possible to retransmit a packet before it has had time to reach the destination and an acknowledgement be returned and received. This scenario lowers the efficiency of the link as packets are transmitted multiple times unnecessarily. This is a problem in the conventional systems related to controlling or limiting unnecessary retransmissions.

SUMMARY OF THE INVENTION

To meet these and other needs, a method and system is provided to improve upon the performance of TCP over a congested portion of a data communications link, and in particular, over a geosynchronous (GEO) satellite link. This is accomplished in part by replacing TCP with a new transport protocol, the Flight Protocol (FP) of this invention, over the wireless satellite link only, and maintaining TCP connections over the terrestrial portions of the end-to-end connection.

The inventive Flight Protocol addresses, and in part accesses, the characteristics of the satellite link, including its available capacity and error rate. The invention describes a method and system for use of an enhanced performance enhancing proxy (PEP) that improves the data throughput and transfer times, and achieves a higher utilization factor of the assigned link rates. In the preferred embodiment, the PEP of this invention consists of two main parts: the TCP Emulator and the Flight Protocol Processor. The PEP is designed to be used in pairs.

The TCP Emulator is present in the transmit and in the receive PEPs and behaves as if it is a TCP connection endpoint. The TCP Emulator transparently interrupts the TCP connection going from the client to the server and acts as a TCP endpoint. It translates TCP traffic into FP traffic. FP as used herein is the inventive transport protocol used over any congested communications links, and in the preferred embodiment, over a satellite link between the two PEPs. PEP1 is a FP packet Transmit PEP and PEP2 is a FP packet Receive PEP. The role of the TCP emulator depends on the function of the PEP. In the Transmit PEP, the TCP Emulator converts TCP segments into FP packets. The TCP Emulator in the receive PEP receives the FP packets, converts them back to standard TCP packets and transmits them over a new TCP connection to their final destination, which is one of the telecommunication system's two endpoints.

With the introduction of the two PEPs, the standard connection going from the server to the client is replaced with the following three connections:

1. A TCP connection from the server to the first PEP, PEP1 (gateway).
2. A FP connection going from PEP1 to PEP2 (terminal PEP).
3. A TCP connection from PEP2 to the client.

The TCP Emulator emulates a standard TCP connection between the external end user devices, the client and server, and converts TCP/IP packets into Flight Protocol (FP) packet 'shells'. The TCP Emulator filters TCP/IP packets entering from the outside world (the real end points) and emulates the TCP behavior of the destination transport layer. This behavior includes the TCP three-way handshake, acknowledgements, flow control, re-transmissions and all other TCP functionality. It also manages the flow of traffic to the Flight Protocol Processor section of the PEP.

The FP is the inventive transport protocol to be used over the satellite link between the transmit and receive PEPs, connected respectively to a terrestrial/satellite gateway and a user terminal. It is optimized to operate over this link by not using the TCP Slow Start and Congestion Avoidance algorithms, and instead, using the full available satellite capacity immediately and consistently throughout the lifetime of the connection, which also improves link utilization efficiency.

The inventive FP also avoids the delays associated with the TCP three-way handshake by not using a pre-data handshaking (negotiation) mechanism of any form. Instead the FP connection Initiator simply informs the remote entity that a new connection has been created and then immediately begins to send data. The assumption is that the FP connection will be created successfully unless evidence demonstrates to the contrary. The alternative rationale, as implemented by conventional TCP, assumes failure until success is explicitly signaled. This feature of the FP removes an additional one-off delay (per connection) that is significant for very small files or short duration transfers, such as those typical of current web pages that at present comprise the greatest volume of Internet traffic. This setup mechanism may be used with either a half or full duplex connection allowing for bi-directional data communication on a single connection or, alternatively, with two associated simplex connections.

BRIEF DESCRIPTION OF THE DRAWINGS

The invention will be more clearly understood from the following description in conjunction with the accompanying drawings (Figures and Tables), in which:

FIG. 13 is a flow chart of the Flight Protocol Transmit and Receive Buffer Algorithms.

FIG. 24 shows a configuration of FP packet number and FP acknowledgement number for different acknowledgement types.

FIGS. 30A & 30B are state tables for the transmit half of the flight protocol accompanying the transmit Flight Protocol state diagram.

FIG. 31 is a state table for the receive half of the flight protocol accompanying the receive Flight Protocol state diagram.

DETAILED DESCRIPTION OF THE INVENTION

Figure 1:
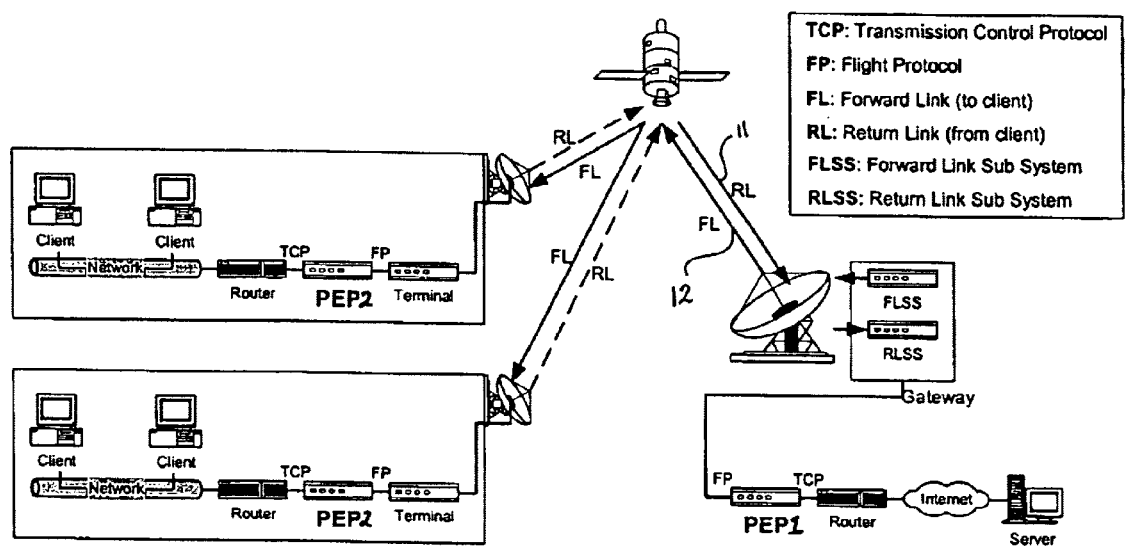
FIG. 1 is an illustration showing the overall satellite network with the location of the PEPs.

Referring to FIG. 1, PEP1 represents the behavior of a performance enhancing proxy (PEP) located at the gateway side of the satellite communication, in the case where data is being transferred from a server to a client. PEP1 receives TCP packets and transmits FP packets. Its TCP emulator is the receiving endpoint of a TCP connection from the server. Its TCP Emulator converts the TCP/IP packets into FP packets. PEP1 also handles the establishment and maintenance of a FP connection over the satellite link and the reliable delivery of FP packets to their destination: PEP2. PEP1's FP Transmit Buffer will store a copy of every single FP packet that is transmitted over the satellite link. PEP1 will also retransmit or discard stored FP Packets on receipt of FP acknowledgements from PEP2.

PEP2 represents the behavior of a PEP located at the terminal side of the satellite communication, in the case where data is being transferred from a server to a client. It receives FP packets and transmits TCP/IP packets. The FP packets coming from PEP1 are error checked and ordered before being forwarded to the TCP Emulator. PEP2 sends FP acknowledgements to PEP1 to instigate the retrieval of missing FP packets. If the received FP packets are not in order, they will be buffered in the FP Reassembly buffer until the missing FP packets are received. Once the missing FP packets are received, then the buffered FP packets can be retrieved in the proper order and passed to the TCP emulator. The TCP Emulator converts FP traffic into TCP/IP packets. PEP2 also opens a standard TCP connection with the client and forwards the TCP/IP packets that it generates. The TCP Emulator has a TCP transmit buffer where it stores transmitted TCP/IP packets.

The TCP Emulator is a functional element of a PEP. It transparently intercepts the standard TCP connection going from the server to the client (or vice versa). It manages the TCP connections as if it were the final end point of the transfer. It allows for the replacement of TCP over the satellite link with FP, the transport protocol of the invention, between the two PEPs. The role of the TCP emulator in a data transfer depends on a PEP's relation to the direction of file transfer. For a server-to-client transfer the TCP Emulator (in PEP1) translates TCP/IP packets into FP packets. Then the TCP Emulator of the receive PEP (PEP2) translates those FP packets back into standard TCP/IP packets and transmits them over a second TCP connection to their final destination.

The Flight Protocol Processor is another functional element of a PEP. It manages the transfer of FP packets between PEPs and generates acknowledgements and re-transmissions of FP data packets. It receives FP packet shells, completes the empty FP header fields and transmits FP. It consists of Transmit and Receive algorithms, two buffers, and Send and Receiver Acknowledgement algorithms together with other sub-routines.

"TCP spoofing" describes the process by which TCP packets belonging to a certain connection, or to many connections, are intercepted by a certain node along the way to the final destination. This node will behave like the TCP endpoint to which the TCP segments were destined. It will not forward those TCP segments to any other nodes and will generate local acknowledgements to the TCP connection Initiator.

An "end-to-end connection" with PEPs going from the server to the client will consist of the following three connections:

a standard TCP connection from the Server to PEP1
a FP connection going from PEP1 to PEP2
a standard TCP connection from PEP2 to the Client.

A FP Transmit Buffer is located in every PEP. A copy of every FP packet transmitted (e.g. over the satellite link) will be stored in this buffer and will remain in it until the FP acknowledgement packet (ACK) of the transmitted packet is received by the sending PEP. The FP Transmit Buffer will also store the time of transmission or retransmission of each packet. In the case where the ACK for a transmitted FP packet is not returned within a certain time, the FP packet will be copied from the buffer, retransmitted and the retransmission time updated in the FP Transmit Buffer.

Optionally, it is possible to store in the buffer a time limit corresponding to the latest time that an acknowledgement for the transmitted or retransmitted packet should be received if the transmission was successful. The benefit of this approach is that this calculation is made once. Comparisons to see whether an acknowledgement for the packet is overdue or not can be made directly to the stored value. Should the time of transmission or retransmission be stored directly, each time a comparison is carried out the round trip time and any other possible delays in the time between data transmission and acknowledgement reception must be subtracted from the current time. If a comparison is done more than once, the method of storing the expected acknowledgement arrival time will be more efficient. In any event, it should not be less efficient. The time and time values used may be related to a clock used anywhere in the system running in real or pseudo time.

In calculating the time taken for an acknowledgement to be received, it may be necessary to consider delays due to transmission, processing delays of the transmitter and receiver units in both transmitting and receiving data packets and acknowledgements. In addition, if a timer of any form is used to delay and combine acknowledgements, then this value must also be accounted for. Variability due to queuing or prioritization of traffic, possibly in relation to Quality of Service (QoS), must also be considered. The aforementioned items are not intended to be an exhaustive list, but merely to provide examples of the types of delays, that may have to be considered. Variable delays should be represented by their maximum value where available, to minimize unnecessary retransmissions.

A FP Reassembly Buffer is located in every PEP. This buffer will store all the FP packets that have been received without corruption by a PEP (e.g. via the satellite link), but do not extend the effective left edge of the FP receive window. These packets are called out of sequence packets. Once the missing packets are received, the effective left edge of the window will be extended and the FP packets that fall between the old and new effective left edges of the window will be retrieved from the buffer and forwarded to the TCP Emulator. This buffer assures the contiguity of the sequence of packets passed for translation to the TCP Emulator.

The FP receive window is a mechanism that indicates the state of the transmitted FP packets over the satellite link as seen by PEP2 (the receiving PEP in our example). It shows which FP packets have been received and which have been lost. The window has a left edge and a right edge which change dynamically upon the arrival of FP packets at PEP2. Each edge corresponds to a certain FP packet number. Any packet number that is below the left edge, i.e. whose FP packet number is smaller than that of the left edge, is a packet that has been received and that has been forwarded to the TCP emulator. A number of holes will exist where packets have not been received. Packets received uncorrupted are stored in the FP Reassembly Buffer. Finally, FP packets whose packet number is higher than the right edge of the window correspond to packets that are either in flight or were not yet transmitted by PEP 1.

As an example of the window's operation, assume that FP packets 1, 2, 3, 5 and 7 are received by PEP2. Then the left edge of the window will be at FP packet number 4, which is the first missing packet. The right edge of the window will be FP packet 8. Packet 5 and 7 are stored in the reassembly buffer waiting for the arrival of FP packets 4 and 6. Packets 1, 2 and 3 are forwarded to the TCP Emulator and then to the communication endpoint.

Once FP-packet number 4 is received, then the left edge of the window will move to the next missing and expected FP packet, i.e. packet 6. Packet 5 will be retrieved from the buffer and packets 4 and then 5 will be forwarded in order to the TCP Emulator. The right edge of the receive window will remain at packet number 8 until a packet with a FP packet number higher than 7 is successfully received.

The FP Transmit Buffer stores every single FP packet that is transmitted over the satellite along with its time of transmission. If a packet is retransmitted, the time of retransmission is recorded. Re-stamping the packets is the process of updating the transmission time of a particular packet upon retransmission.

If a FP packet has been transmitted by PEP1 over the satellite link but no ACK has yet been received by PEP1 then it is said to be "outstanding" or an "outstanding packet".

A Grounded packet is a FP packet that has not been acknowledged and more than one Round Trip Time (RTT)+ Epsilon has elapsed since its transmission (or re-transmission). Epsilon refers to the time taken by PEP2 to receive and process the FP packet and to generate an ACK packet for it.

The state of a FP packet that has been transmitted for no longer than one RTT+Epsilon is referred to as "in-flight", or being an "in-flight packet." Epsilon refers to the time taken by PEP2 to receive and process the FP packet and to generate an ACK packet for it.

An FP packet is the format of a TCP/IP packet that is using the Flight Protocol as its transport protocol. The Flight Protocol will be used over the large bandwidth-delay portion of the telecommunications link (i.e. the satellite link). In a server to client data transfer PEP1 will convert the standard TCP packet to a FP packet and PEP2 will revert it back to a standard TCP packet.

A FP hole refers to the case where a FP packet was not received at a PEP, creating a gap in an otherwise contiguous block of packets. The presence of a hole stops the progression of the left edge of the receive window until the hole is filled, i.e. the missing/delayed packet is received.

A FP packet shell is a TCP packet that has been translated by the TCP Emulator of a PEP and is passed to the FP Processor Sections. It has the FP packet format but does not have all its header fields initialized, these are completed by the FP Processor.

A TCP/IP packet is a TCP segment prepended with an IP header.

In terms of the algorithms used in the invention's system and method, a continuously running algorithm is a core algorithm that is shared by every Flight Protocol connection and is running continuously. An event driven algorithm is an algorithm that might be called by a certain Flight Protocol connection and that will affect that connection alone for a certain period of time. The Send ACK and Receive ACK algorithms are continuously running algorithms, but also have event driven sections in them.

Figure 2:
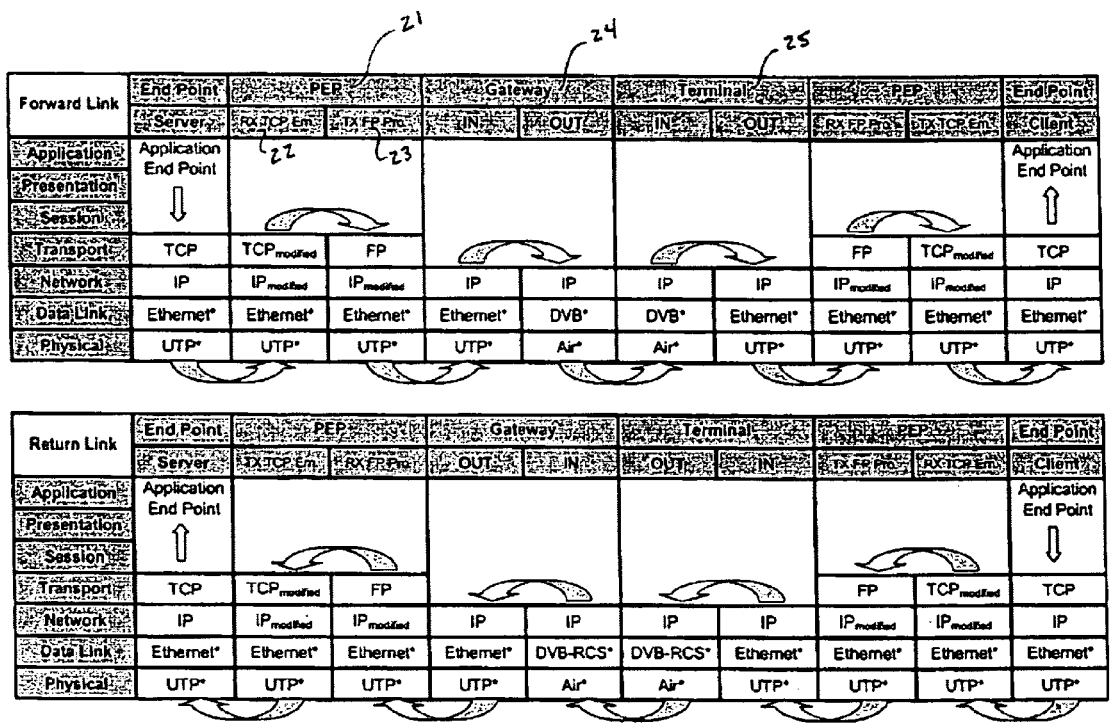
FIG. 2 is a representation of the PEP/TCP end-to-end satellite protocol stacks for TCP/IP utilizing the PEPs.

FIG. 2 shows how the network protocol stacks implemented in the PEPs and how they interface to the TCP.

All unencrypted TCP connections, i.e. those not using IPSec or other PEP-incompatible security protocols, are managed by the PEPs located at the gateway and the terminal. Each PEP 21 consists of a TCP Emulator 22 and a FP Processor 23. The TCP Emulator 22 emulates a standard TCP connection to the external end user devices (client and server) and converts the TCP packets to FP packet shells. It also manages the flow of traffic to a satellite-specific transport protocol for use over the satellite connection, termed the Flight Protocol. The FP is a transport protocol that replaces TCP over the satellite link between a user terminal and a terrestrial/satellite gateway.

In all cases, the IP addresses of the packet are preserved as the PEP passes the FP data packets to the gateway 24 or terminal 25 to be queued for transmission, before being sent over the satellite link. The combined PEP operation of the TCP Emulator and FP Processor are described below.

Figure 3:
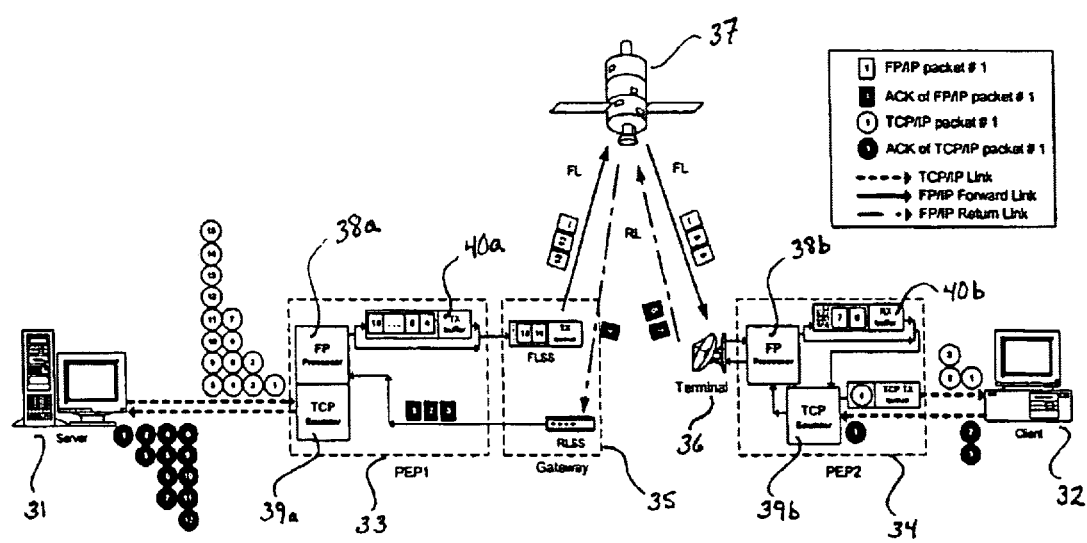
FIG. 3 is an illustration of the PEP scheme showing the flow or transmission of data packets over the satellite link.

FIG. 3 shows the PEP scheme, being an end-to-end satellite link with the PEPs, assuming that the Initiator 31 is on the gateway 35 side and the Responder 32 on the terminal 36 side. A TCP connection appears to the user to exist between the server and the client, however the satellite element of the link is enhanced by the use of PEPs at each entry point (PEP 133 at the gateway 35 and PEP2 34 at the terminal 36).

A PEP configuration can be used with more than one PEP device, in which case another, or other, PEPs may be situated in geographically distinct locations. The use of multiple PEPs in a communications system is known as a distributed PEP implementation.

When two PEPs are used, as shown in FIG. 3, this results in two TCP connections: one between the Initiator 31 and PEP1 33 and one between PEP2 34 and the Responder 32. In addition, a third set of connections (one simplex FP connection per direction) is established between PEP1 33 and PEP2 34, over the satellite. As shown in FIG. 3, multiple packets are launched from the gateway side, PEP1 33, without having to wait for any acknowledgement signals (ACKs) from the terminal side, PEP2 34. The satellite 37 portion is modified by the use of the FP to provide the user low transfer times and high throughput while making efficient use of allocated bandwidth (BW) for the service provider.

The PEP scheme itself is symmetrical in both directions, except that the return and forward paths use different capacity prediction algorithms. The return path algorithm uses measured Signal-to-Noise Ratio (SNR), the gateway received SNR (or power control adjustment) coupled with its requested/allocated slots and terminal queue status to determine the available return channel capacity.

The TCP connection is split into three continuous communication links: two standard TCP connections interleaved by a FP connection. The gateway PEP (PEP 133) acknowledges and stores received TCP segments from the Internet Service Provider (ISP). This allows a standard TCP connection to exist between the server 31 and the gateway PEP (PEP1 33), so as not to impact on the terrestrial network. The delay of the links between the gateway 35 and the server 31 are expected to be short, at least in contrast to the GEO satellite link delay.

The PEP operation is summarized as follows:

1. The server 31 sends TCP data to the client 32 over what appears to the server to be a TCP connection. The server 31 and the client 32 are unaware of the existence of the PEPs 33 and 34 in between them, which use the FP over the satellite 37 link. The gateway PEP (PEP1 33) filters out TCP/IP packets and replies to the server 31 (using TCP ACKs) as if it were the client 32. The gateway PEP (PEP1 33) produces packets suitable for transmission over the satellite 37 link (FP Data Packets) and forwards the packets to the gateway 35 to be queued for transmission. A TCP three way handshake is not implemented over the satellite portion of the link: as soon as TCP/IP data carrying packets arrive at PEP1 33 they are converted to FP packets and sent. The TCP connection that exists between the server 31 and PEP1 33 increases transfer rate very quickly due to the low terrestrial delay and quasi error free (QEF) bit error rate (BER). The server 31 continues to send TCP/IP packets until completion of the requested data transfer.

2. The gateway 35 is forwarding information concerning capacity on both the forward and return channels to capacity prediction algorithms. In addition, the signal-to-noise ratio (SNR) conditions are fed from other reference terminals (not shown) co-located at the gateway to the 'Capacity Prediction Algorithm'. The said algorithm estimates the available forward channel throughput given the prevailing traffic and BER conditions.

3. The Flight Protocol (FP) Transmit Processor 38a of the gateway PEP (PEP1 33) now governs the transportation of data over the satellite 37. It uses the FP and allows the maximum use of bandwidth (BW) by not using techniques such as the Transmission Control Protocol (TCP) congestion control algorithms (Slow Start and Congestion Avoidance) and eliminating the TCP three-way handshake. For example if 10 Mb/s is available in the forward direction then the transfer rate (from gateway PEP 33 to terminal PEP 34) is set to 10 Mb/s. Furthermore if the available capacity changes then the applied data rate changes accordingly.

In general, where a reduction in the forward rate capacity occurs it may be necessary to back off the incoming traffic from the ISP to prevent buffer overflow. This is achieved by the PEP (i.e., the TCP Emulator 39a) varying the rate of conventional TCP ACKs sent from the PEP to the TCP traffic origin (the server 31 in the case of the gateway PEP 33).

4. Returning to FIG. 3, data now flows in the forward direction to the terminal 36, which in turn forwards the FP packets to the terminal PEP (PEP2 34), which translates to TCP/IP packets and sets up a TCP connection to the end user device (the applicable client 32). The transmission from the terminal PEP 34 to the client 32 employs TCP so as not to impact the end user's choice of equipment (i.e. they can happily purchase standard hardware and software). Thus the use of FP is completely transparent to the client and server end points. A FP Reassembly Buffer 40b is used in the terminal PEP 34, such that FP packets may be reordered first and then transmitted as TCP/IP packets, in the correct order, to the client. In addition, at the gateway PEP 33, all the dispatched FP packets (from the queue) are also stored in a FP Transmit Buffer 40a and marked with the transmission time. This ensures that they are ready for retransmission in case a timer expires or an ACK for a packet with a higher FP packet number arrives to the gateway PEP (PEP1 33), indicating a transmission loss. The above description highlights the PEP sections utilized in an example data transfer, and it should be noted that both the gateway and terminal PEPs are identical except for the possibility of scaling for performance reasons, the gateway PEP obviously handling more connections.

5. Providing no errors occur, the terminal PEP 34 receives FP packets, converts them to TCP/IP packets and forwards them to the client 32, in substantially quicker time than compared to a single server to client TCP connection. The terminal PEP 34 sends FP ACKs in the return direction for each uncorrupted FP packet. The ACK generation scheme that FP employs could be classified as a selective acknowledgment scheme because it acknowledges the FP packets that are received after an FP packet that was discarded and whose packet number is higher than that of the discarded FP packet.

6. On receiving FP packet ACKs from the terminal PEP 34, the gateway PEP 33 discards the buffered FP packets from its FP Transmit Buffer 40a because they are now acknowledged.

7. In the event of corrupted/discarded FP packets and a lack of FP packet ACKs from PEP2 34 to PEP1 33, the missing FP packets are copied from the gateway PEP Transmit Buffer 40a and are re-inserted into the forward stream queue for transmission to the terminal. This is triggered either by a FP ACK arriving and PEP1 33 determining that a packet, whose FP packet number is smaller than that of the received ACK, is still in the buffer 40a. (For example a FP ACK is received for packets 1 to 5 and 7 to 10 out of a 10 packet transmission. PEP1 33 would check the buffer on receipt of FP ACK 7 and determine that packet 6 did not arrive successfully at PEP2 34.) Or after a timeout occurs at the gateway PEP 33. A timeout occurs if no ACKs arrive in a given time and a PEP timer expires. To avoid needless retransmissions of packets an 'in-flight/grounded' concept exists. ('In flight' refers to packets that have been transmitted and could not have been acknowledged yet. For example if a packet were transmitted at time 0 and the round trip time (RTT) were 800 ms, the packet would be 'in-flight' until 800 ms had elapsed and 'grounded' thereafter.) As described earlier, upon transmission of a FP packet, a duplicate of it is stored in the FP Transmit Buffer 40a with the transmission time. Before a FP packet is retransmitted, it is tested to see if it is 'in-flight' or 'grounded' by comparing the current time with its transmitted time and an RTT measure. Provided it is 'grounded' it is retransmitted and the new transmission time is updated in the buffered copy.

8. When receiving a FP ACK for a retransmitted packet, PEP1 33 (at the gateway) should delete the packet from its FP Transmit Buffer 40a.

9. In general, User Datagram Protocol (UDP) and IP Security (IPSec) traffic is not modified by the PEPs. UDP and IPSec do not benefit from the performance enhancements that the PEPs provide. So as to avoid the PEP interfering with the behavior of any devices implementing quality of service in the end to end path, all packets (whether modified for acceleration or not) must leave the PEP in the order in which they arrived. In fact, unmodified packets may be subjected to a small absolute delay inside the PEP (i.e., PEP1 33 or PEP2 34), equal to the PEP processing delay, in order to avoid prioritizing this traffic over TCP traffic. The intended result is a zero relative delay between accelerated and non-accelerated traffic after exit from the PEP.

Figure 4:
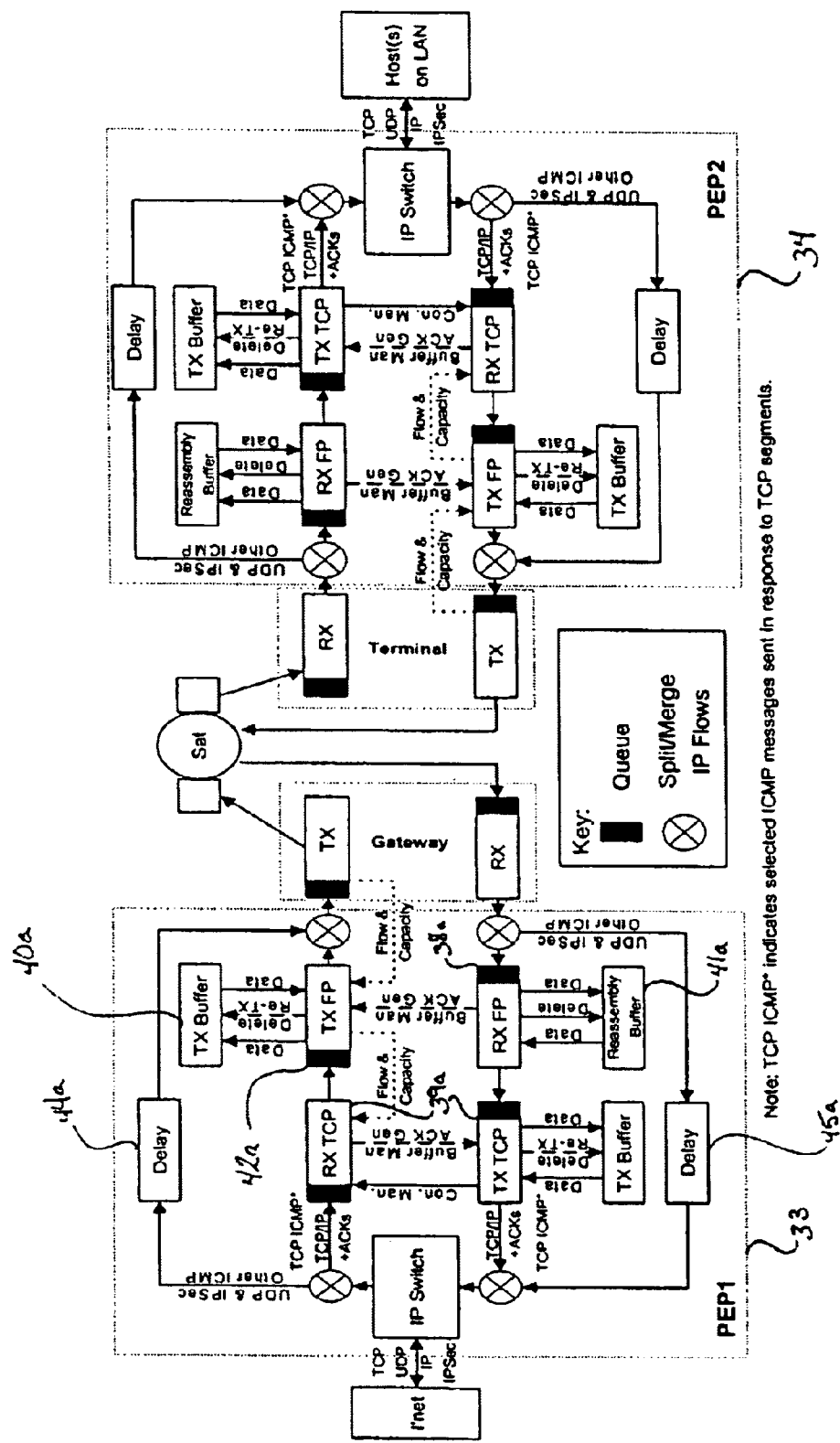
FIG. 4 is a block diagram showing the functional partitioning of the PEP into the two main parts; the TCP Emulator and the FP Processor, each in turn consisting of transmit (TX) and receive (RX) units.

The PEP can conceptually be broken into two major functional units, a TCP Emulator (39a, 39b) and a FP Processor (38a, 38b). In addition the PEP 33 has two buffers, a FP Transmit Buffer 40a and a FP Reassembly Buffer 40b as shown in FIG. 4. It is anticipated that the PEP functional units might utilize underlying hardware, such as one or more network interfaces, one or more satellite interfaces, and an intercommunicating bus connecting memory and processor units. As an example, in simplistic terms, on the forward link (FL) the Receive TCP Emulator 39a in the gateway receives a TCP/IP packet containing a TCP segment, associates it to a TCP connection, acknowledges it and converts it to a FP packet shell. This shell has the remaining fields, such as the FP packet number and checksum, filled in by the Transmit FP Processor 38a. The Transmit FP Processor 38a determines if the packet can be sent by calling a capacity prediction algorithm and, provided there is sufficient capacity, passes the packet to the gateway or terminal for transmission. In addition, a copy of the FP packet is stored in the FP Transmit buffer 40a. The terminal Receive FP Processor 38b receives the FP packet and generates an ACK (using the FP ACK scheme) then passes it to the Transmit TCP Emulator 39b (which, for the initial packet of a connection, sets up a standard TCP connection with the client). On receipt of a FP ACK at the gateway PEP 33, the acknowledged FP packet is removed from the FP Transmit Buffer 40a. Finally the TCP Emulator 39a converts the FP packet into a TCP/IP packet and sends it to the communication end point 31. Once the TCP segment arrives at the real end point, a TCP ACK is generated and sent back to the terminal PEP 34.

PEP 33 and 34 filter all traffic by transparently passing all non-TCP and non-TCP related Internet Control Message Protocol (ICMP) and all encrypted TCP traffic around the TCP Emulator (39a, 39b) and FP Processor (38a, 38b) sections of the PEP, avoiding modification. All non-encrypted TCP/IP traffic is converted to FP packet shells by the Receive TCP Emulator 39a, which passes these FP shells to the Transmit FP Processor 38a to be completed by filling in the FP packet number and the FP Cyclic Redundancy Check (CRC). The only exception to this rule is a subset of TCP-generated Internet Control Message Protocol (ICMP) messages. This function may be performed by filtering out all the IP packets with an IP protocol field set to 6 (i.e. TCP) and selective filtering all IP packets with an IP protocol field set to 1 (i.e. ICMP); see below.

ICMP traffic is filtered for specific message types and codes generated in response to TCP traffic. The TCP Emulator (39a/39b) performs the processing of ICMP messages.

Referring next to FIG. 4, this shows FP Transmit buffers 40a as used in the FP transmit section 42a of the PEP 33 to store copies of all transmitted FP packets in order to facilitate retransmissions, thus ensuring reliable delivery. Additionally, the FP Receive Processor section 38a of the PEP 33 has a reassembly buffer 41a used to reorder/reassemble the FP data stream in the case of missing or corrupted FP packets. The TCP Emulator section 39a of the PEP 33 relies on the underlying TCP stack and its normal behavior to accomplish the tasks of reliable transmission and reassembly.

Also included in the PEP 33 are two delay units 44a/45a that are used to apply an absolute delay, which will result in a zero relative delay to the traffic that is not processed by the PEP. Thus the unprocessed traffic won't be prioritized over the processed traffic. A delay is necessary for each time traffic is processed in each direction of flow, thus with paired PEPs 33 and 34, there are 2 delays per direction of data flow. The traffic that goes through the PEP and is processed is comprised of TCP packets. If these delays were not there, traffic requiring the same class of service would not be treated fairly, for example User Datagram Protocol (UDP) traffic would always be prioritized over TCP of the same priority class when a Quality of Service (QoS) system is used. In particular, any First-In, First-Out (FiFo) (QoS) mechanism susceptible to dropping packets as queues fill will consistently lose a disproportionate volume of any protocol's traffic that is delayed as opposed to a protocol's traffic receiving no delay. This behavior is clearly not acceptable if the PEP is intended, ideally, not to interfere with other systems.

Figure 5:
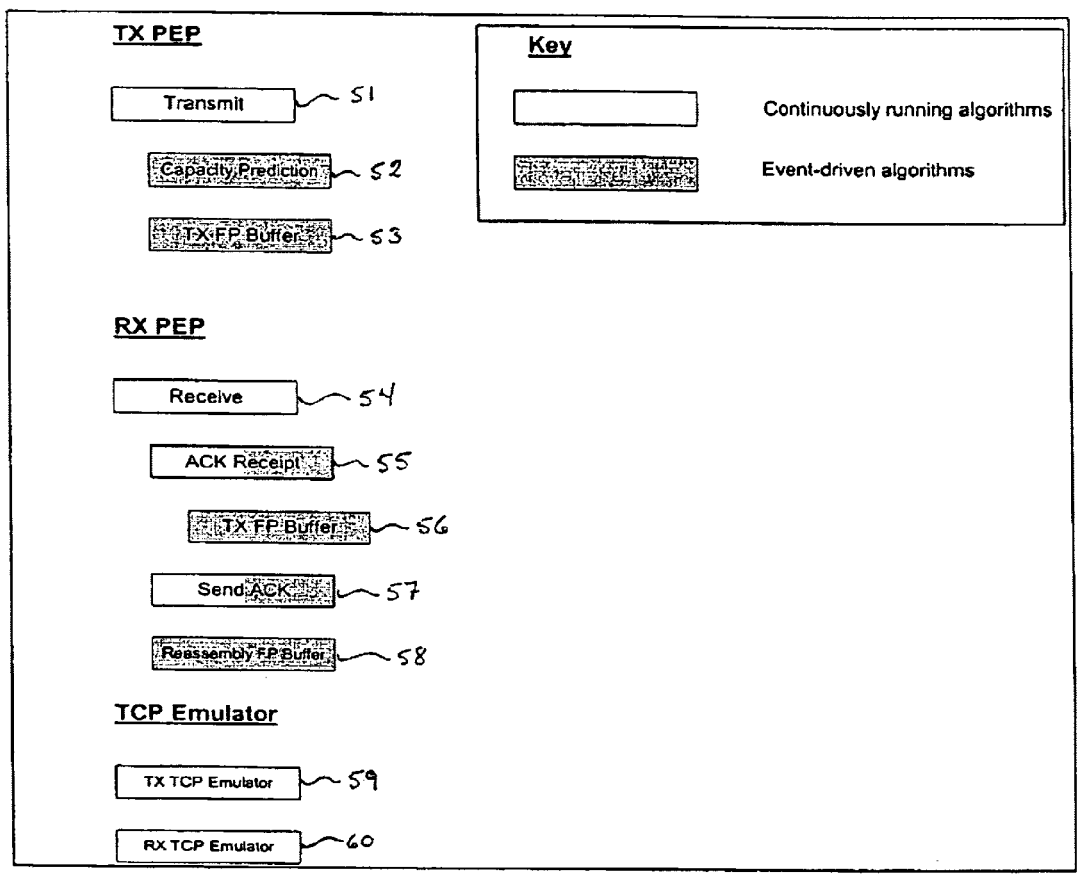
FIG. 5 is a diagram showing the interaction and call hierarchy of the PEP algorithms.

The interaction and hierarchy of the PEP algorithms is shown in FIG. 5. The Transmit FP Algorithm 51 calls the relevant Capacity Prediction Algorithm 52 to determine when and if to transmit a packet. Likewise, the FP Transmit Buffer Algorithm 53 is called to store, recover (plus re-stamp) and delete FP packets; the re-stamping moves data from a 'grounded' state to any 'in-flight' state by stamping packets in the buffer with the time of retransmission. On receipt of a packet via the satellite, the Receive FP algorithm 54 calls the Send ACK algorithm 57. Also the FP Reassembly Buffer algorithm 58 is called, either to store the received packet or retrieve previously received packets, where the new packet completes a contiguous sequence, before passing the block of data packets to the TCP Emulator.

At the originator end, the FP ACK Receipt Algorithm 55 and FP Transmit Buffer Algorithm 56 are called from the FP Receive Algorithm 54 (to handle ACKs and delete acknowledged packets). In addition, both Send ACK 57 and Receive ACK 55 algorithms are spawned for each connection during setup and are alive and operational for the duration of the connection. For example, for a one-way data transfer from gateway (FIG. 3, 35) to terminal (FIG. 3, 35), an ACK Receipt algorithm 55 would be spawned at the gateway and a Send ACK algorithm 57 at the terminal. The job of these algorithms is to manage timers which re-send data (if no ACKs arrive) or re-send ACKs (if no data arrives).

There are two algorithms that implement the functionality of the TCP Emulator sections. The TCP Emulator Receive Algorithm 60 is layered above a TCP/IP network stack and receives IP datagrams (with TCP and IP headers still intact) from the stack for translation to FP packet shells. Examples of how this might be done include, (1) through the use of the raw sockets interface available in certain operating systems, or alternatively, (2) through a customized TCP/IP stack. The TCP Emulator Transmit Algorithm 59 receives FP packet shells and reformats them to pass a TCP/IP packet to the modified TCP/IP stack. Both these algorithms are operational for all the TCP connections they are interfacing with, as opposed to a copy being spawned for each connection, since the TCP stack and the PEP algorithms manage state information for the TCP and FP connections, respectively. The TCP Emulator algorithms 59 and 60 simply act as translators from TCP to FP and vice versa. The translation covers both the packet itself and the in-band control and signaling for such events as new connections and closing or aborting a connection.

In order to be able to split the end-to-end TCP connection into three parts (TCP-FP-TCP, so that a satellite optimized transport protocol may be used) and still have the appearance of one end-to-end TCP connection, the TCP Emulator must function as both a TCP endpoint and a protocol translation unit. Two concepts, as mentioned earlier, are transparency to the end user and performance enhancement. Transparency dictates that the TCP Emulator should behave as if it is a TCP endpoint.

The TCP Emulator consists of two distinct algorithms, the Receive Emulator Algorithm 60 and the Transmit Emulator Algorithm 59. Receive and Transmit nomenclature is from the perspective of TCP received and transmitted; the Transmit Emulator Algorithm 59 and Receive Emulator Algorithm 60 emulate the transmit and receive sides of the TCP connection respectively.

The TCP Emulator's two algorithms are part of a modified FP-TCP/IP stack and are used to interface TCP to FP and vice versa. The IP layer will check the checksums of received datagrams and reassemble fragments if necessary. The Maximum Segment Size (MSS) of the FP packet will be equal to the Maximum Transmission Unit (MTU) of the TCP packet minus 40 bytes, independent of whether the TCP segment got fragmented by the IP layer or not. Datagrams for any destination address will be examined by the PEP as it must intercept all traffic. The IP layer need not perform many of the routing tasks performed by standard IP layers as the IP headers and options are passed end to end, unmodified over the satellite hop. The IP layer must, however, be able to forward TCP/IP packets to both the terrestrial network and the satellite network.

The TCP layer provides the standard mechanisms for opening a TCP connection, closing a TCP connection, resetting and sending data. These functions will need to be modified to take the full socket pair rather than just the foreign socket as the PEP is effectively 'spoofing' the source IP address for all connected systems. These functions will wrap the actual TCP/IP stack functions and add extra functionality, such as allowing data to be sent on synchronize packet (SYN) and finish packet (FIN).

Figure 6:
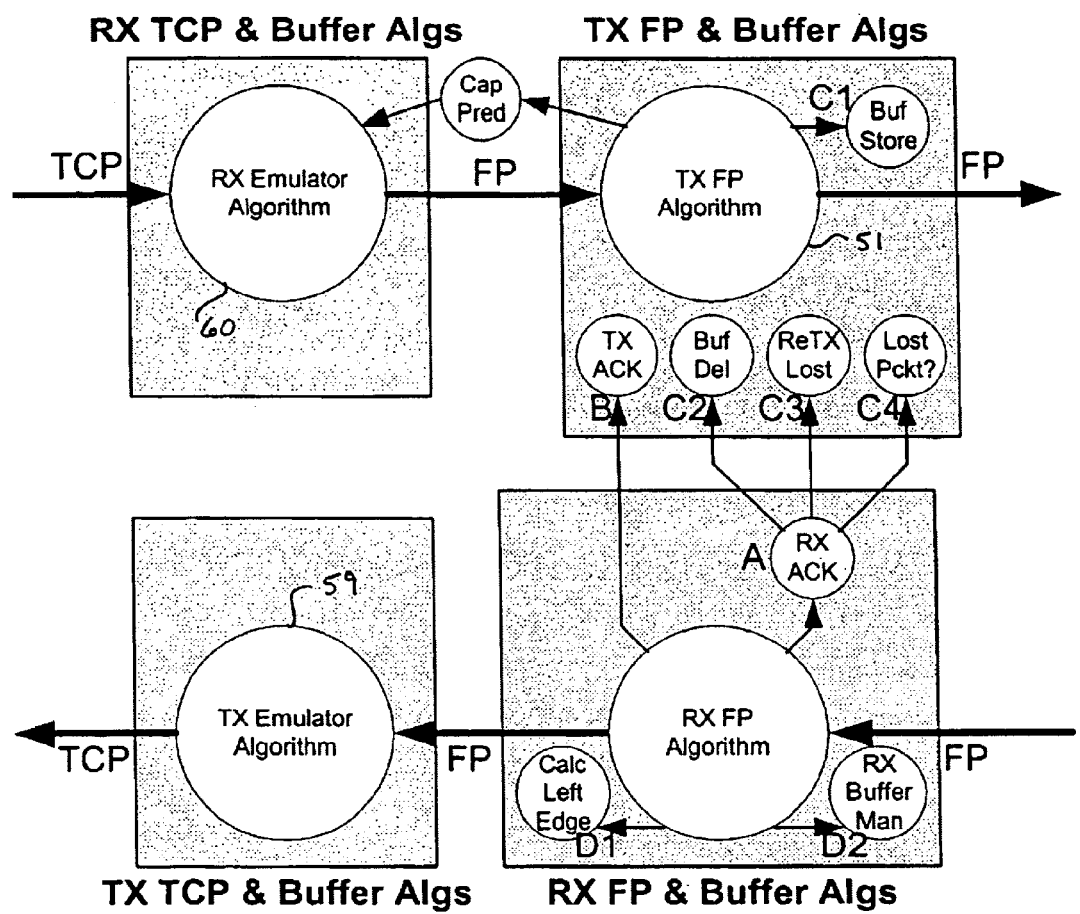
FIG. 6 is a diagram showing examples of the flow of data between logical groupings of PEP algorithms into the two main parts: TCP Emulator and FP Processor.
Figure 9:
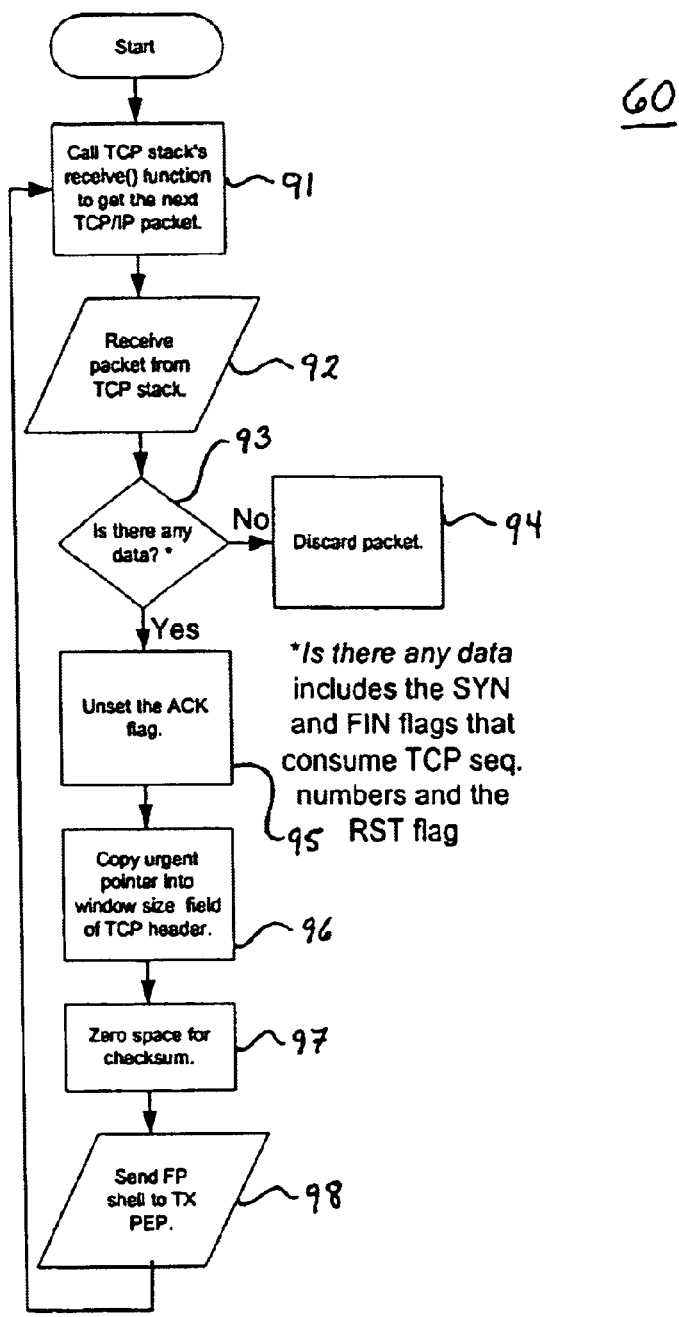
FIG. 9 is a flow chart of the Receive TCP Emulator Algorithm.

As discuss above, the TCP Emulator Algorithms consist of a Received algorithm and Transmit algorithm. The Receive TCP Emulator algorithm 60, in the context of the overall PEP, is shown in FIG. 6, and the algorithm flow chart is shown in FIG. 9. As shown in FIG. 9, the receive TCP emulator calls for the TCP/IP packet in step 91. In step 92, receives incoming TCP/IP packets (with headers intact) passed up from the modified TCP stack. The algorithm converts incoming TCP traffic to outgoing FP packet shells as follows. A TCP/IP packet is received at the Receive Emulator Algorithm 60 from the modified TCP/IP network stack. If the packet contains no user data or SYN, FIN or Reset (RST) flags, i.e. it is a pure TCP ACK, then in step 94 it is discarded. Otherwise, in step 95, the ACK flag is cleared, i.e. zeroed, signifying the TCP ACK number field is not valid and allowing reuse of the TCP ACK flag by the FP. The TCP Urgent Pointer field is then copied over the TCP Window Size field in step 96 to allow space for an extended and improved error detection mechanism in the FP packets. In step 97, the space for the 32-bit CRC (TCP Checksum field plus the TCP Urgent pointer field) is then zeroed in preparation for the CRC calculation by the FP processor. These so-called FP packet shells (due to their uncompleted nature) are then passed to the Transmit FP Processor in step 98. This is the first part of the process of translating TCP packets to FP packets. The FP transmit algorithm (FIG. 6, 51) of the FP Processor (38*a*/38*b*) then calculates the CRC over the packet, including the FP header but not the Internet Protocol (IP) header, and stores it in the CRC field created by the TCP Emulator Receive Algorithm 60. Managing connection state information with the outside world, the real end points, is left to the TCP/IP stack.

Figure 8:
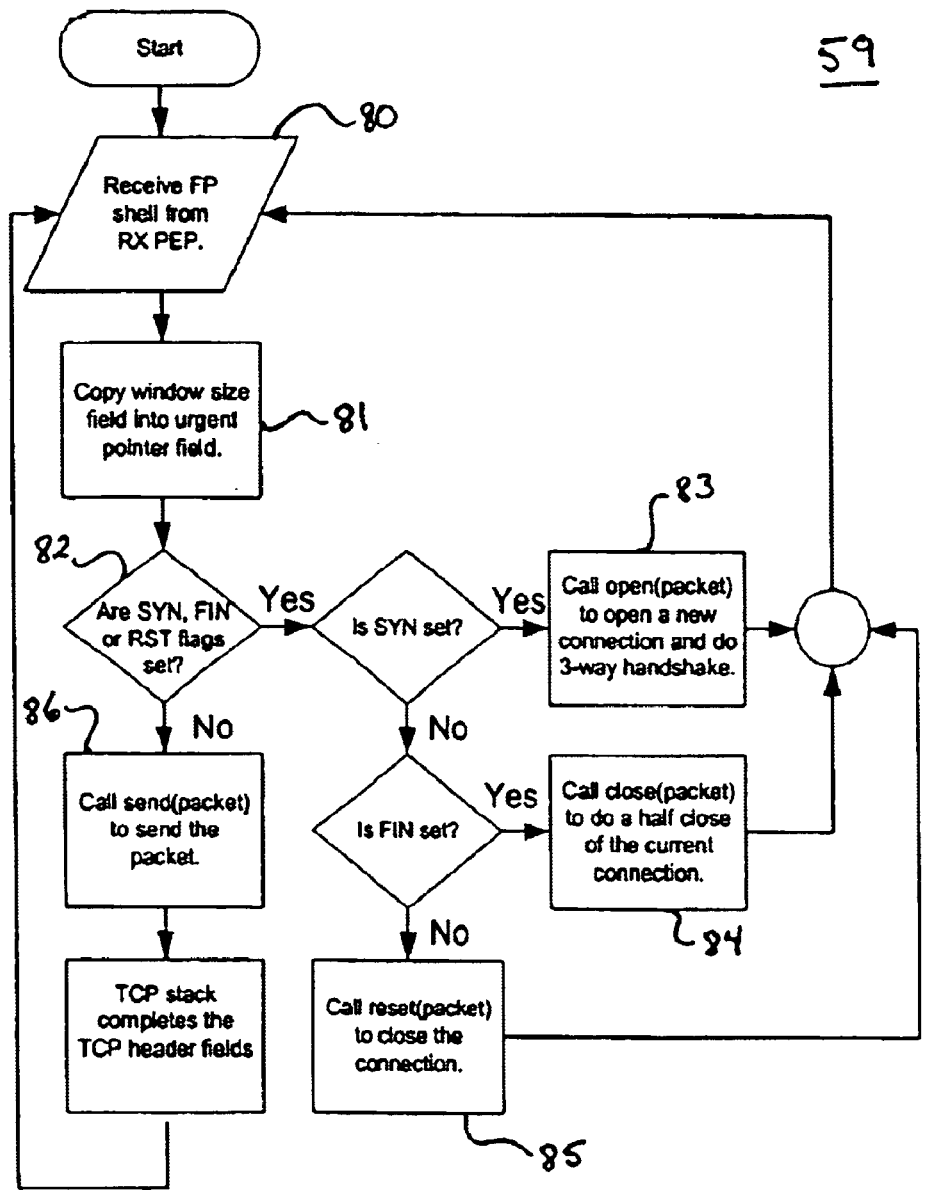
FIG. 8 is a flow chart of the Transmit TCP Emulator Algorithm.

The Transmit TCP Emulator Algorithm 59, in the context of the overall PEP, is shown in FIG. 6, and the algorithm flow chart is shown in FIG. 8. As FIG. 8 shows, Received FP packets are forwarded (after step 80) to the Transmit TCP Emulator Algorithm 59 to be converted to outgoing TCP/IP traffic. The Transmit TCP Emulator Algorithm 59 first, in step 81, copies the contents of the TCP Window Size field into the TCP Urgent Pointer field. The reasoning behind this operation is to return the TCP Urgent pointer, which was stored in the TCP Window Size field by the TCP Emulator Receive Algorithm 60, to its original position. This behavior preserves the value of the Urgent Pointer end-to-end for compatibility, while allowing a 32-bit contiguous space in the TCP header/FP header for a 32-bit CRC.

Next, in step 82, a test is performed to determine if any of the FP SYN, FIN or RST flags are set. The FP SYN, FP FIN or FP RST packets trigger the Transmit TCP Emulator (39*a*/39*b*) to call the TCP stack's Open 83, Close 84 or Reset 85 functions, respectively. It is assumed that the TCP stack used in an implementation will have functionality to allow for the opening of new connections, closing of connections and aborting of connections, said functionality being named Open 83, Close 84 and Reset 85 respectively. If data is present in a TCP SYN at the originator 31 (FIG. 3), which then becomes an FP SYN with data at PEP 1 33, upon reaching PEP2 34 this data is not sent until after a TCP connection has been initiated to the real end point 32. The rationale is that although TCP allows for a data-carrying SYN segment, this functionality may not exist in the TCP/IP stack. PEP2 34 therefore will translate a data-carrying SYN into an Open call (with no data) and a delayed Send 86 call (carrying the data). Data-carrying FINs are treated analogously, except the data is sent before close is called. This behavior can be implemented as wrapper functions for the Send 86, Open 83, Close 84 and Reset 85 functions. These wrapper functions can be implemented above the TCP layer.

Any FP packets without the SYN, FIN or RST flags set are assumed to be carrying data (all FP ACKs are not passed from the FP processor, like TCP ACKs from the TCP/IP stack) and are thus sent by calling the send function 86 of the modified TCP/IP stack. The underlying modified TCP stack buffers all the outgoing data until acknowledged, as usual.

Although the PEP deals with TCP/IP packets and targets performance, it may not function efficiently or at all for individual connections if certain ICMP messages are not also handled. The most important ICMP message in the context of PEPs is the Destination Unreachable, Fragmentation Needed message used as part of the Path MTU Discovery (PMTUD) mechanism. PMTUD is currently an Internet Draft Standard. A method has been developed whereby this mechanism can coexist with the enhanced PEP of this invention. A mechanism is provided for where the PEP filters ICMP messages, removes ICMP PMTUD messages from the packet stream and acts upon them. By doing this, the PEP is able to participate in the PMTUD mechanism.

The specific action taken by the PEP is as follows. The PMTUD ICMP message is permanently removed from the traffic stream and PEP2 34 reduces its Path MTU (PMTU) estimate prior to re-transmitting a data packet that is reduced in size to conform to this new PMTU estimate. If the PMTUD ICMP message were allowed to pass to the host 31 that originated the TCP segment, the ICMP message may either be ignored by that host or may cause some form of error. In all probability the TCP segment that triggered the error will have been successfully acknowledged by PEP1 33 and discarded from the originating host's 31 TCP transmit buffer. It is therefore not possible for the host 31 to retransmit it. This may either cause the message to be ignored or trigger an error. Additionally, unless the host uses the message as a trigger to reduce its PMTU estimate, PEP2 34 will have to resize all future packets between its two interfaces to avoid fragmentation. Ignoring this ICMP message will only cause the system to fail if the Don't Fragment (DF) bit is set in the IP header as is required by the PMTUD mechanism. It is possible to ignore this ICMP Message if the DF bit is not set, but datagrams that are too large will then be fragmented possibly degrading system performance.

Additionally, the ICMP Network Unreachable, Host Unreachable and Source Quench messages should be handled to provide more timely responses for errors and other problem conditions. The Network and Host Unreachable messages should be responded to in different ways depending upon the state of the end-to-end communication to which they relate. The Network and Host Unreachable messages should cause end-to-end connection tear-down under the control of the PEP for connections that have not been correctly established. For established connections, they should be treated as transient errors and a retransmission from the PEP receiving the message should be attempted. Connection tear-down is facilitated by the PEPs involved by the PEPs communicating TCP/FP reset packets to themselves and the end points to ensure the return to a known state without unnecessary delay, which may consume system resources. The reception of a Source Quench message by a PEP should trigger the TCP Emulator of that PEP to enter slow start as would be expected of an end host receiving that message.

Other ICMP messages that may also trigger an end-to-end tear-down before connection setup, or a retransmission attempt after connection establishment, are as follows. ICMP type Destination Unreachable, codes: Source Route Failed, Destination Network Unknown, Destination Host Unknown, Source Host Isolated, Network Unreachable for Type of Service (ToS) and Host Unreachable for ToS. Other messages for which aborting the connection under PEP control as described earlier is the appropriate response include ICMP type Destination Unreachable codes: Protocol Unreachable, Port Unreachable, Destination Network Administratively Prohibited, Destination Host Administratively Prohibited, Communication Administratively Prohibited by Filtering, Host Precedence Violation and Precedence Cutoff in Effect. The ICMP message type Parameter Problem, codes IP Header Bad and Required Option Missing messages should be handled by the PEPs as described for an end to end connection abort. ICMP type Time Exceeded, code TTL Equals Zero During Reassembly should trigger a retransmission. All other ICMP message types publicly known to this date should be ignored by the PEP and left to pass to their intended destination.

Failure to handle the of the above messages types and codes may mean that the PEP must wait for a timer to expire to determine that the connection it is accelerating has actually been closed by one or both of the end points. Until this time, the PEP(s) would have being using memory storing connection state information and most likely retransmitting packets to attempt to maintain the connection. Thus PEP memory and Central Processing Unit (CPU) resources would have been wasted along with network bandwidth, be it terrestrial, satellite or both.

Due to the fact that the PEP(s) are handling TCP and FP connections for multiple IP addresses, it is not possible to associate the incoming packets to the correct connection using only the source IP address and the source and destination port numbers. For the TCP and/or FP connections it is, therefore, necessary to consider further information. One such choice would be the use of the destination IP address in addition to the aforementioned information. This would mean that the whole socket pair would be utilized to de-multiplex incoming packets to the correct connections, or in other words, de-multiplexing the connections.

The FP of the invention is used over the satellite portion of the link with FP packets reusing certain fields in the TCP header. The IP header will be maintained and transported over the FP link. The FP header will replace the TCP header and will include flags for signaling connection initiation, termination, or ACKs. A single field in the FP packet header (part of the TCP Sequence Number field) is used to represent the number of the FP data packet or FP-ACK. A 32-bit CRC over the whole packet (IP header, FP header and user data) will also be included. Although IP has a checksum on the header and TCP on the header and data, these are 16-bit and based on one's complement binary arithmetic.

The Ethernet CRC (commonly used on both TCP end connections at the link layer) is based on binary division, which is significantly more robust, detecting many more errors due to the binary long division process that allows bit errors to propagate to more bits in the checksum than does binary addition. Additionally, the 32-bit length of the CRC also increases the number of errors that may be detected. The use of the PEPs and connection splitting should not adversely affect the end user experience by inserting a weak link in the end-to-end connection. For this reason, a 32-bit CRC has been chosen for the FP to help mitigate the increased chance of the user receiving data containing undetected errors due to the higher than terrestrial wire line residual BER of the satellite hop.

TCP and some other protocols indicate the data packets they expect to receive by using a sliding window mechanism. This window can be thought of as a view of part of the data stream at a given point in time. Two commonly discussed concepts are those of the left and right edges of the window. The left edge of the window marks the beginning of the next data element (segment, packet, block or byte) that is expected at the receiver, i.e. the first data element expected, the data element with the lowest sequence number that is still outstanding (if sequence numbering is used). In the FP, any packet that is to the left of the left edge has been received in order and transmitted by the TCP emulator. The right window edge marks the data element, after the buffered element with the highest number. The left edge is extended if a received element belongs at the left edge of the window, contiguous to the data already received. A hole is created if a non-contiguous segment is received.

Figure 7:
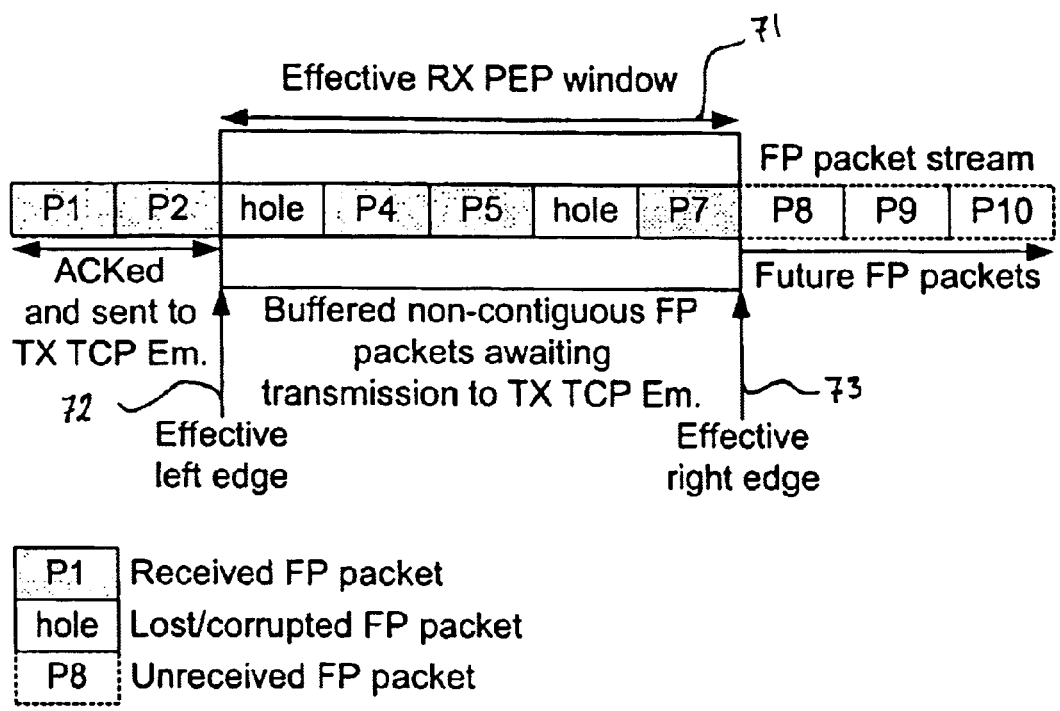
FIG. 7 is a diagram showing the concept of the FP effective window mechanism comprising the FP effective receive window with its left and right edges.

The Flight Protocol uses a window mechanism, shown in FIG. 7 for managing the re-assembly buffer. The window 71 starts with a left edge 72 of zero and a right edge 73 of 1. Flow control is via the capacity prediction algorithm, as instantaneous capacity is calculable for the satellite link (from known assignments) and does not involve the receive window 71. Therefore the concepts of the FP receive window and the left and right window edges are essentially notional. The left edge 72 corresponds to the FP packet number of the left-most hole in the PEP re-assembly buffer 74 and the right edge 73 corresponds to the FP packet number above the buffered FP packet with the highest FP packet number. The receive window 71 is from the left edge to the right edge.

Figure 23:
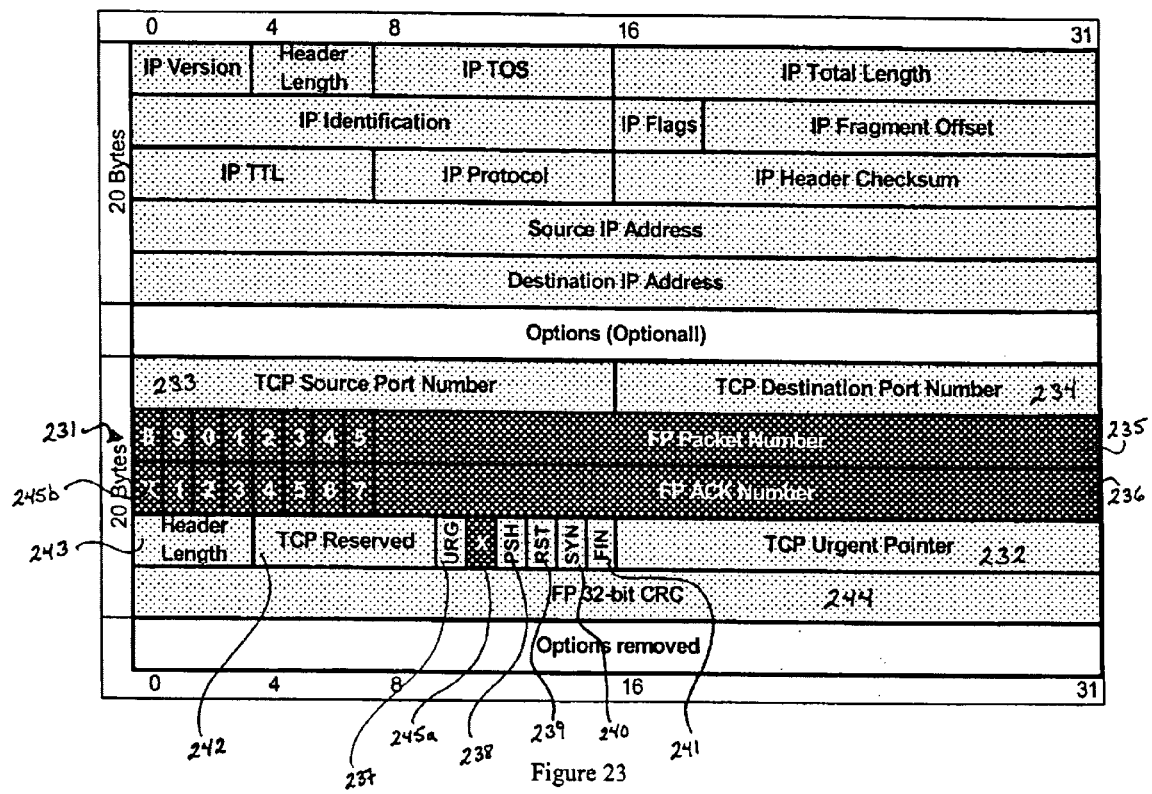
FIG. 23 is a representation of the Flight Protocol packet structure.

The FP packet structure is shown in FIG. 23. The FP header replaces the TCP header at the transport layer but a FP packet still contains the end-to-end rP header 231 to allow compatibility with (transmission through) systems between the two PEPs. Additionally, certain TCP fields must also be preserved for the PEPs and FP to remain compatible with end-to-end TCP.

The TCP source 233 and destination 234 port numbers are preserved and used by both the TCP Emulator (in the TCP world) and the FP Processor (in the FP world) for identification of the connection to which packets belong. The FP Packet Number 235 replaces the TCP Sequence Number and is, as its name suggests, packet based as opposed to byte stream based. Analogously and necessarily, the FP ACK Number 236 is also packet based. Packet numbers (also used by FP ACKs) are monotonically increasing numbers that start from zero every time a new FP connection is opened. The TCP Header Length field 243 is recalculated by the modified TCP/IP in the TCP Emulator prior to transmission and is unused over the FP link. The TCP Reserved field 242 must stay unused for compatibility with TCP as its future uses are unknown.

TCP uses 6 flag bits that are used as follows by the FP. The URG 237 (Urgent Pointer valid) and PSH 238 (Push Function) flags are unmodified by the FP, allowing communication of this information end-to-end for TCP compatibility. The TCP ACK flag is also used by the FP. The Receive TCP Emulator Algorithm clears this flag upon receipt of a TCP/IP packet. This allows the ACK flag to be set to 1, i.e. "On", by the Transmit FP Processor if required for piggybacking a FP ACK. The SYN 240, FIN 241 and RST 239 flags are used by the FP in much the same way as TCP uses them. The SYN flag 240 signals a new FP connection to the Receive FP Processor, the FIN flag 241 the end of a FP connection and the RST flag 239 to abort the current FP connection. By not modifying these flags end-to-end they trigger the appropriate behavior in each entity along the connection.

For example, a TCP SYN packet from the end point 31 (FIG. 3) triggers the Receive TCP Emulator 39a and its modified TCP/IP stack to complete a TCP three-way handshake then the TCP packet is translated to a FP packet shell with the SYN flag 240 still set. The FP Processor 38a then detects the SYN flag 240 and opens new connection status information before sending the FP packet to the Receive FP Processor 38b in the other PEP 34. The FP Processor 38b in the second PEP 34 then opens its connection tracking information and passes the FP packet to the Transmit TCP Emulator 39b which requests a new TCP connection from the modified TCP/IP stack, completing the end-to-end connection.

The TCP Urgent Pointer field 232 is moved but its value preserved (for compatibility). A 32-bit contiguous space is then created for the insertion of a 32-bit FP Cyclic Redundancy Check (CRC) 244. All TCP options are removed over the FP link as they are specific to each terrestrial connection.

The treatment of loss by the Flight Protocol is different to that of TCP which assumes that losses are due to congestion. Although this may be a fair assumption on a terrestrial link it is not so over a GEO satellite. Therefore, the Flight Protocol assumes that all losses are due to errors. Also the Flight Protocol de-couples the reliability and flow control mechanisms by not using incoming ACKs as a count of the number of packets to have left the network. This de-coupling of reliability and flow control allows the use of alternative ACK schemes, which may be optimized for efficiency of channel utilization or other reasons.

The concept of 'in-flight' and 'grounded' data exists within the FP Transmit Buffer Algorithm. In addition to passing a FP packet to the transmission queue in the hub or terminal, the packet is stored in the PEP's FP Transmit Buffer 40a (FIG. 3) with a time stamp based on the current network clock. As an option, while being based on the current network clock, the timestamp may be calculated to be equal to the time of transmission, as per the network clock, plus the maximum time (limit) for an ACK for that packet to arrive back at the sender. The rationale for this system is to ensure that consecutive FP ACKs following a missing FP ACK do not trigger multiple replacement packets being sent. Multiple ACKs would have naturally occurred because a replacement packet will not be noted at the sender for one round trip time (RTT) and during this time the receiver may continue to flag a missing packet.

A typical transfer of data would occur as follows, starting with the point where the TCP/IP data packet sent by the server is received by PEP1 33 (FIG. 3) and converted into a FP packet. Then the FP packet is copied into the FP Transmit Buffer 40a and the original transmitted. After a time equal to the RTT over the satellite link (including time to allow for system processing, ACK timer delays, queuing), the FP packet state in the buffer 40a becomes grounded, meaning that enough time has elapsed for the packet to reach its destination and an FP ACK to have returned. The fact that a FP ACK has not been received by PEP1 33 implies one of two things: either the FP packet did not reach its destination (PEP2 34), including being received but in error (i.e. a corrupt packet was received), or the resulting FP ACK was lost or corrupted in the return direction.

The FP packet must, therefore, be copied from the FP Transmit Buffer 40a and retransmitted over the satellite link 37. The buffered retransmitted FP packet is again time-stamped in the FP Transmit Buffer 40a with the time of retransmission and marked as "in-flight". The packet in the buffer is considered "in-flight" as long as the current network clock time did not exceed the RTT plus time stamp in the buffer, or in the case of pre-calculating the expected ACK arrival time, did not exceed the stored time value.

Three triggers exist for instigating a re-transmission:

1. The sending PEP detects a missing packet by receiving an acknowledgement out of order. For example it receives acknowledgements for packets 1–5 and 7–10 but not 6; on receipt of the FP ACK for packet 7 it will check if packet 6 is still in the buffer and 'grounded'. If both these conditions are met the packet is re-transmitted and the packet state in the buffer is time-stamped and reset to in-flight.

2. If no FP ACKs for a given connection arrive for a pre-set time (depending on the overall delays) a timer will expire. PEP1 33 will then automatically re-transmit all unacknowledged and 'grounded' data.

3. If no FP data arrives at PEP2 34 for a given connection, a timer will expire after a preset time. PEP2 34 will then automatically retransmit the FP ACK of the last uncorrupted FP packet that it received and that corresponds to the silent connection. This FP ACK will cause a scan through the FP Transmit Buffer 40a of PEP1 33 for packets that are grounded and that correspond to the same connection as the received ACK packet. If such packets exist, then copies will be retransmitted from PEP1 33 to PEP2 34.

The FP ACK scheme described is implicitly a Selective Acknowledgement Scheme. Packets can be acknowledged independently or as multiple packets. Note that after several attempts after time-outs as described in (2) and (3) above, the connection will be shut down.

Figure 10:
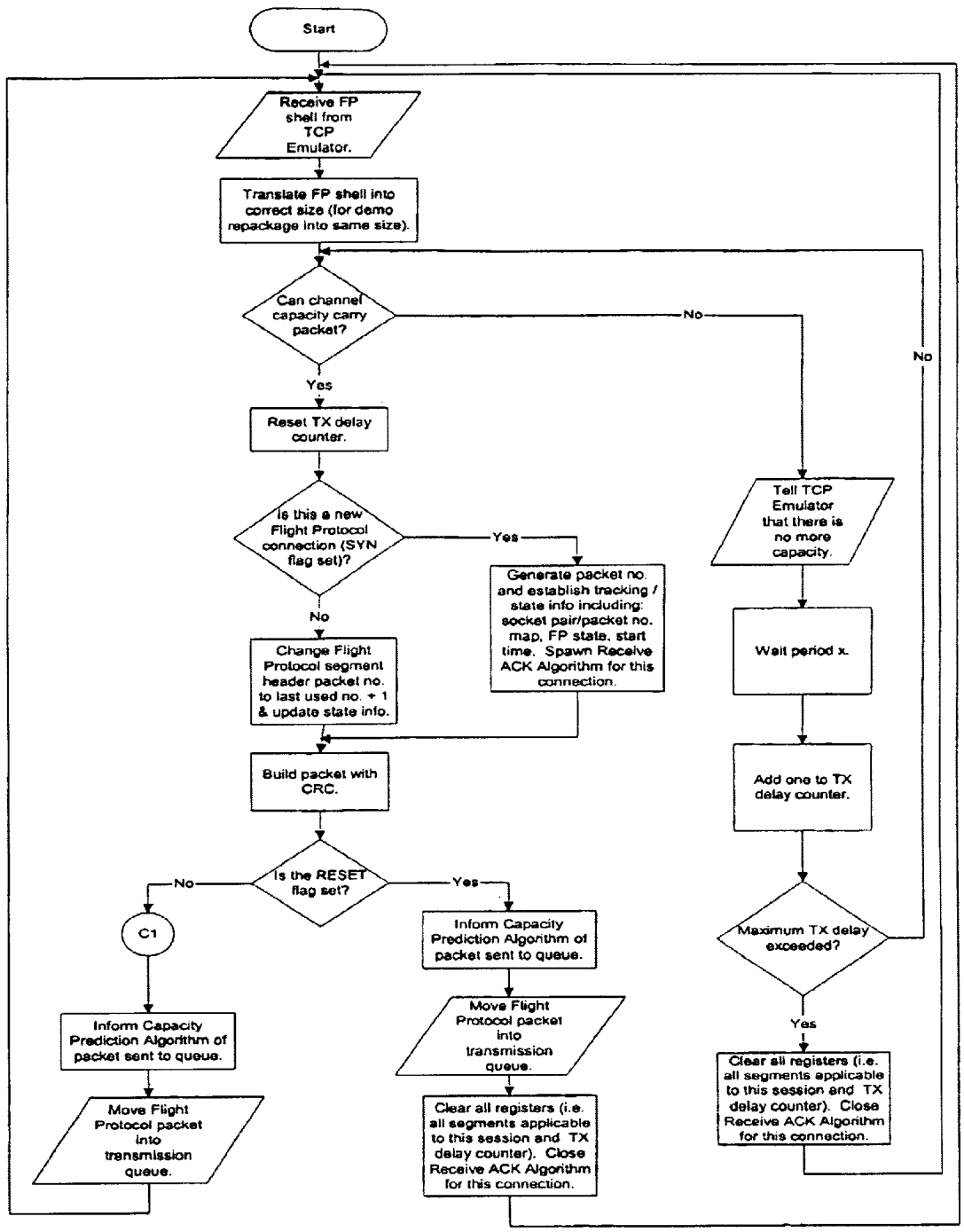
FIG. 10 is a flow chart of the Transmit Flight Protocol Algorithm.

Flight Protocol Algorithms involved as part of the invention's system and method consist of Transmit Flight Protocol (TX FP) & Transmit buffer (TX Buffer) Algorithms. The TX FP 51 and TX Buffer Algorithms (B, C1, C2, C3, C4) are shown, in the context of the overall PEP algorithms, in FIG. 6, and the algorithm flow charts are given in FIG. 10. The algorithms C1 to C4 are shown in FIG. 13. The FP traffic (multiple data packets) originating at the Receive TCP Emulator then passes to the Transmit FP Algorithm 51 (assuming capacity is available) where it is stored by the FP Transmit Buffer Algorithm, C1, in order to guarantee reliable transmission. The FP packets are then passed to the gateway or terminal to be queued for transmission. The Send ACK algorithm, B, denoted TX ACK, is called upon receipt of FP packets by the Receive FP Algorithm 54 to Transmit FP ACKs back to the sender. Algorithms C2 (delete from buffer), C3 (retransmit lost packet) & C4 (check for missing packets) are used for FP Transmit Buffer 40a management such as deleting acknowledged packets from the buffer, re-transmitting lost packets and determining if a packet should be considered lost.

Figure 11:
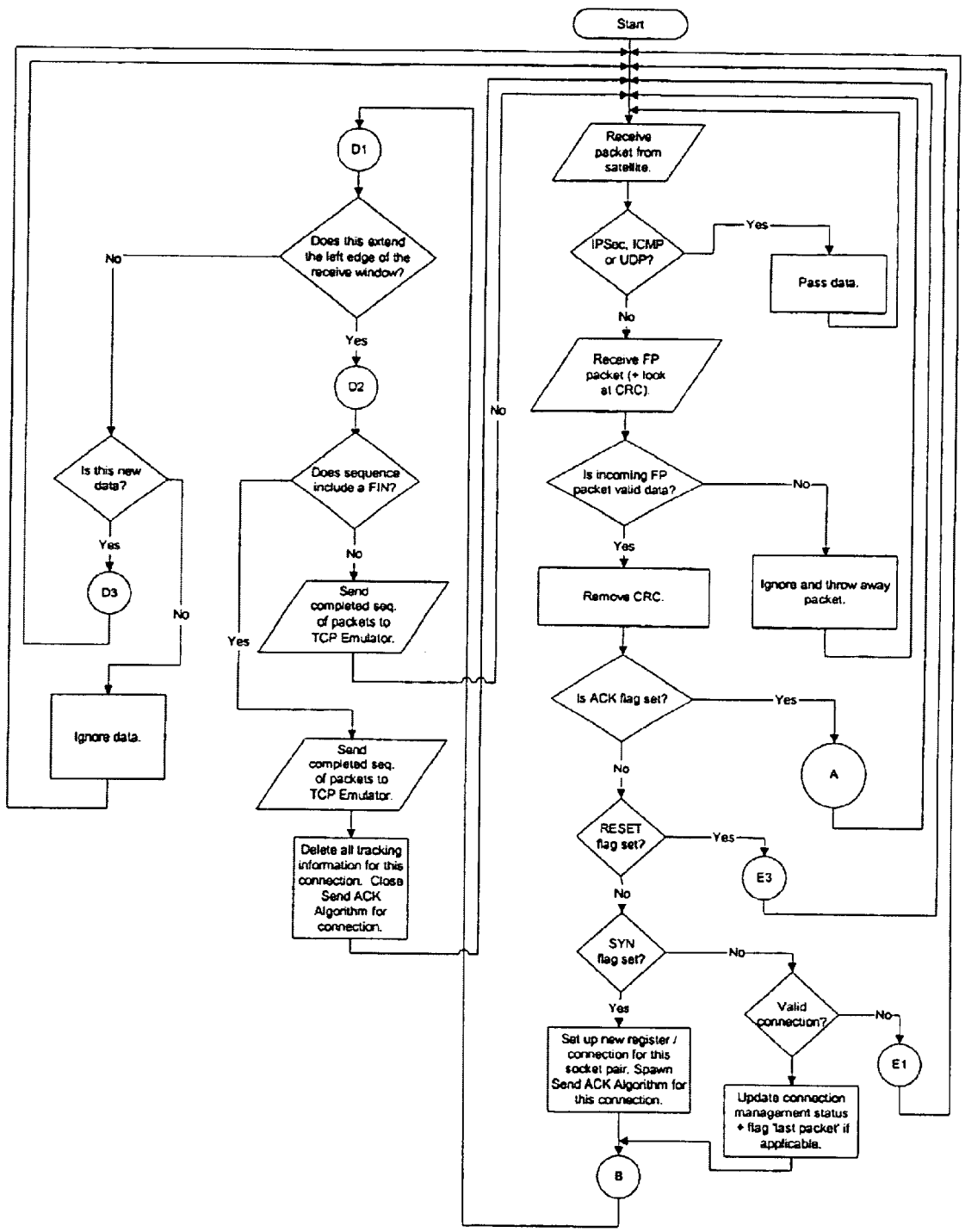
FIG. 11 is a flow chart of the Receive Flight Protocol Algorithm.

The Receive FP 54 and Receive Buffer Algorithms (A, D1, D2, D3) are shown in the context of the overall PEP algorithms, in FIG. 6 and the algorithm flow charts are given in FIG. 11 and the algorithms D1 to D3 of FIG. 13.

Received FP packets are handled by the Receive FP Algorithm 54. Algorithms D1 (calculate left edge) and D2 (reassembly buffer management) handle the determination of the left edge of the effective window (see also FIG. 7) and the reordering of packets retransmitted and received out of order (because of packet loss/corruption). These algorithms manipulate the FP Reassembly Buffer 48b (FIG. 3), which is distinct from the FP Transmit Buffer 40a. Incoming FP data packets trigger the Send ACK Algorithm (B) described earlier. Incoming FP ACKs trigger the Receipt of ACK Algorithm marked as RX ACK (A). Depending upon the type of information that the ACK contained, C2, C3 and/or C4 are called.

Figure 12:
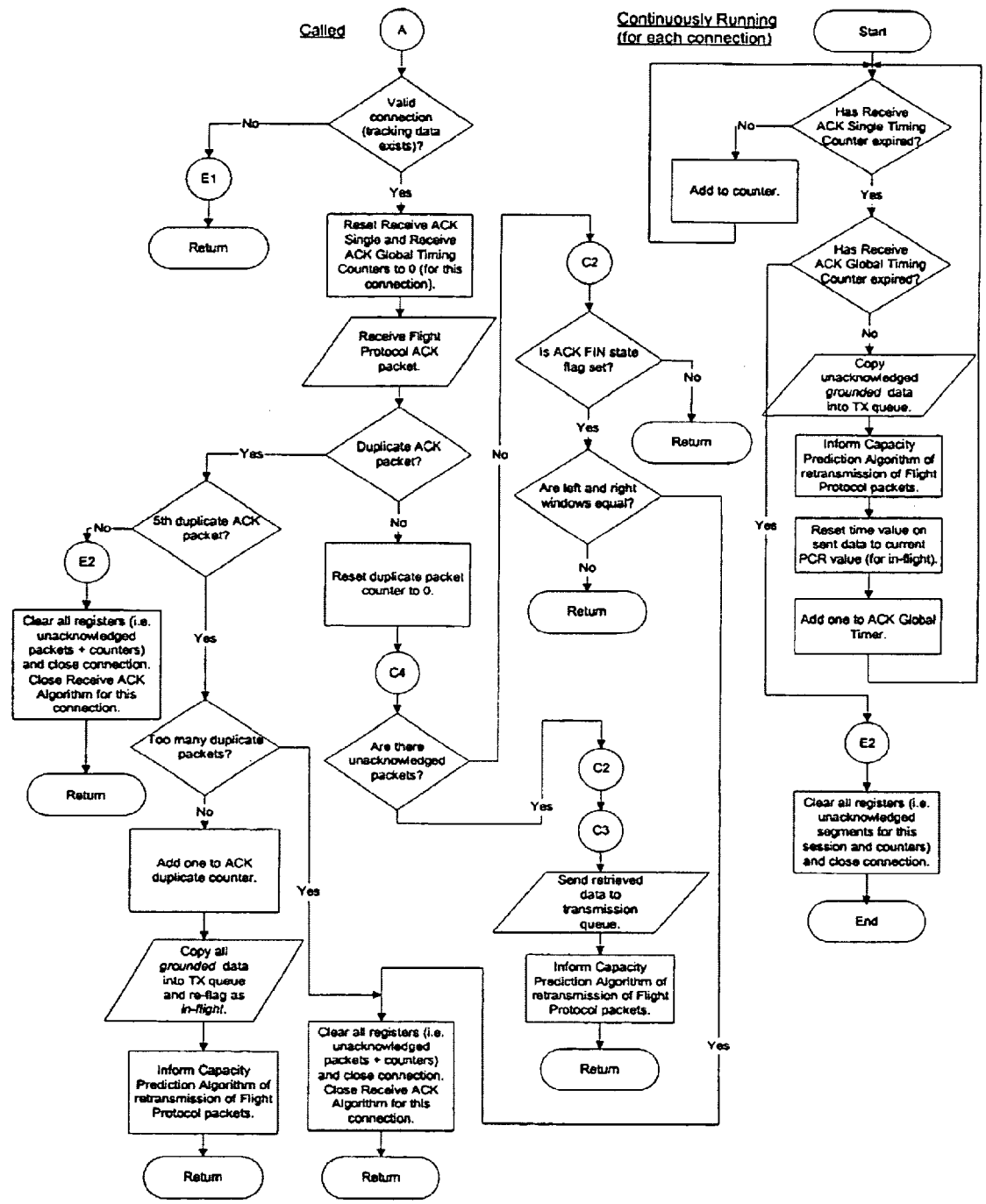
FIG. 12 is a flow chart of the Flight Protocol ACK Receipt algorithm.
Figure 15:
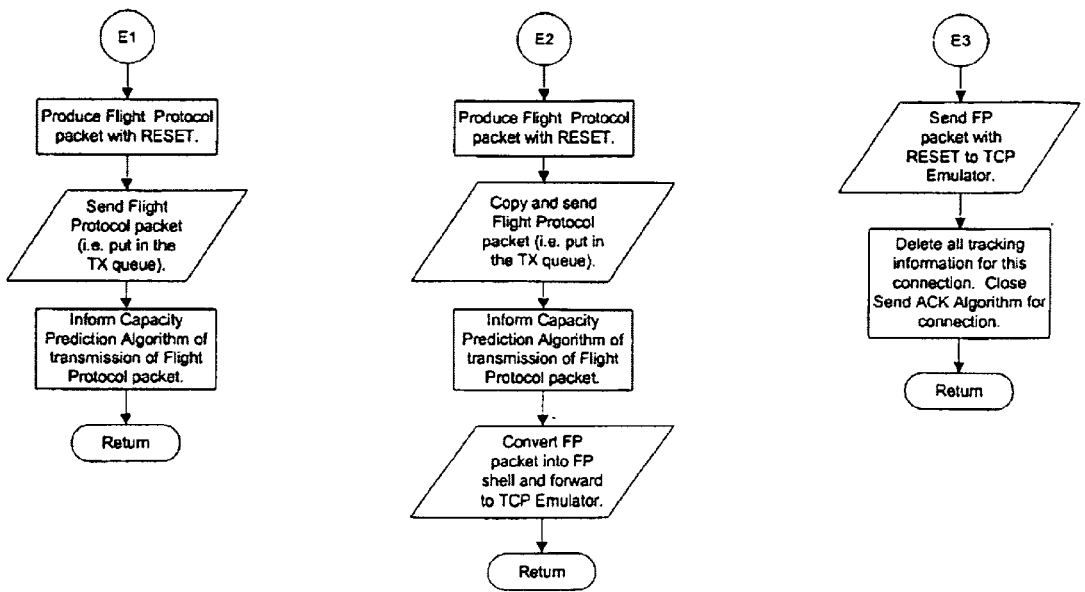
FIG. 15 is a flow chart of the Flight Protocol Reset Algorithms.

For each new connection that is created, two continuously running algorithms are spawned at each PEP. These are the system's Connection Management algorithms. On the Initiator side, PEP1 33 spawns an FP ACK Receipt Algorithm (continuously running), shown in FIG. 12, which re-sends missing packets, based on a timer, if no FP ACKs arrive. This timer is reset upon ACK arrival and expires when no ACKs have arrived in a given interval since being reset. Upon timer expiration, all packets that have been sent and are grounded (considered to have had sufficient time since transmission to allow an ACK to arrive back at the sender) but unacknowledged are retransmitted. Likewise a FP RESET and TCP RESET are sent in the applicable directions at the expiry of a global timer as shown in FIG. 15.

Figure 14:
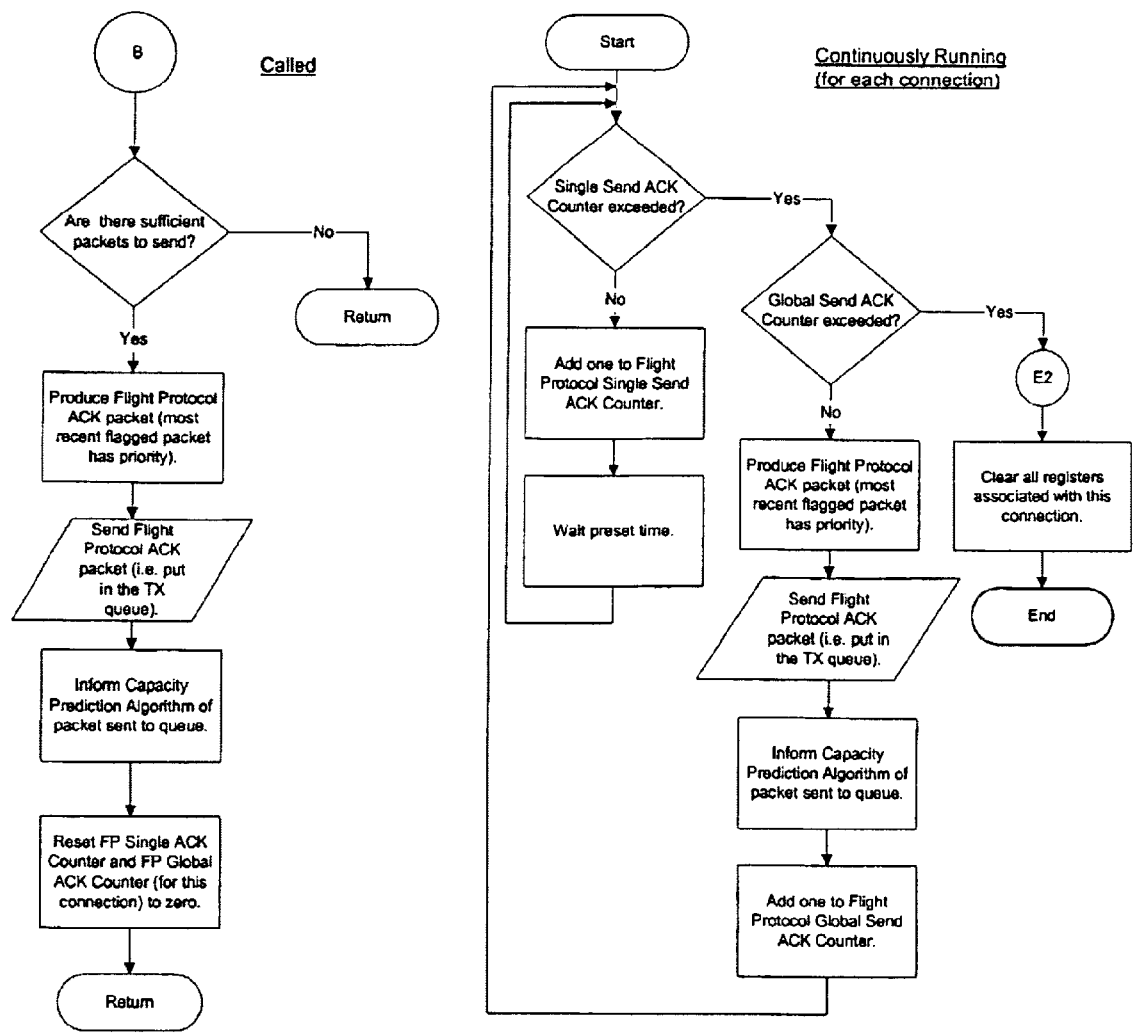
FIG. 14 is a flow chart of the Flight Protocol Send ACK Algorithm.

On the Responder side (PEP2 34), a continuously running FP Send ACK Algorithm 57 (FIG. 5), shown in FIG. 14, is spawned. This generates ACKs if no packets are arriving and eventually, if necessary, a TCP and FP RESET in applicable directions following the occurrence of a global timeout. The specific action taken upon expiration of the timer is the transmission of an ACK for the last packet successfully received.

The triggering values of the two above-mentioned timers, the one for re-sending missing packets and the one for re-sending the last ACK, should be different to avoid the mechanisms triggering needlessly (i.e. when the other mechanism is already being used). This difference may take into account the time in flight and processing delays at the sender and receiver from both the ACK and data packets perspectives. Setting the value of the first timer described above to be smaller than the second timer described above is to be preferred.

In reviewing the various states of the invention's Flight Protocol, the making of the connection is a logical starting point.

Figure 16:
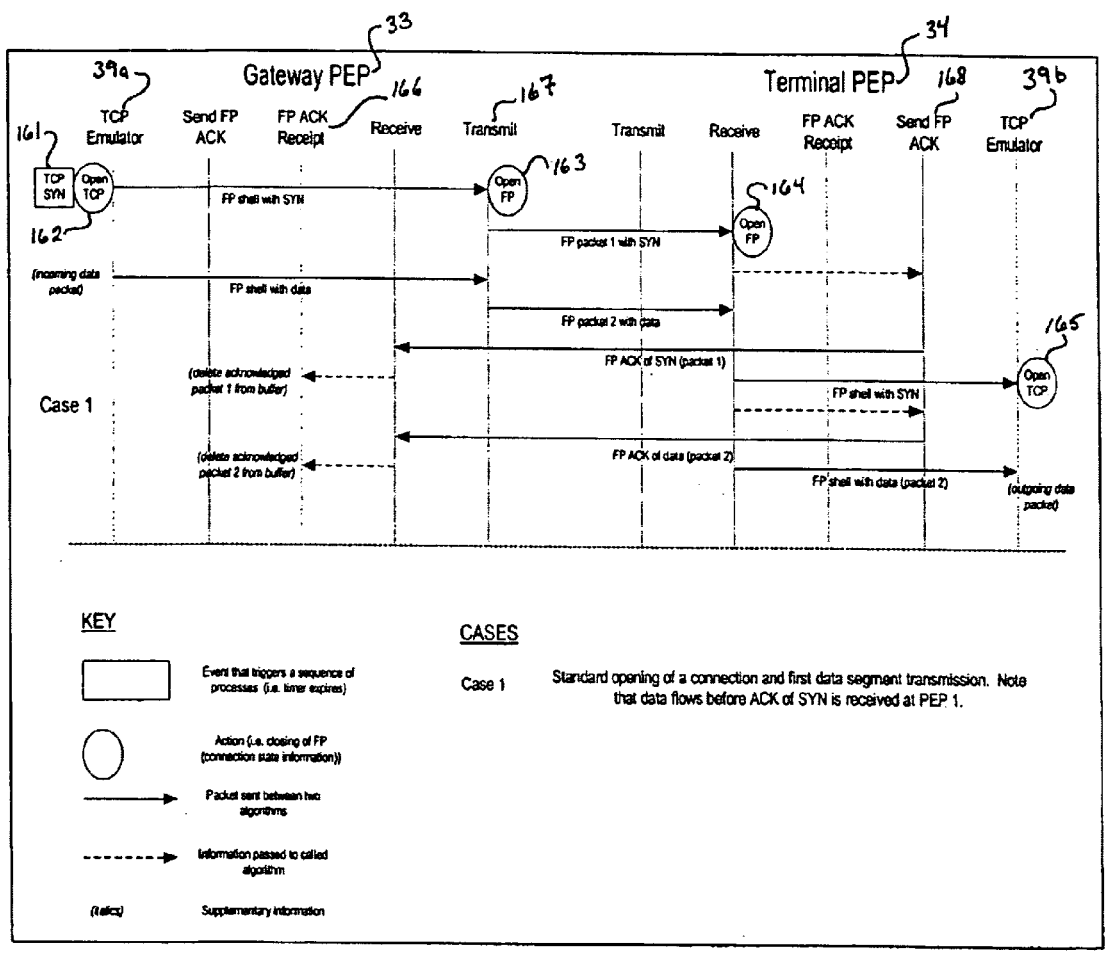
FIG. 16 is a ladder diagram showing the algorithm interaction and message flow for opening a connection over a satellite link involving the use of the FP and PEPs.

The opening and closing of a connection is discussed first with reference to FIG. 16 which shows the interaction of, and exchange of packets between, algorithms in the transfer Initiator (gateway PEP1 33) and the transfer recipient (terminal PEP2 34). On receipt of a TCP SYN 161 the TCP Emulator 39a opens the 'TCP connection tracking' 162, the continuously running FP ACK Receipt Algorithm 166 is spawned and then sends a FP shell, with the SYN flag set, to the FP Transmit Algorithm 167 which opens 'FP connection tracking' 163. In addition, a FP packet is generated and sent to the terminal PEP 34 which in turn opens its 'FP connection tracking' 164, calls the 'FP Send ACK' Algorithm 168 and forwards the FP shell, with SYN flag, to the terminal PEP TCP Emulator 39b. Likewise a continuously running FP Send ACK Algorithm is spawned. A TCP connection to the end host (not shown) is now established as well as 'TCP connection tracking' 165 in the Emulator 39b.

While the transmission of the FP packet with SYN is in progress over the satellite link, the originating (client initiated) TCP connection is allowed to complete its three way handshake, and data (HTTP requests are one possibility) can start to be transferred from the client to PEP2 34. This saves time as data can be transmitted between the PEPs, arriving soon after the initial FP SYN packet, without the delay associated with the three way handshake.

It is important to note that as soon as the first data packet is received at the TCP Emulator 39a of the gateway PEP, it is translated to FP and forwarded via the satellite, even if the first FP packet with SYN has not been acknowledged. This is an important parameter of the PEP concept that helps complete the transfer without the delay introduced by the TCP three-way handshake. In fact, the connection opening does not use a pre-data handshake or pre-data agreement mechanism of any form. In the unlikely event that the first FP packet with SYN is lost, the terminal PEP 34 will start receiving data packets for a connection that it thinks does not exist. Under these circumstances a FP RESET will be sent back (see FIG. 17, and the associated description), resulting in the whole connection being torn down and having to start from scratch, to ensure that the system remains robust. The receipt by a PEP of a FP packet with SYN flag set for a connection that does not exist is an implicit indication that a new simplex connection has been created by the other PEP and that this is the first packet from that connection.

If a FP packet with SYN flag set arrives for a connection that already exists, this maybe treated as an error condition and the connection reset. This condition should, however, not arise as it should be handled by TCP in the normal processing or by the TCP Emulator modifications which should not allow a packet carrying a SYN flag, other than the first, to pass to the FP Processor. Alternatively, this type of anomalous packet may just be ignored either explicitly after detecting the SYN flag is set or implicitly by the algorithms skipping the test for the SYN flag, because the connection is already setup. FP packets with SYN flags set are acknowledged as if they were normal FP data packets. The handshake (occurring alongside data transfer) is considered finished when the original FP packet with SYN is acknowledged successfully.

If the FP packet with SYN is lost, it is also possible to buffer the received data for non-existent connection for a small number of round trip times to allow the FP packet with SYN to be resent. This is an alternative to the current scheme and would improve efficiency further in cases where the FP packet with SYN were lost, by avoiding re-transmitting the initial data packets and restarting the connection following another user request.

In some cases it is conceivable that this mechanism may interfere with the end-to-end behavior of certain applications and, as such, it would be sensible to offer either a user controlled or automatic mechanism whereby a connection that fails to setup end-to-end will be run in an end-to-end setup mode driven by the TCP end points. The failure of a connection to setup end-to-end correctly the first time should default the PEP whose TCP Emulator initializes that connection to mark the associated IP address (and possibly port numbers also) as requiring safer setup processing. It is then necessary for the PEP to communicate this information to the other PEP to force an end-to-end connection setup. The ability for the user to choose at any point through a user interface the use, or not, of an end-to-end connection establishment would also be a useful feature in this context.

Figure 17:
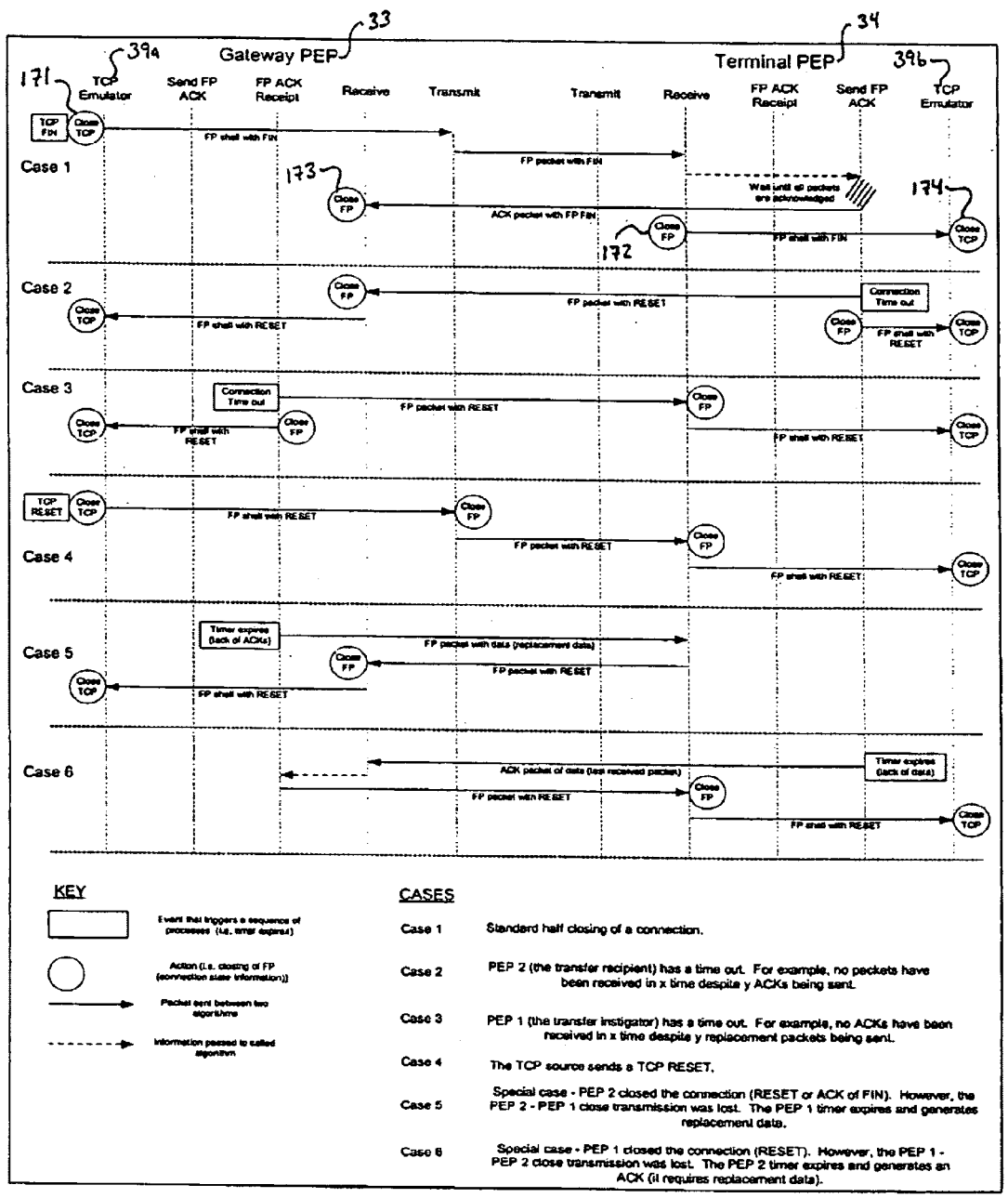
FIG. 17 is a ladder diagram showing the algorithm interaction and message flow for closing a connection over a satellite link involving the use of the FP and PEPs.

The algorithm interactions and message exchanges necessary for a FP and TCP Emulator Close are given in FIG. 17. Case 1 shows the normal operation where, after the transportation of a FP shell with FIN and receipt of all data packets at the terminal PEP 34, the gateway PEP TCP Emulator connection 171 and terminal PEP FP connection 172 are closed. The closure results in 'connection tracking' information being deleted. Assuming all data has been received and acknowledged the terminal PEP 34 acknowledges the FIN. This triggers the closing of the gateway PEP FP 173. In addition the FP packet shell with FIN is passed to the terminal PEP TCP Emulator 39b which completes the overall half close 174.

TCP uses a concept of a half close where one direction of the full-duplex TCP connection is closed for the purposes of transmitting data. The invention's FP uses a different model where in fact, two separate simplex FP connections are established and each may be torn down independently, effecting a half close in the FP world. Thus, we refer to the connection closure as a 'half close' since from a TCP point of view the connection has only been closed between the server and client (i.e. in the gateway-terminal direction). From a FP perspective, the connection is closed as two independent FP one-way connections (which are run as if one duplex connection) to support an end to end TCP connection (one of them now closed).

Cases 2–4 of FIG. 17 represent situations whereby a RESET is required. This could be either a TCP originated RESET (as in case 4) or a FP RESET triggered by a timeout due to lack of packets or ACKs. Cases 5 and 6 of FIG. 17 are special cases that ensure a robust system; for example, if replacement data for a connection that the receiver has no knowledge of ('Connection Tracking' information exists) arrives, a RESET is triggered. If an error condition occurs, it is important to ensure that the system remains stable. Therefore, a RESET marked packet should trigger at either PEP the propagation of RESET marked packets to all other entities involved in the connection. A PEP receiving a RESET from the terrestrial world should forward the FP packet with RESET to the other PEP and that PEP should pass the packet to be converted to TCP and sent out over the other terrestrial link. In a similar manner, if a FP processor generates a RESET in response to some error event, that RESET packet should be forwarded by the other (receiving) PEP to the connected terrestrial endpoint. By these mechanisms, all the entities involved in the TCP connection can be returned to a known state.

The FP Processor (i.e., FIG. 3, 38a/38b) side of the PEP is responsible for sending and receiving data reliably across the satellite link. Due to the special characteristics of this link, most notably the large bandwidth-delay product and the relatively large in-transit error probability, the Flight Protocol is substantially different from TCP, which is used over the terrestrial part of the overall connection.

Figure 18:
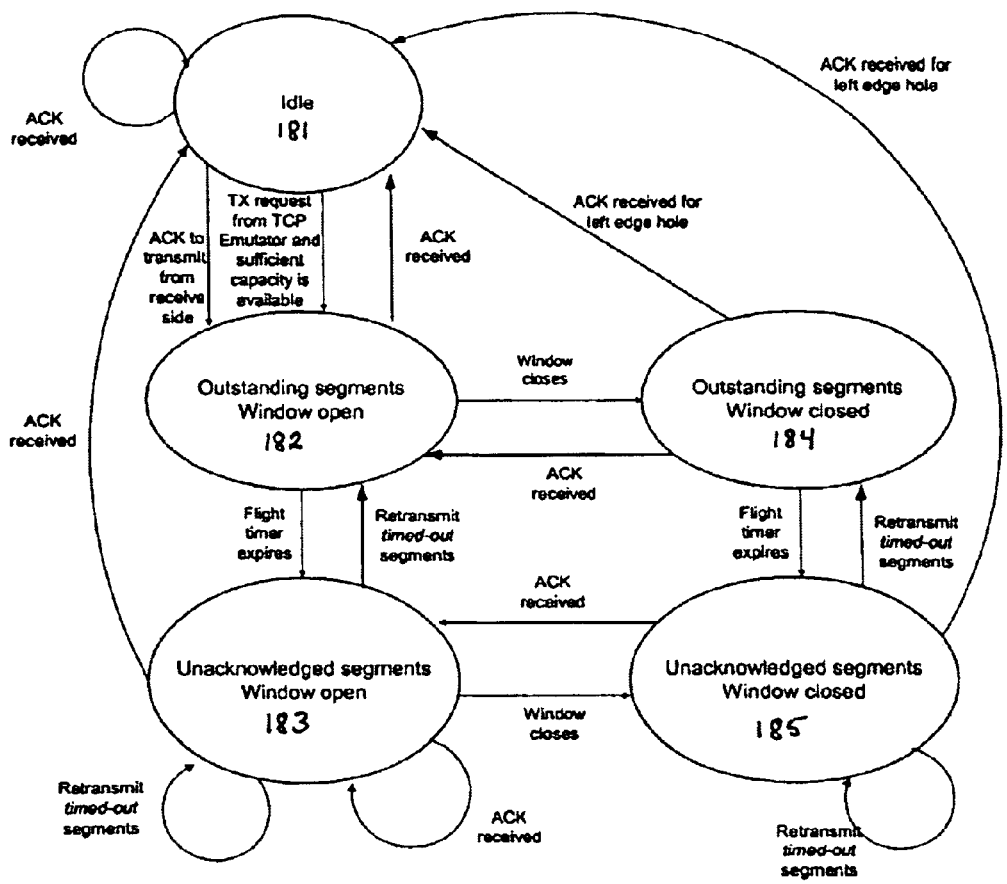
FIG. 18 is a transmit state diagram for the flight protocol showing the transmit states and transitions between these states of the Flight Protocol algorithms.

FIG. 18 relates to the transmit section of a PEP (i.e. PEP1 33 in a data transfer from server to client). FIGS. 30A and 30B show the corresponding state table for the transmit half of the FP. Initially, the system is in the Idle state 181, awaiting for something to transmit, either data or an ACK message.

Upon receiving a FP Shell (or multiple FP Shells) from the TCP Emulator, a number of packets are created, then passed to the gateway or terminal for queuing and transmission, and the Outstanding packets/Window open state 182 is entered. A packet which has been transmitted but for which no ACK has been received yet (because of the RTT) is called outstanding (in-flight) data. An outstanding packet becomes unacknowledged when its has been transmitted for more than a RTT and the packet is still not acknowledged (grounded data). Eventually, a packet that remains unacknowledged for too long becomes timed-out (and will be retransmitted). These concepts relate to those of in-flight and grounded data described earlier in reference to packet state in the TX buffer. At the time data is buffered, immediately prior to transmission, a timestamp based on the network clock is also recorded. Until this timestamp expires, the data is assumed to be in-flight. Once the timestamp expires, the data is said to be grounded and if no ACKs have been received, a retransmission is required. Any ACKs received indicating loss of the packet, while the packet is in the in-flight state, must be ignored to prevent multiple unnecessary retransmissions of a packet.

As long as there are outstanding packets, the system remains in the Outstanding packets/Window open state 182, where transmission of new packets is allowed. Eventually, as time elapses, the flight timer expires for some of the transmitted packets and the system moves to the Unacknowledged packets/Window open state 183. Transmission is still allowed but now ACKs are expected for the grounded packets.

From either Outstanding packets/Window open 182 or Unacknowledged packets/Window open 183, if the number of transmitted packets for which ACKs have not been received reaches the maximum allowable (a settable parameter), the system moves to Window closed versions of these states (184 and 185, respectively), where no data packets may be transmitted. As ACKs are received, the window is re-opened and the system moves from the Unacknowledged packets/Window closed 185 to the Unacknowledged packets/Window open 183 state accordingly, and eventually back to the Idle state 181 if all packets are acknowledged.

Figure 19:
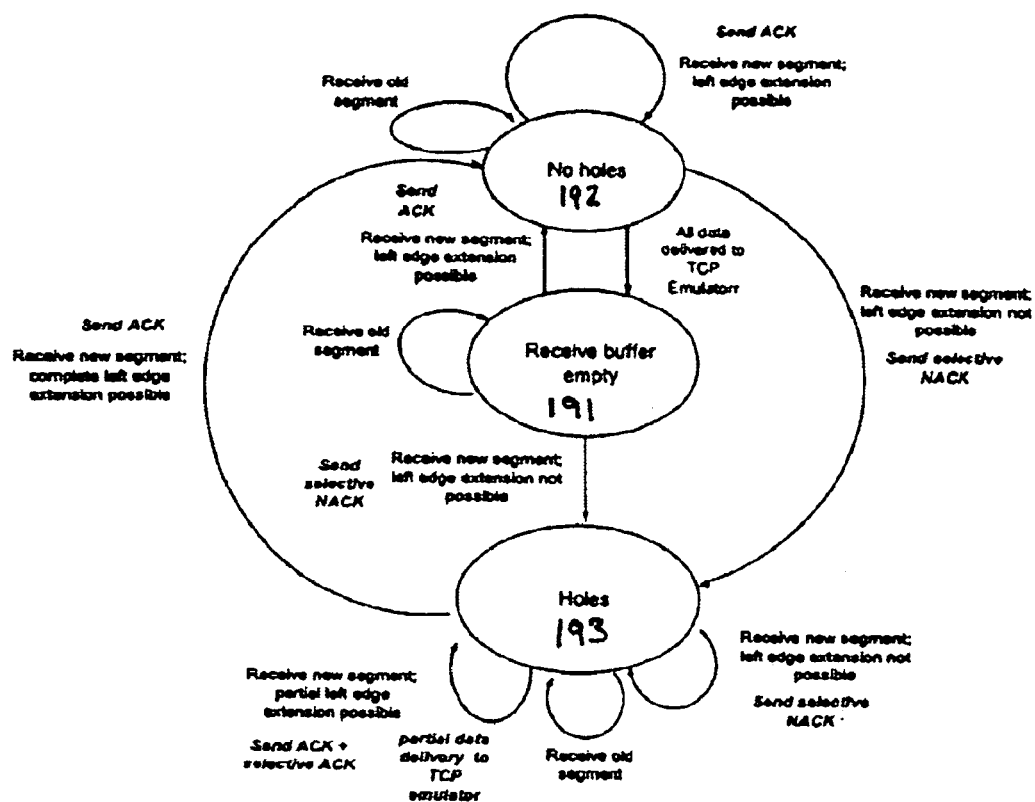
FIG. 19 is a receive state diagram for the flight protocol showing the receive states and transitions between these states of the Flight Protocol algorithms.

FIG. 19 shows the state diagram for the Receive (RX) section of the FP processor. In previous examples these relate to PEP2 34 (see also FIG. 3, 38b). The states relate naturally to the status of the FP Reassembly Buffer 416. State transitions are based on processing a single packet at a time. FIG. 31 lists the conditions that trigger state changes for the RX half of the FP, as well as actions associated with state transitions.

In FIG. 19, The system is initially in the Receive buffer empty state 191, and remains in this state until new (as opposed to already received) data is received. If a packet of new data is received and the packet extends a contiguous sequence starting from the next expected packet, the system moves to the No holes state 192. From the No holes state 192, the receiver will send back an ACK, deliver data to the TCP Emulator and move the left edge of the receive window past the last received packet. When all the received data in the buffer is delivered to the TCP Emulator, the system returns to the Receive buffer empty state 191. Reception of a new packet that extends the data sequence without holes keeps the system in the No holes state 192. The correct new packet is acknowledged, and will be delivered to the TCP Emulator.

From the No holes state 192, if a received data packet gives rise to a received sequence that is not contiguous, and thus comprises a "hole," the system moves to the Holes state 193. Because of the hole in the sequence, received data following the hole in the sequence cannot be delivered and must be held in the RX buffer. The sending of a FP ACK for a packet after a contiguous data block acknowledges the reception of the packet and at the same time indicates the missing portion. As long as one or several holes remain in the received sequence, the system stays in the Holes state 193.

Receiving a new packet does not necessarily result in data delivery. A received packet may, for instance, create a new hole further down the received sequence. Reception of a data packet that completely fills a hole may allow the delivery of data to the TCP Emulator, either partial if the leftmost hole of several is filled, or complete in case a single hole is filled by the received packet. In the latter case, the system moves to the No holes state 192.

It is also possible for a received data packet to partially fill a hole that spans more than a packet. Partial data delivery will then be possible only if the packet extends the already received sequence (an extension of the left edge of the receive window). Otherwise, the hole topology of the received sequence remains the same and no data delivery is possible.

According to the present invention, a network clock is also provided for time stamping buffered FP packets using a satellite-wide clock. The time stamps are used to monitor the in-flight and grounded status of transmitted FP packets. The timestamps may however be based on any clock or counter in real or pseudo time with fine enough resolution.

A Virtual Private Network (VPN) combines the advantages of private and public networks by allowing a company with multiple sites to have the illusion of a completely private network, while using a public network to carry traffic between sites. The 'illusion' is created by the use of tunnels to connect private realms, through a public network system. A VPN hence provides network-to-network or remote-user-to-network connectivity via an encrypted tunnel through the public Internet.

The two key issues in a VPN are tunneling (the masking/hiding of the payload and addresses) and security (the ability to encrypt the contents of the payload). These two concepts are briefly introduced below. The security inherent in a VPN has some negative impacts, most noticeably in a network with large bandwidth-delay products and a mixture of Private and Public EP addressees, such as a satellite environment. In particular the use of PEPs and NATs (Network Address Translators) is limited.

"Tunneling" is the ability to create circuit-like connections across a packet-oriented Wide Area Network (WAN) topology. A tunneling protocol must encapsulate each source network packet into a new packet that contains the connection management intelligence necessary to set up, tear down and manage the tunnel. An effective tunnel mechanism hides the networking data in addition to the application and payload layers.

In terms of network implementations, there are two approaches to establishing tunnels: a "CPE-based approach" (Customer Premises Equipment) and a "network based approach". In the first approach, tunnels are established only between the CPE devices, whereas in the second approach tunnels are also established between the routers of the core non-private network.

In the "CPE-based approach" an end-to-end tunnel exists, meaning that the addresses and payload are hidden across the entire route. Although this matches the VPN concept, it can introduce poor performance because the benefits of appropriate routing by 'trusted' routers are negated. In the "network based approach", some 'trusted' routers have access to the header and possibly payload, enabling them to route efficiently and thereby reduce the cost.

"Security" in a broad sense, is the ability to encrypt the packets so that they cannot be accessed and/or understood by unauthorized users. In recent years the emerging IPSec standard has become the international standard for Virtual Private Networks. Indeed many articles state that IPSec is a requirement for an effective VPN.

IPSec is a suite of protocol standards aimed at providing security services at the network (IP) layer. It can provide host-to-host, host-to-network and network-to-host protection, independently of network topology. Being applied at the IP layer, upper layers are protected transparently. The primary security services offered are:

confidentiality and traffic flow confidentiality;

authentication, data origin authentication, data integrity.

Secondary services such as rejection of replayed packets, access control and key management are also available.

IPSec relies on two main security protocols dealing with protection of traffic:

The IP Encapsulating Security Payload (ESP) provides data confidentiality and limited traffic flow confidentiality protection, with optional authentication and replay-detection services. ESP may be used in either transport, in which only the data payload is protected or in tunnel mode, in which an encrypted version of the complete original datagram is encapsulated into a new datagram.

The IP Authentication Header (AH) defines authentication methods for IP payloads, providing authentication support for the entire IP packet, including the outer IP header. AH also provides connectionless packet integrity, data origin authentication, and an optional anti-replay service.

Key and security association management is achieved with Internet Security Association and Key Management Protocol (ISAKMP) using the Internet Key Exchange (IKE) protocol.

The general procedure for VPNs in the context of the invention is as follows:

(1) A Protected host sends clear traffic to VPN equipment (the source device) located at the point of connection to the public network.

(2) The source device examines the data according to rules specified by the network manager, securing the information or allowing it to pass unaffected.

(3) When data protection is required, the source device encrypts (encodes) and authenticates (through a digital signature or a keyed hash) the whole packet, including the transmitted data as well as the source and destination host IP address.

(4) The source device then attaches a new header to the data, including information that the destination device requires for security functions and process initialization.

(5) The source VPN kit then encapsulates the encrypted and authenticated packet with the source and destination IP addresses of the destination device, or devices. This results in a virtual tunnel through the public network.

(6) When the data reaches the destination VPN device (which a trusted private network resides behind), it is de-capsulated, decrypted, and its integrity and authenticity is checked.

As stated, the combination of tunneling (to create a virtual channel) and encryption (to secure data) naturally leads to the use of Internet Protocol Security (IPSec) measures, with Point-to-Point Tunneling to guarantee security.

Figure 20:
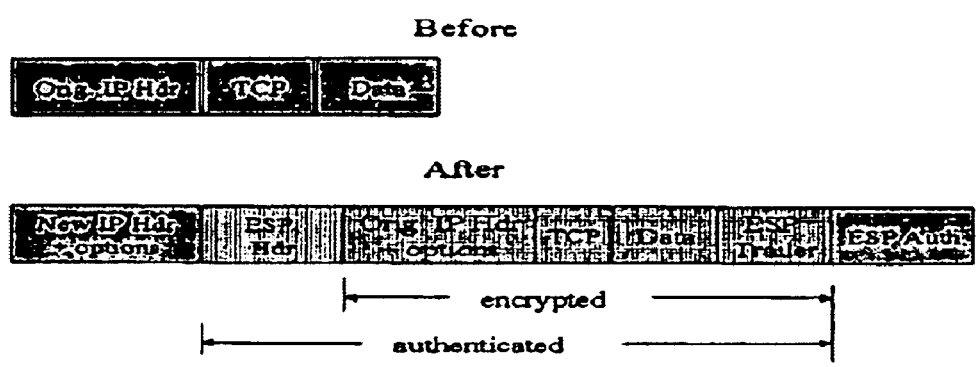
FIG. 20 is an illustration showing the effect of IPSec on TCP header.

The use of IPSec usually introduces negative 'side effects' in GEO satellite multimedia services. The key issue is the hiding of the TCP header by IPSec (see FIG. 20). This means that IPSec is incompatible with the use of PEP performance enhancements. If IPSec is employed end-to-end, PEPs that are implemented on intermediate nodes in the network cannot examine the TCP headers of IP packets because encryption of the IP packets using Encapsulating Security Payload (ESP) (in either transport or tunnel mode) renders the TCP header and payload unintelligible to the PEPs. Without being able to examine the transport headers, a PEP may not function at all. The additional or alternative use of an Authentication Header (AH) is also problematic as it prevents modification of the TCP header which may be a requirement for PEP performance enhancements to function.

Figure 21:
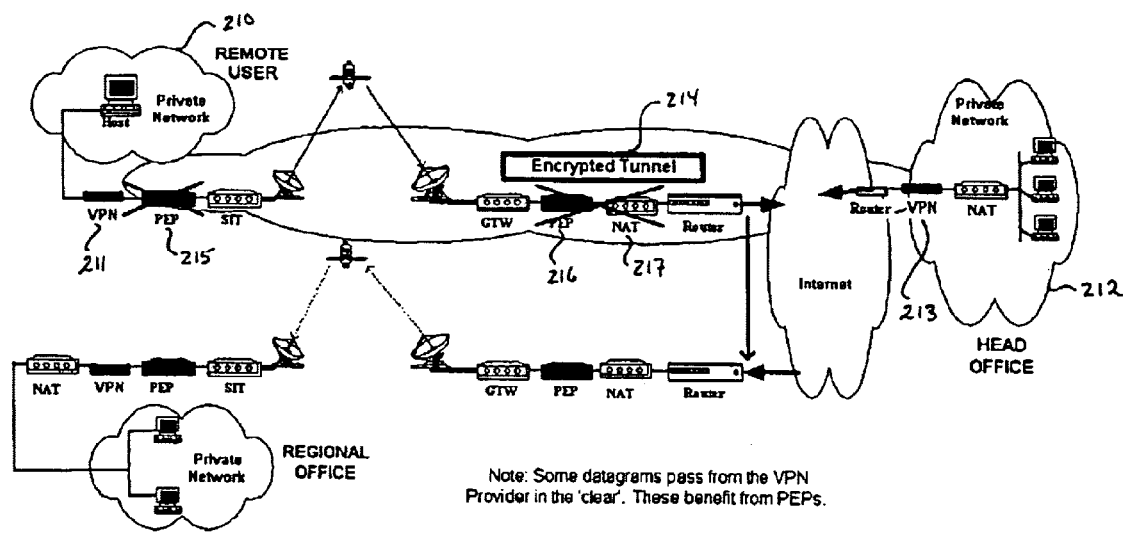
FIG. 21 is an illustration showing the problem encountered when using VPNs and PEPs.

Note that even when a PEP implementation does not break the end-to-end semantics of a connection, the PEP implementation may not be able to function in the presence of IPSec. For example, it is difficult to do ACK spacing if the PEP cannot reliably determine which IP packets contain ACKs of interest FIG. 21 gives an overview of a typical satellite network configuration with a VPN implemented between a remote user 210 and a head office 212. The encrypted tunnel 214 between the two VPN points (211, 213) renders intermediate PEPs (215, 216) and the intermediate gateway-based Network Address Translator (NAT) 217 powerless.

The novel VPN solution of this invention to these problems of conventional systems allows the simultaneous use of VPNs and PEPs in a multimedia GEO satellite system, where the PEPs are not part of the end systems themselves.

In a VPN, packets are encapsulated between user spaces (i.e. traveling over encapsulated space and other users' space). The recommended solution is to split the encapsulation so that user's space exists at the ISP that manages the VPN (allowing the reading of TCP headers and thus the use of NATs, PEPs and other functionality).

Figure 22:
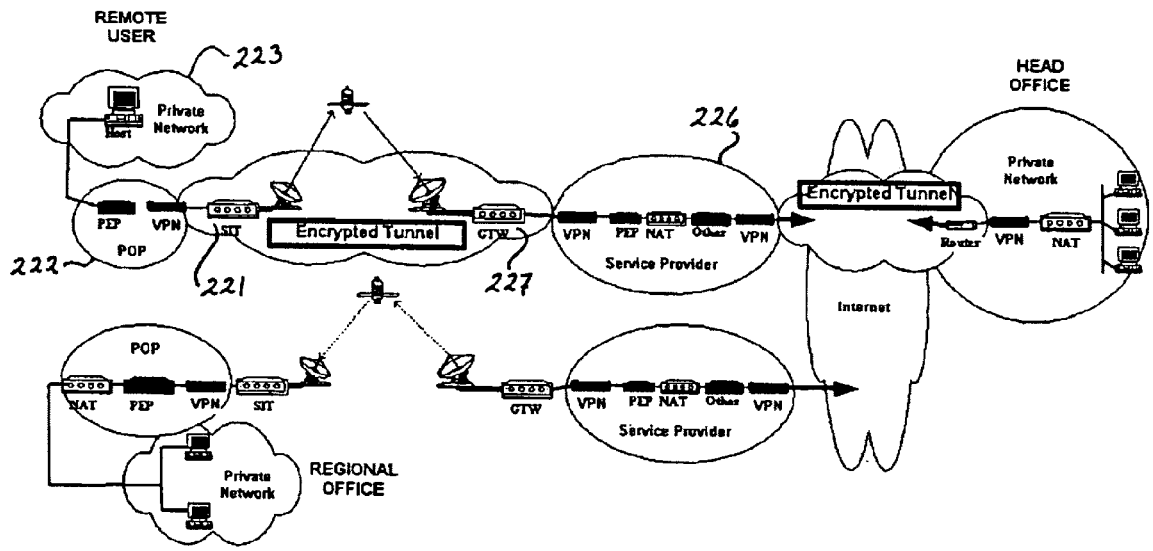
FIG. 22 is an illustration of the recommended solution for VPNs showing the proposed use of VPNs and PEPs simultaneously.

FIG. 22 shows the inventive solution. On the terminal side, the PEP and NAT are included in the POP (Point of Presence) 222, located between the Terminal 221 and Host/LAN 223. Note the use of two PEPs on the Gateway side. The first PEP (at the Gateway, not shown) deals with all non-VPN packets (anything that is not encoded). This is typically traffic (multiple data packets) generated by the commercial terminal. The second PEP is located at the ISP 226 that manages the VPN, with a dedicated link running between the Gateway 227 and ISP 226 (meaning traffic that is not governed by 'conservative' mechanisms, in order to prevent congestion collapse, is not released onto the Internet). VPN termination occurs at the ISP, which has access to the IPSec Security Association and can now employ PEPs, NATs and other functionality.

A requirement that is thought to be peculiar to this approach is the need for some kind of dedicated link or capacity across any public network between the PEP equipment or software and the satellite link. This requirement applies irrespective of whether the PEP is placed across a public network from a terminal or a hub. The dedicated link or capacity may take one of many forms, possibly taking different forms simultaneously in different sections of a given system. Examples of dedicated capacity or links may be an isolated physical link from the PEP, across any public network, to the satellite link or a fixed capacity virtual circuit or similar logical partitioning of capacity. Additionally, a capacity with a fixed upper bound may also be used as opposed to the use of a fixed capacity, the difference being that a fixed upper bound, while still bounding the maximum data rate, allows use of unused capacity by other traffic not related to the PEP. The rationale for this scheme is that the PEP and its traffic are not suitable for public networks because the traffic does not follow what is often known as conservative algorithms for injecting traffic into the network. Allowing this sort of traffic onto public networks would likely cause severe damage to network stability.

Previously, it was considered not possible, for this reason, to run the PEP and its satellite optimized protocol over public networks. In a sense this is still true as PEP traffic will be effectively quarantined from non-PEP traffic.

In any form of this proposed solution it is necessary to have the boxes performing PEP, NAT and VPN functionality in a particular order. The VPN devices must be nearest together at the ends of a particular link or encrypted tunnel. This is because the NAT and PEP devices cannot perform their functions on encrypted traffic. Next to the VPN boxes should be placed the PEP boxes to provide the traffic acceleration on the plaintext (unencrypted) traffic. On the outside of the PEP boxes may be located NAT boxes as the NAT boxes may need to modify the transport layer depending upon the type of NAT in use. NAT boxes are not required at both ends.

The introduction of PEPs should not adversely affect a system's vulnerability, i.e., the security, resistance to attack or robustness and reliability of systems attached to or using the PEP(s). There are two distinct mechanisms by which system vulnerability could occur.

First, the PEP may weaken security or attack resistance features already included elsewhere in the system. For example if the TCP Emulator of the PEP does not implement secure initial sequence number generation, an attacker may establish a spoofed connection to the PEP through a sequence number guessing attack which the PEP, or a second PEP in a distributed scenario, would then connect to the intended target. If the PEP were not present the attack would have failed on the intended target but due to the PEP's presence an attack was facilitated. Thus the PEP can be said to directly weaken available protections if such features are not included.

The second mechanism by which a PEP may become a security risk is through its placement and use in a system. Consider two computers using a PEP. It one were attacked using a Denial of Service (DoS) attack such as a SYN flood attack, both the hosts would potentially be affected. This would occur because the PEP, as the TCP connection terminator, would become the target of the attack by proxy so as to speak. Thus, the attack would affect the target end system by affecting the PEP, but would also affect all other untargeted connected hosts.

The inventive enhanced PEP may be combined with mechanisms to prevent or minimize the impact of such attacks, thus protecting its clients or hosts from such attacks. Not only should the PEP include the standard TCP mechanisms to resist attack, such as secure initial sequence number generation, which may be expected, but also the PEP should include additional features such as, for example, methods to mitigate SYN Flood attacks, fragmentation attacks, the undesirable effects of port scans and any other attacks that commonly occur on the TCP stack.

Lower layer efficiency and error rate mitigation are also improved by this disclosed method and system.

The invention's PEP may be used with a mechanism whereby the TCP MSSs advertised, by the TCP Emulators of the PEPs, to the real communication endpoints are chosen so as to fully utilize an integer number of the fundamental lower layer payload data units. By lower layer fundamental data units, what is meant is usually the link layer data unit or any other unit that is often the unit of retransmission. This method may also take into account that link layer payloads encapsulating a single IP datagram may be of differing sizes, for instance the last payload may be smaller due to the inclusion of an error detection code, e.g. a CRC. This method would typically include calculating the additional overhead from TCP and IP headers (usually 40 bytes) and using an MSS to the real end point that would both avoid fragmentation on the terrestrial link but also occupy fully a whole number of link layer payload units in the link between the PEPs. This technique may be used to optimize the efficiency of the system over Asynchronous Transfer Mode (ATM), Motion Picture Experts Group (MPEG) or similar link layers. Normally the maximum MSS resulting in an MTU conforming to PMTUD and also filling exactly a number of link layer payloads would be chosen.

Additionally, an extension of the above mechanism would be to choose a smaller MSS, forcing a smaller MTU under high error conditions. It is known from theory, and also has been observed in practice, that a smaller MTU is less likely to be hit by errors under a given set of conditions. While smaller MTUs are less efficient in error free or similar conditions, they can actually improve efficiency where there are many losses as the unit of retransmission is reduced.

Therefore, the choice of a smaller MTU, but one that still satisfies the efficient use of a whole number of link layer payload units, would be preferable.

There is nothing to prevent, in theory, the application of the said technique to a system running native ATM and not using IP or indeed any other system where TCP is in use.

The enhanced PEP of the invention needs very little configuration at installation. The enhanced PEP itself will not require pre-configuration with information describing addresses of the attached devices. By this, it is meant that unlike other available products, this novel PEP itself will not need entering into it the addresses of directly connected entities or networks or those entities expecting to receive performance enhancement. Authorization for network use will be handled in other subsystems in the hub(s) and terminals as necessary and the PEP(s) will simply attempt to accelerate all TCP connections arriving at their terrestrial interfaces. Stated explicitly, the PEP is able to intercept and terminate incoming TCP connections, originate and terminate a second connection (which may be a different protocol) over the satellite portion of the end-to-end connection, and also originate the second terrestrial TCP connection, all without the need for pre-configuration of addresses at the PEP. These addresses, which are not pre-configured, may be IP addresses or other equivalent uniquely identifying addresses.

Referring to FIG. 1, the invention's Flight Protocol alternative acknowledgement (ACK) scheme was designed to reduce the return link 11 (inbound to the gateway) overhead traffic used to acknowledge FP data packets flowing on the forward link 12 (outbound from the gateway). The return link traffic consists mainly of FP ACK packets and sometimes of FP data packets.

The ACK scheme uses three different types of ACK packets, shown in FIG. 24, to acknowledge a large and variable number of FP data packets per ACK packet. All ACK packet types have a bitmap of a fixed length that acknowledges FP data packets as well as an FP "ACK packet number" field that specifies the last FP packet that is acknowledged by the bitmap.

The three types of ACK packets are:

Piggyback ACK packets

Data-less ACK packets

Stretch ACK packets.

Piggyback ACK packets 247 are generated when the receiver is sending FP data on the return link as well as acknowledging FP data coming on the forward link. Piggybacked ACKs 247 store their acknowledgement information in the header of a return link data packet and thus do not generate new packets for acknowledgment purposes. Piggyback ACK packets 247 do not use additional return link bandwidth other than what is needed to transmit the return link data packet. On the other hand, Data-less (249) and Stretch ACKs (248) generate dedicated 40 bytes (current implementation). FP packets to acknowledge the forward link data. Piggybacked ACKs 247 are not delayed. They are generated as soon as data is ready to be transmitted over the return link.

The ACK packet size can be reduced even more by the elimination of certain header fields such as the urgent pointer, or they can keep the same size and acknowledge more packets by using the space of those fields as a bitmap that acknowledges several consecutive FP data packets.

Stretch ACKs 248 are generated when no errors are introduced in the forward link packet stream and no data needs to be transmitted on the return link. Stretch ACKs 248 acknowledge a large and variable number of data packets by specifying the packet numbers of the edges/boundaries of a sequence of uncorrupted FP packets. Under error free conditions, Stretch ACK 248 could acknowledge all the FP data packets that arrived during a particular time interval. The time interval corresponds to the setting of the ACK timer.

Three different implementations of Stretch ACK packets are possible. Two implementations allow uncorrupted and corrupted packets to be acknowledged in the same ACK packet and one implementation allows only uncorrupted packets to be acknowledged. For the two implementations that can acknowledge corrupted FP packets, one puts the bitmap before the Stretch sequence of uncorrupted packets (as shown in FIG. 24) and the other implementation puts it after. The bitmap is of a fixed size and is used to acknowledge corrupted and uncorrupted FP data packets. One implementation of the Stretch ACK packet will be chosen, at a later date, based on the ease of implementation and the efficiency of the ACK packet. For now, the implementation of a Stretch ACK that only acknowledges uncorrupted FP packets is assumed throughout this disclosure.

Data-less ACKs 249 are generated under bit error rates that are high enough to make Stretch ACKs 248 inefficient. Stretch ACKs 248 become inefficient when they acknowledge a smaller number of FP data packets than Data-less ACK packets while being of the same size. Data-less ACKs 249 also require that there is no return link data traffic, otherwise Piggyback ACKs 247 are used. Data-less ACKs 249 can also be used when out of sequence packets are received, but this will not happen between the PEPs since PEP1 (FIG. 3, 33) makes sure that the packets are in sequence before transmitting them to PEP2 (FIG. 3, 34). Data-less ACKs will not be used under error free conditions because Stretch ACKs 248 are more efficient.

In summary, each ACK type is suited for a particular situation. The Piggyback ACK type 247 is used whenever return link data packets need to be transmitted. So, sometimes, Stretch ACKs 248 and Data-less ACKs 249 will be converted to Piggyback ACKs 247. The Data-less ACK type 249 is used when many FP packets are corrupted or missing. And finally, the current implementation of the Stretch ACK 248 will be used when a large sequence of FP packets is received and does not contain any corrupted FP packets. Thus, the ACK scheme chooses the proper type of ACK packets depending on the condition of the forward link. The ACK scheme does this in order to minimize the number of bytes required to acknowledge data coming on the forward link.

The ACK scheme starts by building an ACK packet that is type-less until one or more of the following events happen:

If there is data that needs to be transmitted on the return link, then the ACK type is Piggyback 247.

If there is a sequence of uncorrupted FP packets that is at least 40 bytes long and that is not missing any packets, then the packet is a Stretch ACK 248.

If there are FP packets that are missing/corrupted, then the ACK type will be either Piggyback 247 or Data-less 249.

If the timer times out, then the ACK packet is either a Data-less ACK 249 or a Stretch ACK 248 depending on whether there are FP packets that are missing/corrupted or not.

If the last data packet for a particular connection is received, then the type is either one of the three types of ACK packets.

Figure 25:
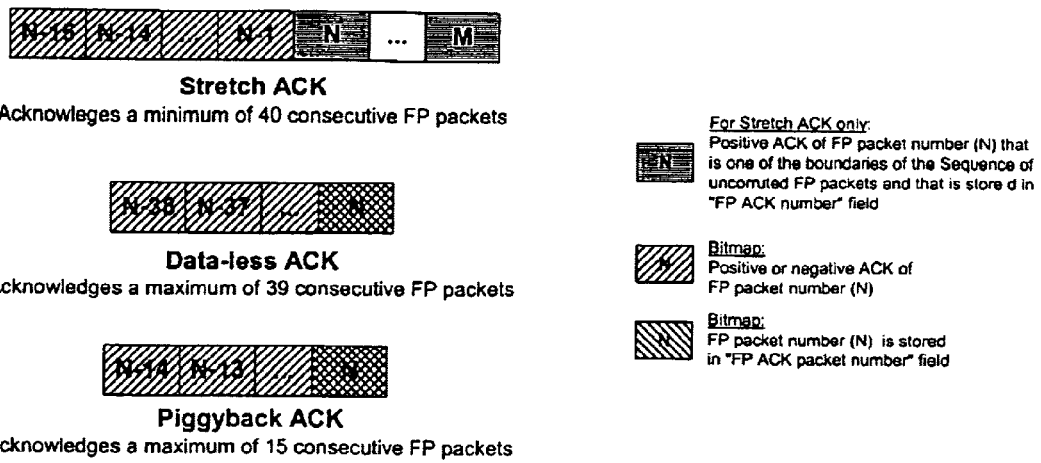
FIG. 25 shows a FP data packet numbers acknowledged by different acknowledgement types.

Each ACK type acknowledges a different number of FP data packets. That number is limited for Piggybacked and Data-less ACKs (247, 249) since they have a fixed size bitmap. However, the number is not limited for Stretch ACKs 248. Piggybacked ACKs 247 and Data-less ACKs 248 acknowledge respectively up to 15 and 39 consecutive FP packets in a single ACK packet. On the other hand, a Stretch ACK 248 acknowledges a variable number of FP packets with a minimum of 40 consecutive packets. The three types of ACK packets differ in the way that they fill up their header space. FIG. 25 describes the FP data packet numbers acknowledged by different ACK types.

The ACK scheme works on acknowledging FP packet numbers and not byte numbers like TCP does. Thus the number of bytes that are represented by one FP packet depends on the size of the FP packet.

The purpose of each ACK is to tell the transmitting PEP, PEP1 33, which FP packets were received correctly and can be deleted from the PEP1 transmit buffer and which ones were received in error. The corrupted packets will be retransmitted on the condition they are grounded.

By the technique of the invention, sixteen bits are freed up in the FP header. A standard TCP packet assigns, in its header, 32 bits for each of the following bit fields: TCP "sequence number" and TCP "ACK sequence number." The TCP header configuration was the starting point in the design of the invention's flight protocol header. The TCP "sequence number" field and the TCP "ACK sequence number" field were replaced in the FP header, by the FP "packet number" field and the FP "ACK number" field respectively. Those two FP packet number fields were also allocated 32 bits each in the FP header. However, FP uses a numbering system that only requires 24 bits, resulting in 8 bits that are unused in each of those two fields.

The FP ACK scheme divides those 16 bits into two in order to specify the type of the ACK packet and to acknowledge more FP data packets.

The FP ACK scheme uses one of those 16 bits to specify the type of the ACK packets. However, the ACK scheme has three types of ACK packets. Thus another bit is required for the differentiation between the types of ACK packets. That bit comes from the TCP header. The TCP header uses a single bit, the "ACK number" bit field, to tell the receiver of the TCP segment whether the "ACK sequence number" field is valid or not. FP uses the TCP "ACK number" bit to specify the ACK type. Thus the ACK type has now two bits with 4 possible permutations: three permutations will specify the ACK type and one permutation will specify that the ACK information is not valid.

The 2-bit field that specifies the ACK type could take any of the following permutations:

| 2-bit field setting | ACK type |
| --- | --- |
| '00' | No valid ACK information |
| '01' | Piggybacked ACK |
| '10' | Stretch ACK |
| '11' | Data-less ACK |

The ACK scheme uses the remaining 15 bits to acknowledge up to 15 consecutive FP data packets. Those 15 bits form a bitmap. The bitmap has the following properties:

Each bit in the bitmap acknowledges a single FP packet;
All packets acknowledged by the bitmap are consecutive to each other. If bit position 'n' acknowledges FP packet number 'N', then bit position 'n-1' acknowledges FP packet number 'N-1'. The same holds for bit 'n-X' and FP packet number 'N-X';

A packet that was received uncorrupted is positively acknowledged by setting its corresponding bitmap position to a "TRUE" state.

A packet that was received corrupted is negatively acknowledged by setting its corresponding bitmap position to a "FALSE" state;

The bitmap can acknowledge less packets than its size allows by setting the bits after the last positive acknowledgement bit to a "FALSE" state;

The last FP packet that is acknowledged in the bitmap of an ACK packet has to be received uncorrupted, i.e. has to be a positive acknowledgment;

The last FP packet that is acknowledged in the bitmap of an ACK packet will be specified in the FP "ACK packet number" field and will have to be the last bit of the bitmap that is set to a "TRUE" state. All the bits after it will be set to a "FALSE" state.

This 15-bit bitmap is present in all types of ACK packets. However, a Data-less ACK 249 has the benefit of another 24-bit bitmap that extends the default one from a 15-bit bitmap to a 39-bit bitmap.

The current implementation of the Stretch ACK type of packet limits the use of the bitmap by allowing it to only positively acknowledge FP packets. Thus the current implementation of the Stretch ACK can only acknowledge error free transmissions. Two other variations on the Stretch ACK can be implemented and would allow the bitmap to positively and negatively acknowledge the FP packets.

It should be noted that the one bit that is taken from the 16 free header bits in order to specify the ACK type could have been found elsewhere in the FP packet header. For example, the FP ACK scheme could have used a slightly different way to specify the header length. The TCP "Header length" field is a 4-bit field that is used with a numbering system that relies on 32-bit words to specify up to 60 bytes of header length (see FIG. 23, 243). The FP ACK scheme could use a three-bit field along with 48 bit words, and would assume a minimum length of 20 bytes for the FP header. Another example is where the needed bit is taken elsewhere in the header by de-allocating the TCP "Reset bit" and using its one bit field. A particular setting of the TCP 6-bit header field is used to reset the connection. For example, the six bit TCP flag could be set to a '111111', TRUE state for all its six fields.

The bitmap and associating bit positions are decoded with FP packet numbers. The receiver of the ACK packet decodes the bitmap and finds which packets were received uncorrupted and which were not. The receiver will scan the bitmap and search for the last bit that is set to a TRUE state inside the bitmap. This bit corresponds to the last FP packet number that is acknowledged by the bitmap. Also, the FP packet number of this last TRUE bit will be specified in the FP "ACK packet number" field. Thus the last packet in the sequence of FP packets being acknowledged by the bitmap was determined. Now, the receiver can work backwards and associate each bitmap bit to a FP data packet.

The different FP ACK types have different header settings. The FP header is derived from the TCP/IP header. It maintains TCP/IP's fields but adapts and modifies three of them as outlined in the Flight Protocol packet structure (see FIG. 23). TCP's "packet sequence number" was replaced with FP's "packet number" 235 and TCP's "ACK packet sequence number" was replaced with FP's "ACK packet number" 236. Finally, TCP's "ACK number" one-bit field was replaced with the FP's "ACK type" two-bit field (245*a*, 245*b*). The bit layout of the previously mentioned fields was modified from what TCP specified and resulted in free bits in the header.

The FP header is also a bit different between the three ACK types. In the preferred embodiment of the ACK scheme, the header length is the same for all types of ACK packets. One particular field, the FP "packet number" field 235, is used as such for only one type of ACK packets: Piggyback ACKs 247. The other two types make use of this 24-bit field differently.

The FP header space has also some free bits that are used for the same purpose by all types of packets. There are a total of 16 bits that are used for two purposes. Fifteen bits are used as a bitmap to acknowledge, positively or negatively, a sequence of up to 15 consecutive FP data packets and one bit 245*b* is used along with the TCP "ACK number" bit 245*a* to specify the type of the ACK packet in a two-bit FP packet field.

It should be noted that the ACK scheme could modify more than the three fields that were previously mentioned. Also, the length of the header for the different types of ACK packets does not have to be the same and can be changed by the elimination or modification of certain TCP header fields. For example, the TCP urgent pointer could have been used as an additional bitmap to acknowledge more packets or it could have been eliminated resulting in smaller ACK packets.

The timer used to delay an ACK to attempt to ACK multiple data packets per ACK packet is limited by the value chosen for the timer at PEP 1 which triggers after a timeout resulting from a lack of ACKs. Specifically, the timer used for attempting to ACK multiple packets must be less than the 'lack of ACK timer', previously described, by at least RTT+Epsilon to avoid unnecessarily re-transmitting packets that have arrived successfully. This criteria is selected to prevent unnecessary re-transmissions and the associated drop in efficiency and also throughput in a heavily loaded system. The value of the multiple ACK timer is chosen to avoid slowing data throughput needlessly.

The "FP packet number" field of the novel FP header is also significant. It was mentioned earlier that the receive PEP (PEP2) will not all the time be transmitting data on the return link. This has two consequences on the ACK packets that do not carry any return link data:

The FP packet number field 235 will not be used to specify a valid FP packet number;

The length of the ACK packet will be that of the header, since no data is appended at the end of the header.

Since the FP packet number field 235 will not be used, the Data-less ACKs 249 and Stretch ACKs 248 can make use of the FP packet number field 235 to acknowledge more data packets. Each one of those two types will use those 24 extra bits differently. FIG. 24 shows how the FP packet number and FP ACK number fields are used.

The three paragraphs that follow summarize how each type of ACK packets uses the FP packet number fields:

(1) A piggybacked ACK 247 uses the field 235 as is and stores the FP packet number of the data packet that is appended after the header. This is what the field 235 was intended for under TCP, but FP uses packet numbers instead of TCP's byte numbers. So, the piggyback ACK is the most similar type of ACK packet to a TCP/IP datagram.

(2) A Data-less ACK 249 converts the FP "packet number" field into a 24-bit bitmap. This bitmap is used to acknowledge, positively or negatively, 24 additional FP data packets. The 24-bit bitmap is used to extend the original 15-bit bitmap that each ACK packet has, into a 39-bit bitmap for the Data-less type of ACK packets. This makes the Data-less ACK 249 the type to use when many packets are in error or are out of sequence.

(3) A Stretch ACK 248 converts the FP "packet number" field into a FP "ACK packet number" field 246. The Stretch ACK 248 uses the field to store the packet number of another of the FP packets that it is acknowledging. Thus, a Stretch ACK 248 explicitly specifies two FP ACK packet numbers. The first "ACK packet number" field 236 corresponds to the last FP packet that is acknowledged by the bitmap and the second FP "ACK packet number" 246 corresponds to the last FP packet that is received correctly. Thus, the second FP packet number 246 that is specified in the header corresponds to the last FP packet number of an uncorrupted sequence of numbers that started with the first explicitly specified FP packet number 236 and ended with the second FP packet number 246.

The stretch ACK 248 positively acknowledges the receipt of any number of packets located between the first FP packet number (N) 236 and the second FP packet number (M) 246 specified in the header as long as they are all received correctly. However, a Stretch ACK 248 has to be more efficient than a Data-less ACK 249 and has to acknowledge more than 39 FP packets. Thus, the sequence of FP packets that is positively acknowledged by specifying its first FP packet number 236 and its last FP packet number 246 should contain at least 25 consecutive FP packets.

As regards when to generate an ACK packet, the ACK scheme delays the generation of the ACK packets in order to save return link bandwidth while maintaining a reliable two way communication. The receiver signals the loss of all the corrupted FP packets to the transmitter so that they are retransmitted. The receiver also acknowledges the receipt of uncorrupted FP packets so that the transmitter deletes them from its buffer.

The FP ACK scheme is as reliable as the TCP ACK scheme is. However, the FP ACK scheme generates ACK packets on more occasions when compared to TCP's ACK scheme. The FP ACK scheme generates ACK packets under the following conditions:

1. The ACK timer times out after X seconds due to X seconds of inactivity on the return link.
2. The ACK packet bitmap got filled up, i.e. cannot acknowledge more FP packets, and the ACK type is not a Stretch ACK.
3. The last data packet was received and was detected by the setting of the FIN flag.
4. Data needs to be transmitted on the return link.

If the link is error free, then the system will generate Stretch acknowledgments. Stretch ACKs acknowledge a very large number of ACK packets in error free conditions. While a stretch ACK is being updated by the receiver following the reception of FP packets, it will not be generated and transmitted until an error occurs, which will not happen under error free conditions. Thus, a mechanism should trigger the generation of ACK packets after a determined period of inactivity. This is where the timer comes in.

If the link is not error free, then most likely Data-less ACKs will be generated. However, Data-less ACK packets acknowledge a limited number of FP packets. Thus, a check that determines whether the ACK packet got filled or not is needed. If it got filled, then it should be generated.

The receiver can tell when it is receiving the last data packet by checking the FIN flag in the header. If the flag is set, then it can generate the ACK packet right away and not wait for the ACK timer to time out.

If there is data that needs to be transmitted over the return link, then the receiver generates Piggybacked ACKs. Piggybacked ACKs are very efficient since they acknowledging packets at no extra cost in terms of return link bandwidth.

Use of the inventions's ACK timer is based on the principle that the flight protocol ACK scheme is to reduce the number of acknowledgment packets generated. However, the system would want to maintain a minimum level of activity on the return link per time interval in order to free up some of the buffer space held up by the data at the transmitter side. This is the job of the ACK timer. It times out after X seconds of return link inactivity and forces the receiver (PEP2) to transmit the appropriate ACK type.

Under error free conditions, the system can use stretch ACKs to acknowledge any number of in-sequence FP packets. Thus the number of ACK packets generated in error free conditions will only depend on the ACK timer setting and the number of time intervals it will take to transmit the data.

There is compromise to be made between the amount of return link traffic generated and the amount of buffer space needed at the transmitter. The larger the ACK timer time interval, the larger the buffer size requirements are at the transmitter.

If the timer timed out twice or more and no data was received between those timeouts, then ACK packets are generated that have the same information as the FP "ACK packet number" field. If the transmitter receives several of those ACK packets, then it will know that no data is flowing on the forward link due to either a non available link or due to problems at the packet source. The connection can then be reset after several of those timeouts for a connection that was properly established and after just a few similar ACK packets for a connection that started due to the SYN packet of a TCP connection and that did not send any actual data.

Figure 26:
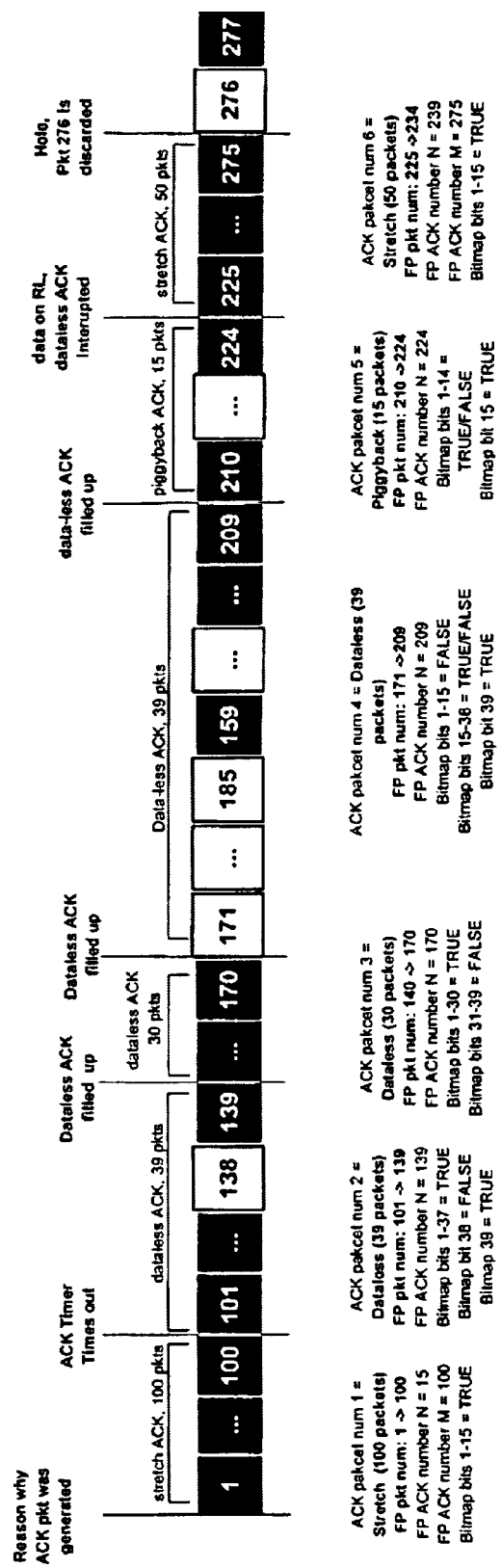
FIG. 26 shows an example of the generation of acknowledgement packets.

FIG. 26 describes the example generation of ACK packets.

The ACK scheme uses three different types of ACK packets. The receiver should have some conditions that tell it which type of ACK packets to generate. The following conditions are a summary of the ACK packet generation algorithm.

Figure 27:
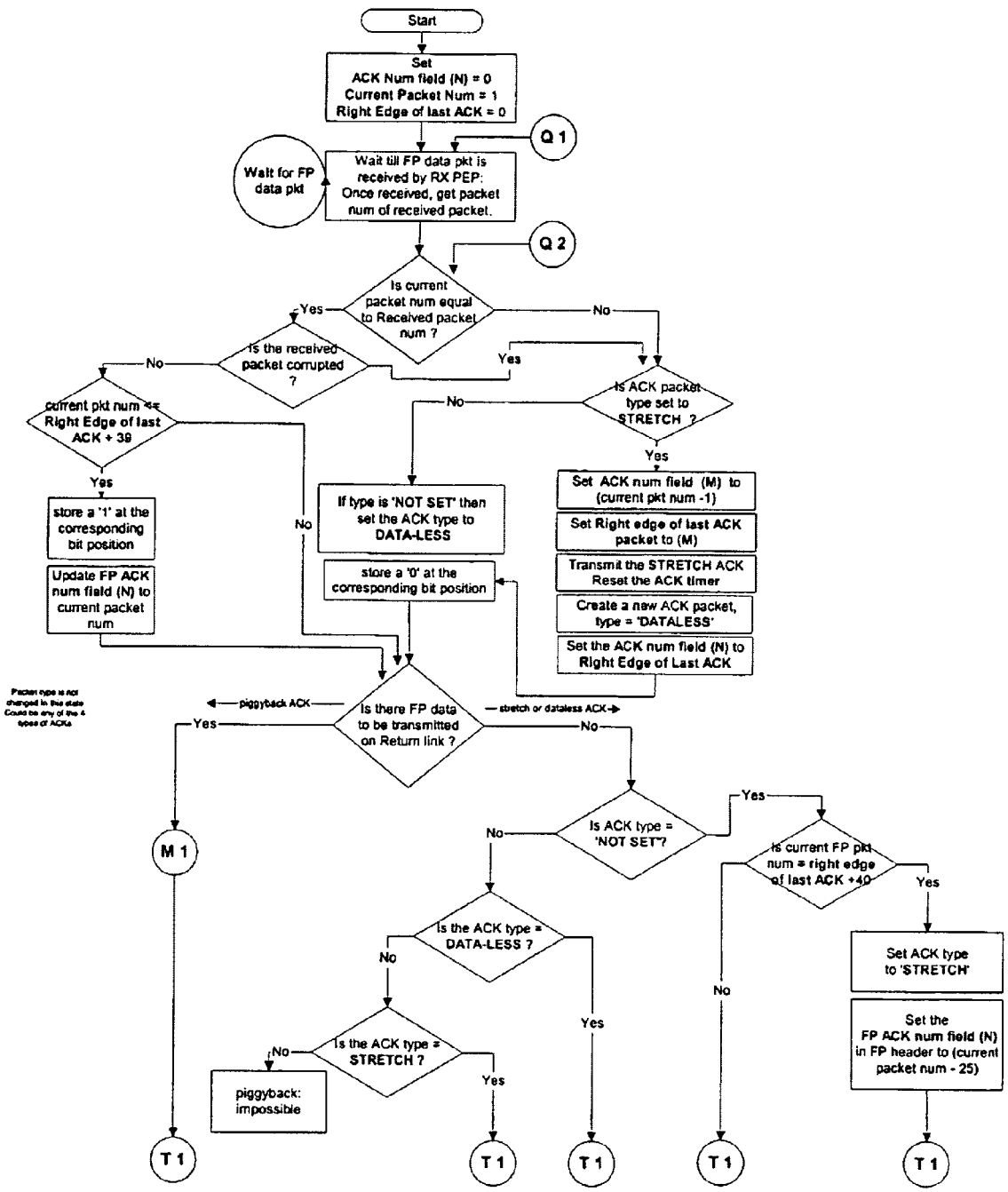
FIG. 27 is a flow chart showing the procedure of the receipt of FP data packets and the generation of FP acknowledgement packets.
Figure 28:
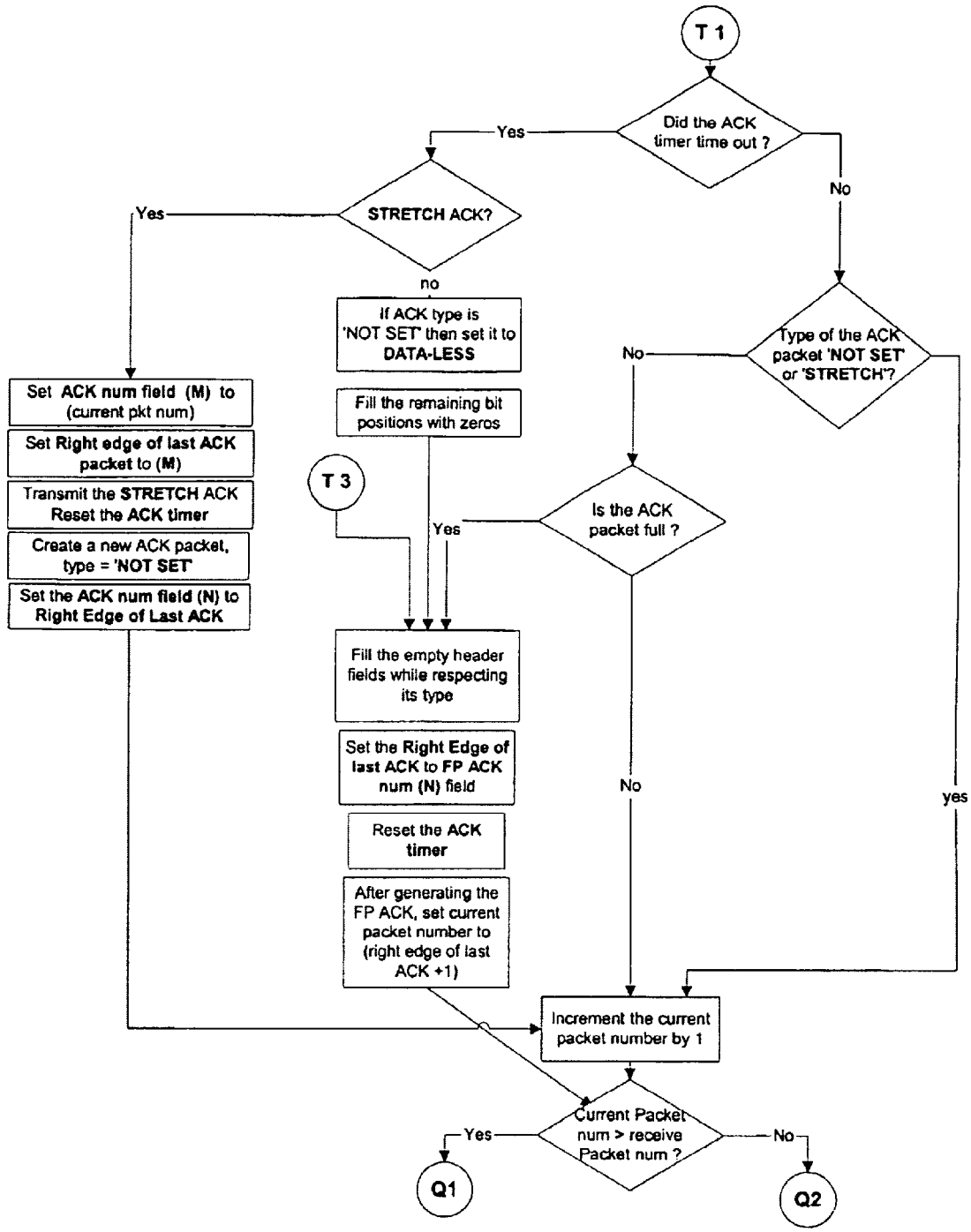
FIG. 28 is a flow chart showing steps of the continuation of the acknowledgement generation algorithm.
Figure 29:
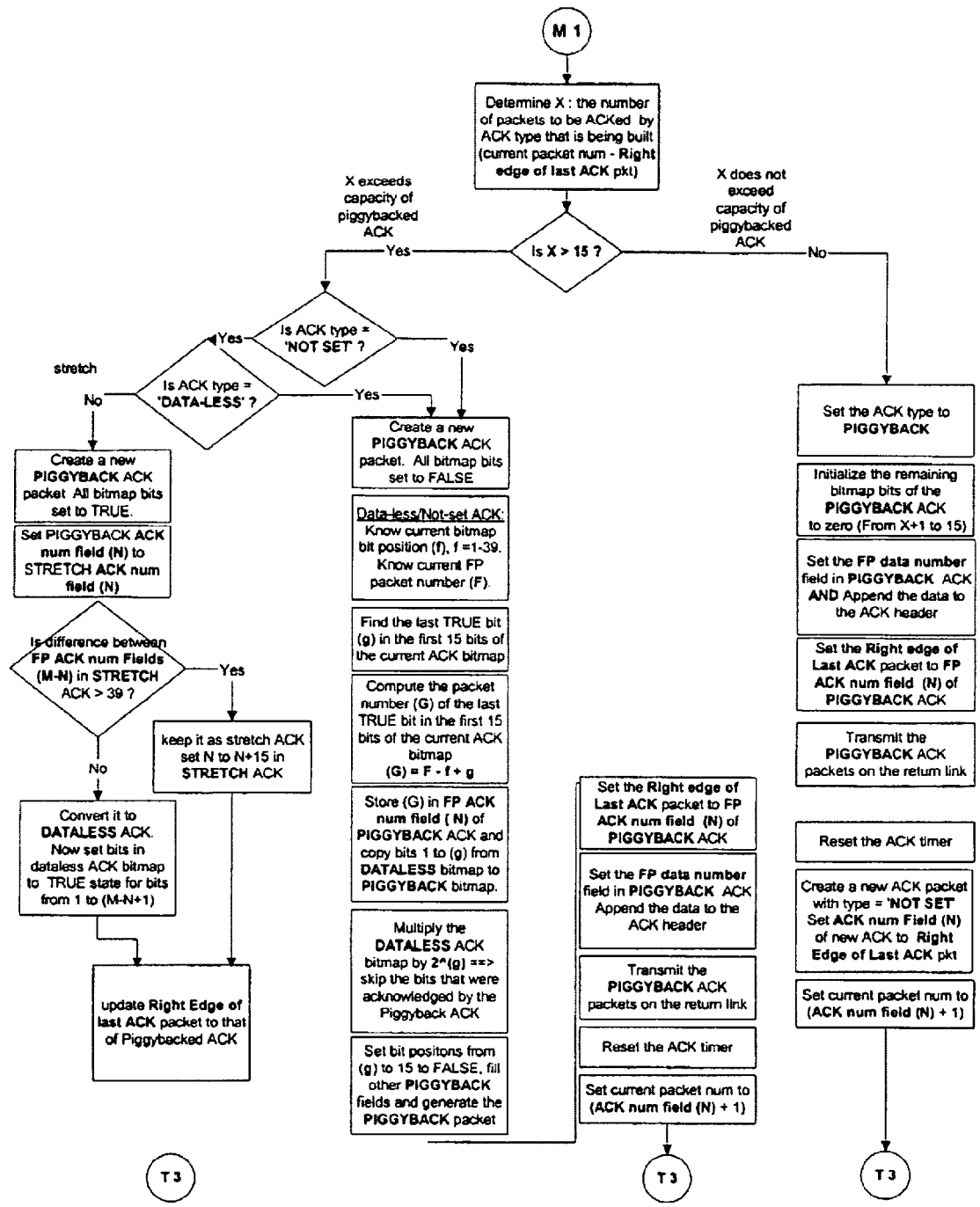
FIG. 29 is a flow chart showing steps of the continuation steps for the conversion to piggyback type of acknowledgements.

1. Conditions to generate Stretch ACKs:
No corrupted packets AND No data on Return link AND No out of sequence data packets
FP Packet Number>Right Edge of last ACK packet +39 AND ACK packet type 'NOT SET' yet AND No data on Return link
ACK timer times out 2. Conditions to generate Data-less ACK:
FP hole Number<Right Edge of last ACK packet +39 AND No data on Return link
ACK timer times out 3. Conditions to generate Piggybacked ACK:
Data on Return Link FIGS. 27, 28 and 29 show the algorithms that cause the generation of appropriate type of ACK packet.

The invention provides for knowing when to use the different acknowledgement signals. The system has means to decide which ACK type is the most efficient given the circumstances. The circumstances that affect the type selection of the different ACKs are:

1. The amount of packet errors that is in the system
2. The spread of the packet errors in the system
3. The need to transmit data packets on the return link. The system could be in the process of building a Stretch ACK or a Data-less ACK when return link data needs to be transmitted. The system will convert the Stretch or Data-less ACK to Piggyback ACKs since they do not cost anything in terms of bandwidth. Thus, Piggyback ACKs will be used when the receiver needs to transmit data packets on the return link. Otherwise, piggybacked ACKs are not used.

In the preferred embodiment of the ACK scheme the system does not generate Stretch ACKs under error conditions. So, for the Stretch ACK to be more efficient that a Data-less ACK, more than 39 packets need to be acknowledged by the Stretch ACK.

Finally, the system will have to use Data-less ACKs when packets are corrupted. If the implementation of the Stretch ACK allows for certain corrupted packets to be acknowledged by the Stretch ACK, then a Data-less ACK will be generated under the following conditions:

1. The spread of the packet errors is more than 15 packets;
2. There are more than 15 consecutive corrupted FP packets;
3. The continuous sequence of uncorrupted FP packets that is received has less than 25 consecutive uncorrupted FP packets.

In summary the ACK scheme of this invention disclosure is much more efficient than the TCP ACK scheme since it allows a large and variable number of FP packets to be acknowledged by the same ACK packet.

The scheme specified three different types of ACK packets each suited to particular conditions of the forward and return links. The Piggyback ACK is used when there is data to transmit on the return link. The Stretch ACK is used under error free conditions on the forward link and the Data-less ACK is used under error conditions of the forward link. Piggyback ACKs acknowledge up to 15 consecutive FP data packets, Data-less ACKs acknowledge up to 39 consecutive FP data packets and Stretch ACKs acknowledge up to $2^{24}$ consecutive and error free FP data packets.

The ACK scheme uses a timer to trigger the generation of ACK packets after a certain period of return link inactivity. The ACK packets that are generated because of a time-out will be similar. The receiver of those ACK packets can tell that they are similar and that they are due to timeouts and react by possibly resetting the connection.

Keeping track of the acknowledged FP packets is easily done. An FP acknowledgement packet is purely an ACK packet that is 40 bytes long. It fits snuggly inside an ATM cell since the ATM cell payload is 48 bytes. The remaining 8 bytes are used by ATM AAL5 because the IP packets are of variable size. The ACK bit field inside the FP packet will be enabled.

The following is a summary of the characteristics of the ACK scheme:

1. The ACK scheme can acknowledge a large and variable number of FP packets using a single ACK packet;
2. The ACK scheme uses three types of ACKs: Piggybacked, Data-less and Stretch ACKs;
3. The ACK scheme monitors the number of consecutive FP packets that are received error free and based on their number, decides to use a Data-less ACK or a Stretch ACK. It uses a Stretch ACK only when it receives 40 consecutive uncorrupted FP packets. Otherwise, it uses Data-less ACKS. However, it uses Piggybacked ACKs if there is data that needs transmitting on the return link;
4. The ACK scheme uses a 2-bit field in the FP header to specify the type of ACK packet that is received;
5. The ACK scheme can determine the packet type based on its length. For example, a Piggyback ACK packet is will contain data on top, of the header and will be longer than the other two types that do not contain data.

6. The ACK scheme uses a bitmap to represent the receive status of the sequence of FP packets that it received. All ACK types contain a bitmap. The size of the bitmap depends on the type of the ACK packet. Data-less ACK packets use a 39 bit bitmap and Piggybacked and Stretch ACKs use 15 bits bitmaps. If the bitmap of a certain ACK type got filled up, then the ACK packet will be generated and a new one will be created with no type assigned to it yet.

7. Stretch ACKs acknowledge packets that are specified in the 15-bit bitmap as well as packets that fit in a range of FP packet numbers. Two FP "ACK packet numbers" specify that range.

8. Data-less, Piggybacked and Stretch ACKs have one FP "ACK packet number" field to specify the last uncorrupted FP packet that can acknowledged by the bitmap. The last uncorrupted FP packet that is received and that falls within the boundaries of the bitmap, is explicitly specified in the FP "ACK packet number" field. All the bits that are after it in the bitmap and that correspond to FP packets with a higher FP packet number should be initialized to zero.

9. Stretch ACKs have two FP "ACK packet number" fields. The first one specifies the FP packet number of bit number 15 and marks the beginning of the range of packets that are in sequence and are uncorrupted. The second FP "ACK packet number" field specifies the end of that range of packets that are in sequence and are received error free.

10. The Flight Protocol numbers each data packet with a sequence number that is not dependent on the length of the FP packet but on its sequence with respect to other FP packets that are generated. The first FP packet gets sequence number '1'.

11. The ACK scheme uses a timer to trigger the generation of ACK packets after a certain period of inactivity.

12. Data packets of an error free transmission are received in sequence and can be acknowledged by a single stretch ACK packet.

Generally, the enhanced PEP described will perform at its best when TCP (which the PEP and FP in part replace) performs at its worst. Links with high delay, high bandwidth, high bit error rate and quickly and widely varying link rates are therefore the most suitable for PEP enhancement. In addition, highly asymmetric systems where return link capacity is a bottleneck can also be enhanced by the use of the optional, more efficient, FP ACK scheme.

The most efficient mode of manufacture known to the inventors involves modifying a TCP/IP stack to perform the TCP Emulator functions of the PEP. These modifications involve being able to receive the whole TCP/IP packet at the application layer and also being able to customize the outgoing TCP/IP packets by preserving some of the parameters received over the satellite link, as has been described. The method has also been described whereby this modified TCP/IP stack is interfaced to through functionality encapsulating and building on the native stack functionality, such as the Open and Close functions described which are able to break complex tasks up into a series of simpler ones.

It will be apparent to those skilled in the art that various modifications and variations can be made to this invention without departing from the spirit or scope of the invention. Thus, it is intended that the present invention cover the modifications and variations of this invention provided that they come within the scope of any claim and its equivalents.

What is claimed is:

1. A method for sending and receiving data packets over a communications system using a transmission control protocol (TCP), said method comprising the steps of:

replacing a segment of the communications system with a middle communications link operating under a flight protocol with a premise that a connection will be created successfully across the middle communications link;

maintaining TCP connections at a first end point and a second end point of the communications system and beginning to receive data packets from the first endpoint independent of a pre-data agreement from the second endpoint;

converting the data packets sent over the first endpoint from TCP to said flight protocol;

transmitting the converted data packets from a first end of the middle communications link using the flight protocol;

receiving the data packets at a second end of the middle communications link;

reconverting the data packets from the flight protocol to the TCP, wherein all non-TCP data, all non-TCP related Internet Control Message Protocol (ICMP) data, and all encrypted TCP data sent from the first endpoint pass through the middle communications link without being modified;

transmitting one or more acknowledgement packets from the second end to the first end of the middle communications link; and sending the data packets in the TCP to the second endpoint of the communications system.

2. The method of claim 1, wherein data packets that are not converted are delayed passing through the middle communications link such that there is zero relative delay between arrival of converted and unconverted packets at said second endpoint.

3. The method of claim 1, wherein said transmitting step further comprises adjusting the communications system to changes in a forward rate capacity by varying a data rate within the middle communications link.

4. The method of claim 1, wherein said maintaining step further comprises adjusting to changes in a forward rate capacity of the communication system by varying a rate of TCP acknowledgements sent from said middle communications link back over the first endpoint.

5. The method of claim 1, wherein the transmitting step further comprises assigning a sequential flight protocol packet number to each said converted data packet.

6. The method according to claim 5, wherein the receiving step further comprises storing all flight protocol packets that have been received without corruption but which do not extend the effective left edge of a flight protocol receive window.

7. The method according to claim 1, wherein said replacing step further comprises establishing two separate simplex flight protocol connections in said middle communications link wherein each of said simplex connections may be torn down independently.

8. The method according to claim 1, wherein said converting step further comprises:

filtering ICMP messages from the data packets; and reacting to the ICMP messages.

9. The method according to claim 8, wherein said step of reacting to the ICMP messages comprises:

acting upon a path maximum transmission unit (MTU) discovery message by reducing a path MTU estimate of a terminal end of said middle communications system before resending any data packet that is reduced in size to conform the new path MTU;

acting upon a destination unreachable message by causing an end to end connection tear-down for connections that have not been correctly established or by attempting to resend the data packet from the terminal end of said middle communications link for established connections;

acting upon a source quench message by causing the converting step to slow start;

acting upon a parameter problem code by performing an end-to-end connection abort;

acting upon a time exceeded code by resending the affected data packets; and allowing other ICMP messages to pass to an ultimate destination.

10. A method for sending and receiving data packets over a communications system using a transmission control protocol (TCP), said method comprising the steps of:

replacing a segment of the communications system with a middle communications link operating under a flight protocol with a premise that a connection will be created successfully across the middle communications link;

maintaining TCP connections at a first end point and a second end point of the communications system and beginning to receive data packets from the first endpoint independent of a pre-data agreement from the second endpoint;

converting the data packets sent over the first endpoint from TCP to said flight protocol;

transmitting the converted data packets from a first end of the middle communications link using the flight protocol;

receiving the data packets at a second end of the middle communications link;

reconverting the data packets from the flight protocol to the TCP;

transmitting one or more acknowledgement packets from the second end to the first end of the middle communications link; and sending the data packets in the TCP to the second endpoint of the communications system; wherein the replacing step further comprises splitting an encapsulation of a virtual private network (VPN) packet so that VPN user space exists at a service provider that manages the VPN and placing a receiving end of said middle communications link and network address translators (NAT) at the service provider.

11. The method of claim 10, wherein said replacing step further comprises: placing a first VPN device nearest to a first end of said encrypted tunnel;

placing said first end of said middle communications link next to said first VPN device;

placing a first NAT next to said first end of said middle communications link furthest from said encrypted tunnel;

placing a second VPN device nearest to a second end of said encrypted tunnel;

placing said second end of said middle communications link next to said second VPN device; and placing a second NAT next to said second end of said middle communications link furthest from said encrypted tunnel.

12. A method for sending and receiving data packets over a communications system using a transmission control protocol (TCP), said method comprising the steps of:

replacing a segment of the communications system with a middle communications link operating under a flight protocol with a premise that a connection will be created successfully across the middle communications link;

maintaining TCP connections at a first end point and a second end point of the communications system and beginning to receive data packets from the first endpoint independent of a pre-data agreement from the second endpoint;

converting the data packets sent over the first endpoint from TCP to said flight protocol;

transmitting the converted data packets from a first end of the middle communications link using the flight protocol;

receiving the data packets at a second end of the middle communications link;

reconverting the data packets from the flight protocol to the TCP;

transmitting one or more acknowledgement packets from the second end to the first end of the middle communications link; and sending the data packets in the TCP to the second endpoint of the communications system; wherein said maintaining step further comprises calculating an additional overhead from TCP and other Internet protocol headers; choosing a TCP maximum segment size that avoids fragmentation and occupies fully a whole number of link layer payload units in said middle communications system; and communicating said maximum segment size over the first and second endpoint of said communications system.

13. A method for sending and receiving data packets over a middle communications link of a TCP communications system, comprising the steps of:

passing data packets to a first emulator wherein said emulator emulates a receive side of a TCP connection and wherein said emulator translates said data packets from TCP to a flight protocol;

transmitting connected data packets over the middle communications link on the basis of information received from a capacity prediction algorithm;

storing copies of the transmitted packets at said first emulator and time-stamping the transmitted data packets;

receiving the transmitted data packets at a second emulator;

storing each of said received transmitted data packets in a reassembly buffer if the received transmitted data packet does not complete a continuous sequence of all the received transmitted data packets transmitted before it in said middle communications link;

retrieving previously stored data packets from said reassembly buffer if the last received data packet completes a contiguous sequence sending acknowledgements of successfully received data packets from the second emulator to the first emulator;

deleting or retransmitting stored packets depending upon acknowledgements received at the first emulator; and passing said transmitted data packets from a second emulator wherein said second emulator translates from said flight protocol to TCP and wherein said second emulator emulates a transmit side of the TCP connection.

14. The method of claim 13, wherein said first emulator uses secure initial sequence number generation, to reduce security risks.

15. The method of claim 13, further comprising methods to mitigate at least one of synchronize packet (SYN) flood attacks and fragmentation attacks.

16. A method for sending and receiving data packets over a middle communications link of a TCP communications system, comprising the steps of:

passing data packets to a first emulator wherein said emulator emulates a receive side of a TCP connection and wherein said emulator translates said data packets from TCP to a flight protocol;

transmitting connected data packets over the middle communications link on the basis of Information received from a capacity prediction algorithm;

storing copies of the transmitted packets at said first emulator and time-stamping the transmitted data packets;

receiving the transmitted data packets at a second emulator;

sending acknowledgements of successfully received data packets from the second emulator to the first emulator;

deleting or retransmitting stored packets depending upon acknowledgements received at the first emulator; and passing said transmitted data packets from a second emulator wherein said second emulator translates from said flight protocol to TCP and wherein said second emulator emulates a transmit side of the TCP connection; wherein said sending acknowledgements step comprises the steps of piggy-backing acknowledgment packets on flight protocol data sent on a return link if there is data that needs to be transmitted on the return link; sending a single "stretch" acknowledgment to acknowledge all the flight protocol data packets that arrived during a particular time interval if there is a sequence of uncorrupted flight protocol packets of a predetermined length that is not missing any packets and no data needs to be transmitted on the return link; and sending a data-less acknowledgment if a predetermined number of flight protocol packets is corrupted or missing and no data needs to be transmitted on the return link.

17. A middle communications segment in a TCP communications system, comprising:

a first emulator to simulate a standard TCP connection at a first end of said TCP communications system wherein said first emulator simulates end-to-end pre-data agreement with said first end and begins receiving data independent of a pre-data agreement from the terminal end of said TCP communications system and wherein all non-TCP data, all non-TCP related Internet Control Message Protocol (ICMP) data, and all encrypted TCP data sent from the first end pass through the middle communications segment without being modified;

an algorithm to convert data packets from TCP to a flight protocol;

a first buffer to store said data packets until acknowledgements for the data packets have been received from the receiving end of said middle communications link;

an algorithm to transmit flight protocol data packets over said middle communications link;

an algorithm to receive said flight protocol data packets at a receiving end of said middle communications link;

an algorithm to acknowledge receipt of said data packets that are received at the receiving end of said middle communications system;

a second buffer to store a received flight protocol data packet at the receiving end of said middle communications link until all of the flight protocol data packets transmitted before said received packet have also been successfully received;

an algorithm to reconvert data packets from said flight protocol to TCP; and a second emulator to simulate a standard TCP connection at a second end of said TCP communications system, wherein said second emulator simulates end-to-end pre-data agreement with said second end of said TCP communications system.

18. The system of claim 17, further comprising an algorithm to vary the transfer rate within said middle communications link to adjust to capacity changes in a forward direction of said communications system.

19. An enhanced performance enhancing proxy (PEP) system for transferring data between a client and a server using TCP over a wireless communication link, comprising:

a gateway PEP, further including a first TCP emulator and a first flight protocol processor to transparently interrupt a TCP data transmission from the client to the server, to translate TCP data packets into flight protocol packets; and a terminal PEP further including a second TCP emulator and a second flight protocol processor to receive the flight protocol data packets, to convert the flight protocol packets back to TCP data packets, and to transmit them over a new TCP connection to the server, wherein transfer of data packets between the gateway PEP and the terminal PEP are initiated without conducting a pre-data handshake and acknowledgement packets are sent from the terminal PEP to the gateway PEP wherein all non-TCP data, non-TCP related Internet Control Message Protocol (ICMP) data, and all encrypted TCP data sent from the gateway PEP pass through the wireless communication link without being modified.

* * * * *